US010177911B2

(12) United States Patent
Nix

(10) Patent No.: US 10,177,911 B2
(45) Date of Patent: *Jan. 8, 2019

(54) SECURE PKI COMMUNICATIONS FOR "MACHINE-TO-MACHINE" MODULES, INCLUDING KEY DERIVATION BY MODULES AND AUTHENTICATING PUBLIC KEYS

(71) Applicant: Network-1 Technologies, Inc., New York, NY (US)

(72) Inventor: John A. Nix, Evanston, IL (US)

(73) Assignee: Network-1 Technologies, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/983,957

(22) Filed: May 18, 2018

(65) Prior Publication Data

US 2018/0270059 A1 Sep. 20, 2018

Related U.S. Application Data

(63) Continuation of application No. 15/043,293, filed on Feb. 12, 2016, now Pat. No. 9,998,280, which is a
(Continued)

(51) Int. Cl.
*H04L 9/30* (2006.01)
*H04L 29/06* (2006.01)
(Continued)

(52) U.S. Cl.
CPC .......... *H04L 9/0861* (2013.01); *G06F 21/35* (2013.01); *H04J 11/00* (2013.01); *H04L 9/006* (2013.01);
(Continued)

(58) Field of Classification Search
CPC ... H04L 9/0861; H04L 9/006; H04L 63/0272; G06F 21/35; G06F 2221/2105; H04W 12/06
See application file for complete search history.

(56) References Cited

U.S. PATENT DOCUMENTS 6,038,322 A 3/2000 Harkins
7,921,292 B1 4/2011 Pauker et al.
(Continued)

FOREIGN PATENT DOCUMENTS

CA 2775853 12/2012
EP 1981224 10/2008
(Continued)

OTHER PUBLICATIONS

Kirk H.M. Wong et aL, A Dynamic User Authentication Scheme for Wireless Sensor Networks, Proceedings of the EEE International Conference on Sensor Networks, Ubiquitous, and Trustworthy Computing (SUTC'06), pp. 1-8.
(Continued)

*Primary Examiner* — Wasika Nipa
(74) *Attorney, Agent, or Firm* — Amster, Rothstein & Ebenstein LLP

(57) ABSTRACT

Methods and systems are provided for efficient and secure "Machine-to-Machine" (M2M) between modules and servers. A module can communicate with a server by accessing the Internet, and the module can include a sensor and/or actuator. The module and server can utilize public key infrastructure (PKI) such as public keys to encrypt messages. The module and server can use private keys to generate digital signatures for datagrams sent and decrypt messages received. The module can internally derive pairs of private/public keys using cryptographic algorithms and a set of parameters. A server can use a shared secret key to authenticate the submission of derived public keys with an
(Continued)

associated module identity. For the very first submission of a public key derived the module, the shared secret key can comprise a pre-shared secret key which can be loaded into the module using a pre-shared secret key code.

11 Claims, 16 Drawing Sheets

Related U.S. Application Data continuation of application No. 14/039,401, filed on Sep. 27, 2013, now Pat. No. 9,288,059.

(51) Int. Cl.

| | |
|---|---|
| *H04L 9/08* | (2006.01) |
| *H04L 9/32* | (2006.01) |
| *H04L 9/00* | (2006.01) |
| *H04W 8/08* | (2009.01) |
| *H04J 11/00* | (2006.01) |
| *H04L 12/28* | (2006.01) |
| *H04W 40/00* | (2009.01) |
| *H04W 52/02* | (2009.01) |
| *H04W 80/04* | (2009.01) |
| *H04W 12/02* | (2009.01) |
| *H04W 12/06* | (2009.01) |
| *G06F 21/35* | (2013.01) |
| *H04W 4/70* | (2018.01) |
| *H04W 76/27* | (2018.01) |
| *H04L 9/14* | (2006.01) |
| *H04W 12/04* | (2009.01) |
| *H04L 29/08* | (2006.01) |
| *H04W 88/12* | (2009.01) |
| *H04W 84/12* | (2009.01) |

(52) U.S. Cl.
CPC .............. *H04L 9/085* (2013.01); *H04L 9/088* (2013.01); *H04L 9/0816* (2013.01); *H04L 9/0894* (2013.01); *H04L 9/14* (2013.01); *H04L 9/30* (2013.01); *H04L 9/3066* (2013.01); *H04L 9/32* (2013.01); *H04L 9/321* (2013.01); *H04L 9/3239* (2013.01); *H04L 9/3247* (2013.01); *H04L 9/3249* (2013.01); *H04L 9/3263* (2013.01); *H04L 12/2854* (2013.01); *H04L 63/0272* (2013.01); *H04L 63/045* (2013.01); *H04L 63/0435* (2013.01); *H04L 63/0442* (2013.01); *H04L 63/061* (2013.01); *H04L 63/0807* (2013.01); *H04L 63/123* (2013.01); *H04L 63/166* (2013.01); *H04L 67/04* (2013.01); *H04W 4/70* (2018.02); *H04W 8/082* (2013.01); *H04W 12/02* (2013.01); *H04W 12/04* (2013.01); *H04W 12/06* (2013.01); *H04W 40/005* (2013.01); *H04W 52/0216* (2013.01); *H04W 52/0235* (2013.01); *H04W 52/0277* (2013.01); *H04W 76/27* (2018.02); *H04W 80/04* (2013.01); *G06F 2221/2105* (2013.01); *G06F 2221/2107* (2013.01); *G06F 2221/2115* (2013.01); *H04L 63/0464* (2013.01); *H04L 2209/24* (2013.01); *H04L 2209/72* (2013.01); *H04L 2209/805* (2013.01); *H04W 84/12* (2013.01); *H04W 88/12* (2013.01); *Y02D 70/00* (2018.01); *Y02D 70/1222* (2018.01); *Y02D 70/1224* (2018.01); *Y02D 70/1242* (2018.01); *Y02D 70/1244* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/21* (2018.01); *Y02D 70/24* (2018.01)

(56) References Cited

U.S. PATENT DOCUMENTS

| | | |
|---|---|---|
| 8,127,142 B2 | 2/2012 | Cuppett |
| 8,434,139 B1 | 4/2013 | Ortiz, Jr. |
| 8,522,013 B2 | 8/2013 | Zhang |
| 8,526,606 B2 | 9/2013 | Muthaiah |
| 8,555,067 B2 | 10/2013 | Schell et al. |
| 8,590,028 B2 | 11/2013 | Saxena et al. |
| 8,713,320 B2 * | 4/2014 | Xu ................. H04W 12/06 713/171 |
| 8,782,774 B1 | 7/2014 | Pahl et al. |
| 8,843,179 B2 | 9/2014 | Li et al. |
| 8,924,715 B2 | 12/2014 | Schell et al. |
| 8,948,386 B2 | 2/2015 | Campagna et al. |
| 8,965,366 B1 | 2/2015 | Somayajula et al. |
| 9,002,018 B2 | 4/2015 | Wilkins et al. |
| 9,020,479 B1 | 4/2015 | Somayajula et al. |
| 9,253,643 B2 | 2/2016 | Pattar et al. |
| 9,408,012 B2 | 8/2016 | Li et al. |
| 2001/0029581 A1 | 10/2001 | Knauft |
| 2002/0018569 A1 | 2/2002 | Panjwani et al. |
| 2003/0003895 A1 | 1/2003 | Wallentin et al. |
| 2003/0211842 A1 | 11/2003 | Kempf et al. |
| 2004/0162472 A1 | 8/2004 | Berson et al. |
| 2004/0179684 A1 | 9/2004 | Appenzeller et al. |
| 2004/0221163 A1* | 11/2004 | Jorgensen ........... H04L 63/0428 713/182 |
| 2005/0008159 A1 | 1/2005 | Grilli et al. |
| 2005/0021875 A1 | 1/2005 | Bouthemy et al. |
| 2005/0050323 A1 | 3/2005 | Mizrah |
| 2005/0120202 A1 | 6/2005 | Cuellar et al. |
| 2005/0138353 A1 | 6/2005 | Spies et al. |
| 2005/0193199 A1 | 9/2005 | Asokan et al. |
| 2005/0246282 A1 | 11/2005 | Naslund et al. |
| 2005/0278787 A1 | 12/2005 | Naslund et al. |
| 2006/0021063 A1 | 1/2006 | Hori |
| 2006/0056355 A1 | 3/2006 | Love et al. |
| 2006/0059344 A1 | 3/2006 | Mononen |
| 2006/0095771 A1 | 5/2006 | Appenzeller et al. |
| 2006/0206710 A1 | 9/2006 | Gehrmann |
| 2006/0281442 A1 | 12/2006 | Lee et al. |
| 2007/0101400 A1 | 5/2007 | Freeman et al. |
| 2007/0158439 A1 | 7/2007 | Conner et al. |
| 2007/0206799 A1 | 9/2007 | Wingert et al. |
| 2008/0016230 A1 | 1/2008 | Holtmanns et al. |
| 2008/0022089 A1 | 1/2008 | Leedom |
| 2008/0031204 A1 | 2/2008 | Sood |
| 2008/0114978 A1 | 5/2008 | Lehtovirta et al. |
| 2008/0130879 A1 | 6/2008 | Heinonen et al. |
| 2008/0165698 A1 | 7/2008 | Dalsgaard et al. |
| 2008/0307218 A1 | 12/2008 | Logvinov |
| 2009/0028341 A1 | 1/2009 | Hamachi |
| 2009/0041110 A1 | 2/2009 | Malladi |
| 2009/0060197 A1 | 3/2009 | Taylor et al. |
| 2009/0077643 A1 | 3/2009 | Schmidt et al. |
| 2009/0113203 A1* | 4/2009 | Tsuge ................. H04L 29/12377 713/151 |
| 2009/0116642 A1 | 5/2009 | Yang et al. |
| 2009/0125996 A1 | 5/2009 | Guccione et al. |
| 2009/0132806 A1 | 5/2009 | Blommaert et al. |
| 2009/0183541 A1 | 7/2009 | Sadighi et al. |
| 2009/0191857 A1 | 7/2009 | Horn et al. |
| 2009/0209232 A1 | 8/2009 | Cha et al. |
| 2009/0217348 A1 | 8/2009 | Salmela et al. |
| 2009/0268909 A1 | 10/2009 | Girao et al. |
| 2009/0274306 A1 | 11/2009 | Nolte |
| 2009/0282246 A1 | 11/2009 | Gunther |
| 2009/0313472 A1 | 12/2009 | Guccione et al. |
| 2010/0031042 A1 | 2/2010 | Di Crescenzo et al. |
| 2010/0062808 A1 | 3/2010 | Cha et al. |
| 2010/0098253 A1 | 4/2010 | Delerablee |
| 2010/0166167 A1 | 7/2010 | Karimi-Cherkandi et al. |

(56) References Cited

U.S. PATENT DOCUMENTS

| | | | |
|---|---|---|---|
| 2010/0195833 A1 | 8/2010 | Priestley | |
| 2010/0199334 A1 | 8/2010 | Ehrensvard et al. | |
| 2010/0223461 A1 | 9/2010 | Drader et al. | |
| 2010/0275028 A1 | 10/2010 | Takashima | |
| 2011/0016321 A1 | 1/2011 | Sundaram et al. | |
| 2011/0035584 A1* | 2/2011 | Meyerstein | H04W 8/265 |
| | | | 713/155 |
| 2011/0055553 A1 | 3/2011 | Lee et al. | |
| 2011/0167272 A1 | 7/2011 | Kolesnikov | |
| 2011/0237281 A1 | 9/2011 | Busropan et al. | |
| 2011/0268022 A1 | 11/2011 | Xu | |
| 2011/0269422 A1 | 11/2011 | Xu et al. | |
| 2011/0269461 A1 | 11/2011 | Xu et al. | |
| 2011/0269472 A1 | 11/2011 | Xu et al. | |
| 2011/0270747 A1 | 11/2011 | Xu et al. | |
| 2011/0291803 A1 | 12/2011 | Bajic et al. | |
| 2011/0314287 A1 | 12/2011 | Escott et al. | |
| 2012/0011360 A1 | 1/2012 | Engels et al. | |
| 2012/0023336 A1 | 1/2012 | Natarajan | |
| 2012/0030461 A1 | 2/2012 | Willey et al. | |
| 2012/0033613 A1 | 2/2012 | Lin et al. | |
| 2012/0072732 A1 | 3/2012 | Canard et al. | |
| 2012/0084568 A1 | 4/2012 | Sarikaya et al. | |
| 2012/0089568 A1* | 4/2012 | Manley | H04L 47/10 |
| | | | 707/634 |
| 2012/0108205 A1 | 5/2012 | Schell et al. | |
| 2012/0117635 A1 | 5/2012 | Schell et al. | |
| 2012/0159153 A1 | 6/2012 | Shim et al. | |
| 2012/0170451 A1 | 7/2012 | Viswanathan et al. | |
| 2012/0190354 A1 | 7/2012 | Merrien et al. | |
| 2012/0214444 A1 | 8/2012 | McBride et al. | |
| 2012/0260086 A1 | 10/2012 | Haggerty et al. | |
| 2012/0260090 A1 | 10/2012 | Hauck et al. | |
| 2012/0260095 A1 | 10/2012 | Von Hauck et al. | |
| 2012/0278490 A1 | 11/2012 | Sennett et al. | |
| 2012/0300932 A1 | 11/2012 | Cambridge et al. | |
| 2012/0331292 A1 | 12/2012 | Haggerty et al. | |
| 2012/0331298 A1 | 12/2012 | Xu et al. | |
| 2013/0007442 A1 | 1/2013 | Mao et al. | |
| 2013/0012168 A1 | 1/2013 | Rajadurai | |
| 2013/0028184 A1 | 1/2013 | Lee et al. | |
| 2013/0091556 A1 | 4/2013 | Horn et al. | |
| 2013/0114810 A1 | 5/2013 | Kobayashi et al. | |
| 2013/0117824 A1 | 5/2013 | Naslund et al. | |
| 2013/0122864 A1 | 5/2013 | Haggerty et al. | |
| 2013/0149996 A1 | 6/2013 | King et al. | |
| 2013/0165073 A1 | 6/2013 | Madsen | |
| 2013/0166915 A1 | 6/2013 | Desai et al. | |
| 2013/0173747 A1 | 7/2013 | Kim et al. | |
| 2013/0173926 A1 | 7/2013 | Morese et al. | |
| 2013/0182586 A1 | 7/2013 | Paladugu et al. | |
| 2013/0183932 A1 | 7/2013 | Lemilainen et al. | |
| 2013/0212637 A1 | 8/2013 | Guccione et al. | |
| 2013/0227646 A1 | 8/2013 | Haggerty et al. | |
| 2013/0231087 A1 | 9/2013 | O'Leary | |
| 2013/0294602 A1 | 11/2013 | Huxham et al. | |
| 2013/0305345 A1 | 11/2013 | Bugenhagen | |
| 2013/0322621 A1 | 12/2013 | Yoon et al. | |
| 2013/0331063 A1 | 12/2013 | Cormier et al. | |
| 2013/0340040 A1 | 12/2013 | Park | |
| 2014/0003604 A1 | 1/2014 | Campagna et al. | |
| 2014/0040628 A1 | 2/2014 | Cod et al. | |
| 2014/0049653 A1 | 2/2014 | Leonard et al. | |
| 2014/0053241 A1 | 2/2014 | Norrman et al. | |
| 2014/0073375 A1 | 3/2014 | Li et al. | |
| 2014/0082358 A1 | 3/2014 | Nakhjiri et al. | |
| 2014/0082359 A1 | 3/2014 | Nakhjiri et al. | |
| 2014/0087790 A1 | 3/2014 | Babbage et al. | |
| 2014/0101444 A1 | 4/2014 | Lee et al. | |
| 2014/0108801 A1 | 4/2014 | McBride et al. | |
| 2014/0115335 A1 | 4/2014 | Jorden et al. | |
| 2014/0122878 A1 | 5/2014 | Cho et al. | |
| 2014/0140507 A1 | 5/2014 | Dark et al. | |
| 2014/0140509 A1 | 5/2014 | Chastain | |
| 2014/0143534 A1 | 5/2014 | Chastain | |
| 2014/0143826 A1 | 5/2014 | Sharp et al. | |
| 2014/0161113 A1 | 6/2014 | Cui et al. | |
| 2014/0165155 A1 | 6/2014 | Zhang | |
| 2014/0192976 A1 | 7/2014 | Yoon et al. | |
| 2014/0219447 A1 | 8/2014 | Park et al. | |
| 2014/0219448 A1 | 8/2014 | Froels et al. | |
| 2014/0235210 A1 | 8/2014 | Park | |
| 2014/0237101 A1 | 8/2014 | Park | |
| 2014/0244994 A1 | 8/2014 | Yu | |
| 2014/0273913 A1 | 9/2014 | Michel et al. | |
| 2014/0287725 A1 | 9/2014 | Lee | |
| 2014/0308991 A1 | 10/2014 | Lee et al. | |
| 2014/0329502 A1 | 11/2014 | Lee et al. | |
| 2014/0337937 A1 | 11/2014 | Truskovsky et al. | |
| 2014/0351403 A1 | 11/2014 | Lin et al. | |
| 2014/0357229 A1 | 12/2014 | Lee et al. | |
| 2015/0012743 A1 | 1/2015 | Holtmanns et al. | |
| 2015/0017910 A1 | 1/2015 | Li et al. | |
| 2015/0071139 A1 | 3/2015 | Nix | |
| 2015/0089214 A1 | 3/2015 | Dupre | |
| 2015/0092590 A1 | 4/2015 | Zhu et al. | |
| 2015/0095514 A1 | 4/2015 | Yu | |
| 2015/0113275 A1 | 4/2015 | Kim et al. | |
| 2015/0121495 A1 | 4/2015 | Gao et al. | |
| 2015/0215126 A1 | 7/2015 | Ashdown | |
| 2015/0222604 A1 | 8/2015 | Ylonen et al. | |
| 2015/0222619 A1 | 8/2015 | Hughes et al. | |
| 2015/0281964 A1 | 10/2015 | Seo et al. | |
| 2016/0014112 A1 | 1/2016 | Gunning et al. | |
| 2016/0127132 A1 | 5/2016 | Lee et al. | |
| 2016/0294829 A1 | 10/2016 | Angus | |
| 2017/0206532 A1 | 7/2017 | Choi | |

FOREIGN PATENT DOCUMENTS

| | | |
|---|---|---|
| KR | 10-2013-0026352 | 3/2013 |
| KR | 10-2013-0026958 | 3/2013 |
| WO | 2013027085 | 2/2013 |
| WO | 2013066077 | 5/2013 |

OTHER PUBLICATIONS

Pierre E. Abi-Char, et aL, A Fast and Secure Elliptic Curve Based Authenticated Key Agreement Protocol for Low Power Mobile Communications, The 2007 International Conference on Next Generation Mobile Applications, Services and Technologies (NGMAST 2007), pp. 1-6.

Jun Shao, et al., An Improved Deniable Authentication Protocol, Department of Computer Science and Engineering, Shanghai Jiao Tong University, Shanghai 200030, People's Republic of China, pp. 1-3.

Chris Foresman, Embedded SIM could caus carrier conflict for Apple, Nov. 19, 2010, pp. 1-2.

Embedded UICC Remote Provisioning Discussion, Source: Rogers Wireless, 3GPP/SA3-LI#46, Quebec City, Canada, Jul. 17-19, 2012, pp. 1-39.

GSMA Launches Embedded SIM Initiative to Support the Connected Future, Nov. 18, 2010, pp. 1-4.

Chang-Seop Park, On Certificate-Based Security Protocols for Wireless Mobile Communication Systems, Dankook University, IEEE Network Sep./Oct. 1997, pp. 50-55.

M. Prasad, et aL, Secure Authentication Key Agreement Protocol for Long Term Evolution—Advanced, Research Scholar, Associate Professor, Department of Computer Science & Engineering, Pondicherry Engineering College, Puducherry, India, Elsevier, 2012, pp. 158-162.

Eun-Jun Yoon, et aL, Secure Deniable Authentication Protocol Based on ElGamal Cryptography, 2008 International Conference on Information Security and Assurance, pp. 36-39.

CSMG, Reprogrammable SIMs: Technology, Evolution and Implications, Sep. 25, 2012, pp. 1-95.

GlobalPlatform Inc., GlobalPlatform Card Specification, Version 2.2.1, Jan. 2011, pp. 1-303.

GlobalPlatform Inc., GlobalPlatform Card Security Upgrade for Card Content Management, Card Specification v 2.2.—Amendment E, Version 1.0, Nov. 2011, pp. 1-35.

(56) References Cited

OTHER PUBLICATIONS

GSM Association, Embedded SIM Task Force Requirements and Use Cases, Version 1.0, Feb. 21, 2011, pp. 1-38.
Pietre-Cambacedes et al., Cryptographic key management for SCADA systems—issues and perspectives, 2008 International Conference on Information Security and Assurance, IEEE, pp. 156-161.
Bender et al., Evolution of SIM provisioning towards a flexible MCIM provisioning in M2M vertical industries, 16th International Conference on Intelligence in Next Generation Networks, IEEE, 2012, pp. 57-64.
Park et al., Secure Profile Provisioning Architecture for Embedded UICC, 2013 International Conference on Availability, Reliability and Security, IEEE, 2013, pp. 297-303.
3GPP, 3rd Generation Partnership Project; Technical Specification Group Core Network and Terminals; Non-Access-Stratum (NAS) protocol for Evolved Packet System (EPS); Stage 3, 3GPP TS 24.301 v12.2.0, Sep. 2013 pp. 1-6, 63-100.
3GPP, 3rd Generation Partnership Project;Technical Specification Group Services and System Aspects; 3GPP System Architecture Evolution (SAE); Security architecture, 3GPP TS 33.401 V12.9.0 (Sep. 2013) pp. 1-75.
Appenzeller et al., Identity-Based Encryption Architecture and Suporting Data Structures RFC 5408, 2009, pp. 1-30.
Baugher et al., Group Key Management Architecture, RFC Draft, 2001, pp. 1-20.
Ben Saied, Yosra; Olivereau, Alexis; Laurent, Maryline; "A Distributed Approach for Secure M2M Communications", 5th International Conference on New Technologies, Mobility and Security (NTMS), May 7-10, 2012, pp. 1-7.
Boyen et al., Anonymous Hierarchical Identity-Based Encyrption (Without Random Oracles), 2006.
Boyen et al., Identity-Based Cryptography Standard (IBCS) #1: Supersingular Curve Implementations of the BF and BB1 Cryptosystems, RFC 5091, 2007, pp. 1-63.
ETSI, Smart Cards; Embedded UICC; Requirements Specification, TS 103 383 v12.1.0, Jun. 2013, pp. 1-20.
ETSI, Smart Cards; UICC—Terminal Interfaces; Physical and Logical Characteristics, TS 102 221 v11.0.0, Jun. 2012, pp. 1-181.
ETSI, UMTS;LTE; SIM/USIM Internal and External Interworking Aspects, TR 131 900 v.10.0.0, May 2011, pp. 1-41.
Harney et al., Group Key Management Protocol (GKMP) Architecture, 1994, pp. 1-19.
International Search Report and Written Opinion for PCT/US2014/062435 dated Feb. 6, 2015.
Kiltz et al., CCA2 Secure IBE: Standard Model Efficiency through Authenticated Symmetric Encryption, 2008.
Krylov, What is Kerberos Authtentication?, 2003, pp. 1-4.
Martin, Introduction to Identity-Based Encryption, ISBN-13 978-1-59693-238-8, 2008.
Merrian-Webster, Network, 2014.
Park et al., A New Practical Identity-Based Encryption System, 2003, pp. 1-27.
Park et al., Secure Profile Provisioning Architecture for Embedded UICC, 2013 IEEE, pp. 297-303.
Search Report and Written Opinion for PCT/US2014/068544.
Shih, Jie-Ren; Hu, Yongbo; Hsiao, Ming-Chun; Chen, Ming-Shing; Shen, Wen-Chng; Yang, Bo-Yin; Wu, An-Yeu; Cheng, Chen-Mou; "Securing M2M with Post-Quantum Public-Key Cryptography", IEEE Journal on Emerging and Selected Topics in Circuits and Systems, Mar. 7, 2013, pp. 106-116.
Voltage Security, The Identity-Based Encryption Advantage, 2015.
Yang et al., Identity-Based Key Agreement and Encyrption for Wireless Sensor Networks, IJCSNS International Journal of Computer Science and Network Security, vol. 6, No. 5B, May 2006, pp. 182-189.
Youngblood, An Introduction to Identity-based Cryptography, 2005.
Zhu et al., Public Key Cryptography for Initial Authentication in Kerberos (PPKINIT), RFC 4556, 2006, pp. 1-42.
GSMA, Fast Dormancy Best Practices Version 1.0, Jul. 27, TS.18, pp. 1-23.
N. Chu et al. EXALTED: Expanding LTE for Devices, European Commission for Information Society and Media, Oct. 31, 2012, pp. 1-141.
J. Huang et al, A close Examination of Performance and Power Characteristics of 4G LTE Networks, Mobisys' 12, Jun. 25-29, 2012, pp. 1-14.
F. Qian et al., TOP: Tail Organization Protocol for Cellular Resource Allocation, 18th IEEE International Conference on Network Protocols (ICNP), 2010, pp. 285-298.
Wikipedia, RSA (algorithm), http://en.wikipedia.org/wiki/RSA_(algorithm), Sep. 9, 2013, pp. 1-12.
Wikipedia, Elliptic Curve Cryptography, http://en.wikipedia.org/wiki/Elliptic_curve_cryptography, Sep. 9, 2013, pp. 1-8.
L. Larzon, The Lightweight User Datagram Protocol (UDP-Lite), Internet Engineering Task Force RFC 3828, Jul. 2004, pp. 1-12.
Wikipedia, Digital Signature, http://en.wikipedia.org/wiki/Digital_Signature, Sep. 9, 2013, pp. 1-10.
D. Cooper, Internet X.509 Public Key Infrastructure Certificate and Certificate Revocation List (CRL) Profile, Internet Engineering Task Force RFC 5282, pp. 1-133.
ETSI, Machine-to-Machine communications (M2M), mla, dla, and mld interfaces, TS 102.921 v1.1.1, Feb. 2012, pp. 1-538.
C. Downey, Migrating Legacy M2M Systems to the Cloud, http://www.ecnmag.com/articles/2013/02/migrating-legacy-m2m-systems-cloud, Feb. 2013, pp. 1-2.
A. Wander et al, Energy Analysis of Public-Key Cryptography on Small Wireless Devices, Sun Microsystems Laboratories, pp. 1-16.
J. Jonsson et al, Public-Key Cryptography Standards (PKCS) #1: RSA Cryptography Specifications Version 2.1, Internet Engineering Task Force RFC 3447, Feb. 2003, pp. 1-72.
D. McGrew et al, Fundamental Elliptic Curve Cryptography Algorithms, Internet Engineering Task Force RFC 6090, Feb. 2011, pp. 1-34.
Wikipedia, Elliptic Curve Diffe-Hellman, http://en.wikipedia.org/wiki/Elliptic_surve_Diffie%E2%80%93Hellman, Sep. 24, 2013, pp. 1-2.
V. Martinez et al, A Survey of the Elliptic Curve Integrated Encryption Scheme, Journal of Computer Science and Engineering, vol. 2, Aug. 2010, pp. 7-13.
T. Pornin, Deterministic Usage of the Digital Signature Algorithm (DSA) and Elliptic Curve Digital Signature Algorithm (ECDSA), Internet Engineering Task Force RFC 6979, Aug. 2013, pp. 1-79.
Cakulev et al., "An EAP Authentication Method Based on Identity-Based Authenticated Key Exchange," Aug. 2012, pp. 1-32.
Gollmann, "Authentication—Myths and Misconceptions," Progress in Computer Science and Applied Logic, vol. 20, 2001, pp. 203-225.
Tin et al., "Provably Secure Mobile Key Exchange: Applying the Canetti-Krawczyk Approach," Information Security Research Centre, Queensland University of Technology, Australia, 2003, pp. 166-179.
Hegland et al., "A Framework for Authentication in NBD Tactical Ad Hoc Networks," IEEE Communications Magazine, Oct. 2011, pp. 64-71.
Nicholson et al., "Mobile Device Security Using Transient Authentication," IEEE Transactions on Mobile Computing, vol. 5, No. 11, Nov. 2006, pp. 1489-1502.
Schwaiger et al., "Smart Card Security for Fieldbus Systems," 2003, pp. 398-406.

\* cited by examiner

Figure 1g

```
         2048 bit RSA Key with SHA1 Signature ( "..." is long text removed)
      Certificate:
         Data:
            Version: 3 (0x2)
            Serial Number: (1234931064 (0x499c6c20)
            Signature Algorithm: sha1WithRSAEncryption
            Issuer: C=US, ST=Illinois, L=Chicago, O=InCharge Systems Inc., OU=CA,
                  CN=InCharge Systems Root CA/emailAddress=ca@inchargesys.com
            Validity
               Not Before: Aug 31 15:12:30 2009 GMT
               Not After : Aug 31 15:12:30 2024 GMT
            Subject: C=US, ST=Illinois, L=Chicago, O=Module Provider, OU=Modules,
110 ─────→    CN= 1122AABBFF00
            Subject Public Key Info:
               Public Key Algorithm: rsaEncryption
               RSA Public Key: (2048 bit)
                  Modulus (2048 bit):
                     00:cc:37:63:ce:95:c8:b7:24:4a:74:1a:37:39:56:
111                          ...
                     10:cb:35:86:d5:fd:1e:ff:44:c3:77:0b:10:2e:59:
                  Exponent: 65537 (0x9001)
            X509v3 extensions:
               X509v3 Subject Key Identifier:
                  53:38:06:6A:50:E4:47:31:B6:0F:67:75:A0:17:50:A4:75:3F:78:5B
               X509v3 Authority Key Identifier:
                  keyid:53:38:06:6A:50:E4:47:...:75:A0:17:50:A4:75:3F:78:5B
                  DirName:/C=US/ST=Illinois/L=Chicago/O=InCharge Systems Inc.
122                      /OU=CA/CN=InCharge Systems Root CA
                         /emailAddress=ca@inchargesys.com
                  serial:01
               X509v3 CRL Distribution Points:
                  URI:http://www.inchargesys.com/ca/crl/ics_root_ca.crl
               X509v3 Certificate Policies:
                  Policy: 1.3.6.1.4.1.32104.2.1.1
                     CPS: http://www.inchargesys.com/ca/doc/ICS-RootCA-CP.html
         Signature Algorithm: sha1WithRSAEncryption
            5a:50:be:8c:4a:dc:28:9f:2d:78:b5:8a:60:51:be:29:fd:d2:
            a3:f0:3f:63:14:7d:aa:56:8e:dd:1c:73:b5:5c:5a:15:40:97:
123                  ...
            62:c2:c0:ee:51:74:27:87:7c:3b:5c:b8:ce:1f:33:33:f2:5b:
            af:7c:2b:ed
      -----BEGIN CERTIFICATE-----
      MIIGvTCCBaWgAwIBAgIBATANBgkqhkiG9w0BAQUFADCBpTELMAkGA1UEBhMC
      VVMx
      ETAPBgNVBAgTCElsbGlub2lzMRAwDgYDVQQHEwdDaGljYWdvMR4wHAYDVQQ
      KExVJ
                  ...
124   RJ2afeLm1mVR+WGapWXWAMoFqe+GJwK31Gz9ur5GK/Un/cvt91Zl0Y4XfjTmjc
      ZGOUbShckM4IPI8RHeou970w7rvuYh//eAsgYsLA7IF0J4d8O1y4zh8zM/Jbr3wr
      7Q==
      -----END CERTIFICATE-----
```

Figure 1h 283 bit Elliptic Curve Key with SHA 256 Signature ("..." is long text removed)

```
Certificate:
    Data:
        Version: 3 (0x2)
        Serial Number: 1234931064 (0x499c6c20)
        Signature Algorithm: SHA-256 ECDSA-256.                    110
        Issuer: OU=JNIX, CN=server01
        Validity
            Not Before: Feb 01 20:15:24 2009 GMT
126 →       Not After : Jul 01 20:15:24 2019 GMT
        Subject: C=US, ST=Illinois, L=Chicago, O=Module Provider, OU=1122AABBFF00
111a →      CN=456
        Subject Public Key Info:
            Public Key Algorithm: id-ecPublicKey
            EC Public Key:
                pub:
                    a7:a0:8a:0e:27:8f:8f:67:7f:05:36:0c:7e:f4:18:
        111
                    ...
                    67:60:2d:57:87:8d:cd:0b:e1:f5:3f:ac:aa:81:ea:
126 →       ASN1 OID: sect283r1
        X509v3 extensions:
            X509v3 Subject Key Identifier:
                8D:F4:51:AB:B9:41:1F:FC:73:B3:DB:77:45:96:15:54:1A:52:85:25
            X509v3 Authority Key Identifier:
                keyid:FC:99:74:45:56:10:F1:87:AD:EA:56:70:67:A2:26:0E:3D:9E:D6:66
                DirName:/OU=JNIX/CN=server41
                serial:49:9C:6A:ED
            X509v3 CRL Distribution Points:
                Full Name:
                    URI:URI:http://www.inchargesys.com/ca/crl/ics_root_ca.crl
            X509v3 Key Usage:
                Digital Signature
    Signature Algorithm: ECDSA with SHA256
        83:08:20:2a:79:e3:c3:60:b0:2f:c2:89:d4:a2:b7:57:3e:b6:
123
        ...
        05:ce:d3:e4:34:cf:d2:e1:e3:c3:60:b0:2f:c2:25
-----BEGIN CERTIFICATE-----
BggqgRzXYwzjCCAYKgAwIBAgIESZxsIDKnnjw2CwL8KJ1K ...
EBAQUAMCIxDTALMIIBegwggK3Vz62JQ==
-----END CERTIFICATE-----
```

122

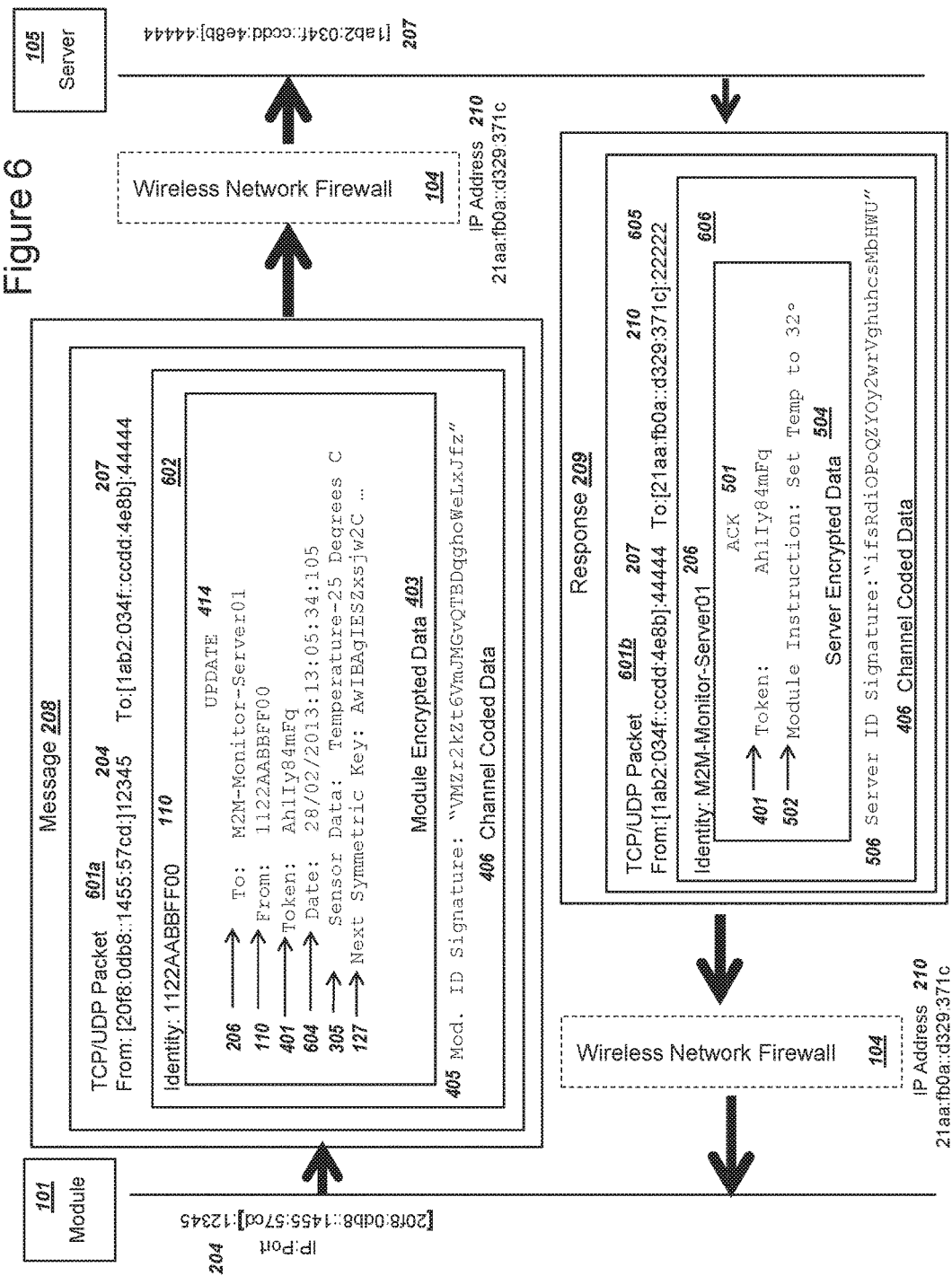

SECURE PKI COMMUNICATIONS FOR "MACHINE-TO-MACHINE" MODULES, INCLUDING KEY DERIVATION BY MODULES AND AUTHENTICATING PUBLIC KEYS

CROSS-REFERENCE TO RELATED APPLICATIONS

This is a continuation of U.S. patent application Ser. No. 15/043,293 filed Feb. 12, 2016, which is a continuation of U.S. patent application Ser. No. 14/039,401 filed Sep. 27, 2013, now U.S. Pat. No. 9,288,059, each of which is incorporated by reference herein in its entirety.

The subject matter of this application is related to the subject matter of U.S. patent application Ser. No. 14/023,181, filed Sep. 10, 2013 in the name of John Nix, entitled "Power Management and Security for Wireless Modules in 'Machine-to-Machine' Communications," now U.S. Pat. No. 9,350,550, which is hereby incorporated by reference herein in its entirety.

BACKGROUND

Technical Field

The present methods and systems relate to communications between wireless modules and a network, and more particularly, to efficient methods and systems for supporting secure, efficient, and flexible communications between a "machine-to-machine" (M2M) node and a server using Internet Protocol networks.

Description of Related Art

The combination of "machine-to-machine" (M2M) communications and using low-cost sensors, Internet connections, and processors is a promising and growing field. Among many potential benefits, M2M technologies allow the remote monitoring of people, assets, or a location where manual monitoring is not economic, or costs can be significantly reduced by using automated monitoring as opposed to manual techniques. Prominent examples today include vending machines, automobiles, alarm systems, and remote sensors. Fast growing markets for M2M applications today include tracking devices for shipping containers or pallets, health applications such as the remote monitoring of a person's glucose levels or heartbeat, monitoring of industrial equipment deployed in the field, and security systems. Many M2M applications leverage either wired Internet connections or wireless connections, and both types of connections continue to grow rapidly. M2M applications may also be referred to as "the Internet of things".

M2M communications can provide remote control over actuators that may be connected to a M2M device, such as turning on or off a power switch, locking or unlocking a door, adjusting a speed of a motor, or similar remote control. A decision to change or adjust an actuator associated with an M2M device can utilize one or a series of sensor measurements. An M2M device may also be referred to as a "wireless module" or also simply a module. As one example, if a building or room is too cold, then temperature can be reported to a central server by an M2M device and the server can instruct the M2M device to turn on a switch that activates heat or adjusts a thermostat. As the costs for computer and networking hardware continue to decline, together with the growing ease of obtaining either wired or wireless Internet access for small form-factor devices, the number of economically favorable applications for M2M communications grows.

Many M2M applications can leverage wireless networking technologies. Wireless technologies such as wireless local area networks and wireless wide area networks have proliferated around the world over the past 15 years, and usage of these wireless networks is also expected to continue to grow. Wireless local area network (LAN) technologies include WiFi and wireless wide area network (WAN) technologies include $3^{rd}$ Generation Partnership Project's (3GPP) 3rd Generation (3G) Universal Mobile Telecommunications System (UMTS) and $4^{th}$ Generation (4G) Long-term Evolution (LTE), LTE Advanced, and the Institute of Electrical and Electronics Engineers' (IEEE) 802.16 standard, also known as WiMax. The use of wireless technologies with "machine-to-machine" communications creates new opportunities for the deployment of M2M modules in locations without fixed-wire Internet access, but also creates a significant new class of problems that need to be solved. First, many wireless wide-area networking standards were designed and optimized for mobile phones, which may be continuously connected to the network during the day (i.e. non-sleeping hours for most subscribers while they may charge phones at night), in order to receive inbound phone calls and messages. In this case, the radio may be in an idle state but utilizing discontinuous reception, but the radio is still active and drawing power in order to receive and process incoming signaling from the network such as a Public Land Mobile Network (PLMN). A need exists in the art to make wireless M2M communications efficient in order to conserve battery life and radio-frequency spectrum resources.

Since the packets transmitted and received by a wireless module will likely traverse the public Internet for many applications, a need exists in the art to (i) prevent eavesdropping at intermediate points along the path of packets transmitted and received, (ii) allow endpoints to verify the identity of the source of packets received. A need exists in the art for a wireless module and a monitoring server to leverage established public key infrastructure (PKI) techniques and algorithms. A need exists in the art for communication to be secured without requiring the established, but relatively processing, bandwidth, and energy intensive security protocols such as IPSec, TLS, and SSL, since the establishment of theses links requires packet handshakes and/or key exchanges at levels including the network and transport layer of the traditional Open Systems Interconnection (OSI) model. M2M applications frequently require small, periodic messages sent between a wireless module and a monitoring server, where the wireless module sleeps between the messages. M2M applications may leverage wired modules as well which also sleep between messages. During relatively long periods of sleep such as 30 minutes or more, the a wireless or wired network with intermediate firewalls will often tear down the network and/or transport layer connections, which means the wireless module would need to re-negotiate or reestablish the secure tunnels each time the wireless module wakes and seeks to send a relatively small message to a server.

Next, a need exists in the art for the communication between a module and a monitoring server to be highly energy and bandwidth efficient in order to reduce energy consumption over the operating lifetime of a module. A limiting factor for a wireless module for M2M applications deployed or installed into the field is the lifetime of the battery of the wireless module. If the transmission techniques for the wireless module are not energy efficient, the system will require more frequent manual intervention for the replacement or recharging of batteries. If the battery becomes sufficiently low, then communication with the wireless module will be lost, or the frequency would have to be reduced for sensor measurements sent by the wireless module or actuator commands sent by a monitoring server. The energy saving techniques for transmitting and receiving data should leverage established Internet protocols, in order to utilize the public Internet, in addition to the need for secure communications noted above. For wired modules operating for years or decades, a significant cost will be the power consumed from land-line power.

Further, a need exists in the art for the secure, energy efficient communications that support Internet protocols to support intermediate firewalls that may exist along the path of packets sent and received by both a wireless module and a monitoring server. Without support for communication through an intermediate firewall, packets may be blocked by the firewall and the M2M application would not properly function in this case. A need exists in the art for techniques of secure and energy-efficient communications between modules and monitoring servers to support a wide variety of manufacturers of modules and M2M applications. Currently, there are dozens of manufacturers and form-factors of modules, and this diversity will continue to increase for the foreseeable future. By leveraging standards such as the Internet and PKI technologies, an efficient, secure, and highly scalable system of communicating could support the wide variety of modules.

In addition, the utilization of PKI technologies in modules can increase security, but a number of technical challenges must be addressed. These challenges increase if a deployed module required updated private/public key pairs after operation begins. The typical paradigm of "swapping out a SIM card" (which also depend on a pre-shared secret key Ki embedded in the card) with mobile phones may not be applicable or cost effective with modules, where swapping out the SIM card could be burdensome. A need exists in the art to allow for a deployed module to securely begin using new private and public keys. Newer PKI technologies may offer a wide variety of algorithms for ciphering with public keys, and a need exists in the art for the utilization of new public and private keys to support the wide variety of algorithms, even after a module has been installed. In other words, a system should preferably both be highly secure and also flexible enough to adopt new security keys and standards. A need exists in the art for a scalable and secure method of associating a module identity with a module public key, when the module begins utilizing a new public key. A need exists in the art for a module to efficiently be able to utilize multiple public/private key pairs at the same time, such as with different service providers or different applications simultaneously.

And other needs exist in the art as well, as the list recited above is not meant to be exhaustive but rather illustrative.

SUMMARY

Methods and systems are provided for secure and efficient communication between modules and a server, for supporting "Machine to Machine" communications. An objective of the invention is to address the challenges noted above for securing the deployment of modules that utilize PKI algorithms and keys, as well as increasing efficiency in order to reduce power consumption, including extending the battery life of a module, if present. More efficient communication can also conserve valuable radio-frequency spectrum, among other benefits.

An exemplary embodiment may take the form of methods and systems for a wireless module and a server to securely communicate in an efficient manner while using the public Internet. The first exemplary embodiment can address a "bootstrap problem" related to the automatic generation of PKI keys by a module, including a module that has already been deployed or distributed, where the resulting module public key should be authoritatively verified as belonging with a particular module and module identity. The module can preferably include a set of cryptographic algorithms that comprise a set of asymmetric ciphering algorithms, symmetric ciphering algorithms, secure hash algorithms, digital signature algorithms, key pair generation algorithms, a key derivation function, and a random number generator. The module can read a module identity using a read-only address, such as a hardware address or a read-only memory.

A nonvolatile memory in the module can include a set of parameters for generating cryptographic keys, a server address, and a pre-shared secret key. Examples for recording the pre-shared secret key into the nonvolatile memory can include either (i) loading the pre-shared secret key into the non-volatile memory by a manufacturer, or (ii) having a distributor, installer, or end-user obtain the pre-shared secret key from a server via a secure web connection. The distributor, installer, or end-user could visually read from printed codes on the module enclosure (or other paperwork or electronic files associated with the module) both (i) a pre-shared secret key code, and (ii) a module identity. The distributor, installer, or end-user could then submit the pre-shared key code and module identity via a secure web connection and receive the pre-shared secret key from a server. The distributor, installer, or end-user could then load or record the pre-shared secret key into the nonvolatile memory of the module using a LAN connection to the module, such as WiFi, Bluetooth, or through a USB connection, or possibly directly into a user interface of the module.

The module can utilize the set of cryptographic algorithms to securely generate or derive a module private key and a module public key. The module private key and module public key can be generated either (i) upon initial use or installation of the module, or (ii) at a subsequent time after initial use such as when a new set of key pairs are required or are useful for continued operation of the module. After deriving the module public key and module private key, the module private key is preferably recorded in a secure location in a nonvolatile memory within the module, and the module private key is preferably not shared with other entities or communicated across a wireless network. The module may then utilize the recorded pre-shared secret key to authenticate with a server that also records or has access to the pre-shared secret key. The authentication could comprise either using message digest with the pre-shared secret key, or using the pre-shared secret key as a symmetric ciphering key, and the authentication may also utilize a second key derived by both the module and the server using the pre-shared secret key. After authentication, the server can authoritatively record the derived module public key with the module identity in a database. Thus, the use of a pre-shared secret key can ensure the submitted module public key is validly associated with the module and module identity. The server can then also optionally generate a certificate for the module and send the certificate back to the module. The server could then also then make the certificate available for other servers on the Internet. Note that the certificate may have an expiration date, and thus module may preferably generate or derive a new public and private key at a later time, also using an authentication with a shared secret key when submitting a subsequent derived new module public key.

The server can include a private key associated with the server and the derived public key associated with the module. The public keys can leverage established public key infrastructure (PKI) standards, such as X.509 v3 certificates and RSA or elliptic curve cryptography (ECC) algorithms. The private and public keys may preferably utilize ECC based keys and algorithms in order to increase the security for a given key length, compared to RSA, thereby increasing the efficiency and reducing power and bandwidth consumption and maximize battery life for a module. The module may be deployed within a wireless network such as a 4G LTE network or a WiFi network, or may be connected to the Internet via a wired connection such as Ethernet. The module can change state between a sleep state and an active state, wherein the sleep state may utilize a few milliwatts or less and the active state may utilize several hundred milliwatts of power or more. After being installed next to a monitored unit, the wireless module can wake from a sleep or dormant state, utilize a sensor to collect data associated with the monitored unit, connect to the wireless network and the Internet, and send the sensor data to a server.

The sensor data sent from the wireless module to the server can be transmitted as a message using the User Datagram Protocol (UDP) protocol. The message as a UDP datagram can be a UDP Lite datagram and also with checksums partially disabled, or only applicable to the packet header. A UDP Lite datagram with sensor data can include channel coding for the body of the datagram to mitigate the effect of bit errors. Or, a regular UDP packet could be sent in multiple copies in order to provide forward error correction. The module can utilize the server public key to securely send a symmetric key inside message encrypted with an asymmetric ciphering algorithm, and the symmetric key can be used to encrypt the sensor data within the message or a subsequent message. The module can utilize the module private key to create and include a digital signature of the module in the message. The message can also include a module identity and a security token. The server can receive the message and (i) verify the digital signature of the module by utilizing the module public key and module identity, and (ii) decrypt the sensor data by utilizing the server private key to decrypt the symmetric key and then using the symmetric key to decrypt the sensor data.

After receiving the message, the server can send a response back to the module, wherein the response can include an acknowledgement that the message has been properly received by the server. Since the UDP protocol is connectionless, the module may need a confirmation that the message has been properly received by the server. The response sent from the server may optionally include a module instruction for the module, wherein the module instruction can change parameters or function of the module for collecting data from a monitored unit. The module instruction can be sent from the server to the module after the wireless module sends the message. In this manner, the module can receive the module instruction because at other times, such as before the module sends the message, (i) the module may be in a sleep or dormant state and unable to receive the module instruction, and (ii) a firewall associated with a wireless or wired network providing Internet connectivity to the module may block incoming packets to the module unless the module had first sent a packet to the server within a firewall port-binding timeout period.

The server can process a response to the message from the module. The server can (i) utilize the symmetric key to encrypt the acknowledgement and/or module instruction within the response and (ii) utilize the server private key to create and include a digital signature of the server in the response. The server can send the response to the module. The response can also include a server identity and a security token. The module can receive the response and (i) verify the digital signature of the server by utilizing the server public key and/or a server certificate with a signature from a certificate authority, and (ii) decrypt the acknowledgement and/or module instruction by utilizing the symmetric key. After successfully receiving and processing the response from the server, the module can change state from the active state to the sleep or dormant state, including disconnecting from a wireless network and powering down a radio. The module can include a sleep timer, wherein the module wakes upon expiration of the sleep timer, and subsequently repeats the process of collecting sensor data and securely sending a message to the server.

A second exemplary embodiment may also take the form of methods and systems for a wireless module and a server to securely communicate in an efficient manner while using the public Internet. The second exemplary embodiment can also address a "bootstrap problem" related to the automatic generation of PKI keys by a module that has already been distributed, where the resulting module public key received after key derivation by the module should be authoritatively verified as belonging with a particular module and module identity. The module can preferably include a set of cryptographic algorithms that comprise a set of asymmetric ciphering algorithms, symmetric ciphering algorithms, secure hash algorithms, digital signature algorithms, key pair generation algorithms, a key derivation function, and a random number generator. The module can read a module identity from a read-only address, such as a hardware address or a read-only memory. A nonvolatile memory in the module can include a set of parameters for generating cryptographic keys, a server address, and a pre-shared secret key. The pre-shared key can preferably be unique to a module, and also associated with a module identity such that a pre-shared key belonging to a first module and first module identity cannot be properly utilized with a second module and second module identity.

The module can utilize the set of cryptographic algorithms to securely generate or derive a module private key and a module public key. Since the security of the system may ultimately depend on random numbers input into key generation algorithms within the module, the module may preferably utilize a combination of sensor data, radio data, and a clock simultaneously as a seed within a random number generator when deriving the new module private and public key. Additional input into the seed could include measurements or states within memory, operating system states and files, and reading data from hardware. After deriving the new module public key and module private key, the module may then utilize the pre-shared secret key to encrypt the derived module public key using a symmetric ciphering algorithm, thereby creating a module encrypted data (which contains the encrypted derived module public key).

The module can then send the module encrypted data, which includes the public key, and the module identity to a server in the form of a message. The message could comprise a UDP packet with forward error correction, such that the module sends multiple copies of the UDP packet in order to increase assurance of delivery. The server can listen for incoming UDP messages and also include logic to drop duplicate packets, or also combine partially mangled packets in order to recover a full message. The server also records or has access to the pre-shared secret key. The server can read the message containing the module encrypted data and the module identity. The server can utilize the module identity to select the pre-shared secret key associated with the module identity. The server can then utilize a symmetric ciphering algorithm and pre-shared secret key as a symmetric ciphering key to decrypt the module encrypted data and read the derived module public key.

Upon successfully receiving and decrypting the derived module public key associated with the module identity, the server can authoritatively record the new module public key and module identity. The module encrypted data received in the message can also include a set of parameters associated with the module public key, and these parameters may also be recorded in a database associated with the server. The parameters could include (i) an elliptic curve selected for use with the module public key, and (ii) settings for use in a key derivation function using the new module public key and the server key. The module and the server can subsequently utilize a key derivation function, the new module public key, and server public key to derive a new shared secret key. The new shared secret key could be utilized as a symmetric ciphering key, or to jointly derive another symmetric ciphering key. Both the module and server can resume secure communications, after the server receives the new module public key, using the symmetric ciphering key and a symmetric ciphering algorithm. For enhanced security, the symmetric ciphering key may include an expiration time, upon which the module can send an updated symmetric ciphering key using asymmetric ciphering algorithms.

After the server authoritatively receives the new module public key and derives the new shared secret key, the server can send the module a new "pre-shared secret key" such that the module can (i) record the new "pre-shared secret key" in a nonvolatile memory and (ii) utilize the new "pre-shared secret key" upon the requirement or need for the module to derive new public and private keys. In other words, the first "pre-shared secret key" may be loaded into nonvolatile memory by a manufacturer, distributor, installer, or end-user, in order for the module to securely send an initial derived public key, but subsequent new derivations of keys do not require external intervention, so long as the module and server agree on the "pre-shared secret key".

By securely receiving the module public key in a module encrypted data (using the pre-shared secret key than can be uniquely associated with the module and module identity), the security of communication between the module and server can be enhanced. The server and module preferably do not need to send the module public key to any other entities. Consequently, by the server securely receiving the module public key, the module and server can minimize the need for server digital signatures (with extra energy required to (i) process digital signatures and (ii) bandwidth required to transmit) in responses sent to the module. With secure operation and confidentiality for the module public key, only the server could send messages using the module public key (either for asymmetric ciphering or symmetric ciphering using a derived shared secret key), and thus the need for server digital signatures in responses to messages can be reduced. For security purposes, a server digital signature could still periodically be transmitted and included in a response, such as an exemplary time as once a day. Note that the module could also derive multiple sets of public keys and private keys, such that a different public key than the "confidential" public key described in this second exemplary embodiment, could be utilized in a certificate and made available to $3^{rd}$ parties. These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1g is a graphical illustration of a certificate that includes a public key infrastructure (PKI) key, where the public key utilizes an RSA algorithm, in accordance with exemplary embodiments;

FIG. 1h is an illustration of a certificate that includes a PKI public key, where the key comprises an elliptic curve cryptography (ECC) key, in accordance with exemplary embodiments;

FIG. 6 is a simplified message flow diagram illustrating an exemplary message received by a server, and an exemplary response sent from the server, in accordance with exemplary embodiments;

DETAILED DESCRIPTION OF EXEMPLARY EMBODIMENTS OF THE INVENTION

FIG. 1*a*

Figure 1A:
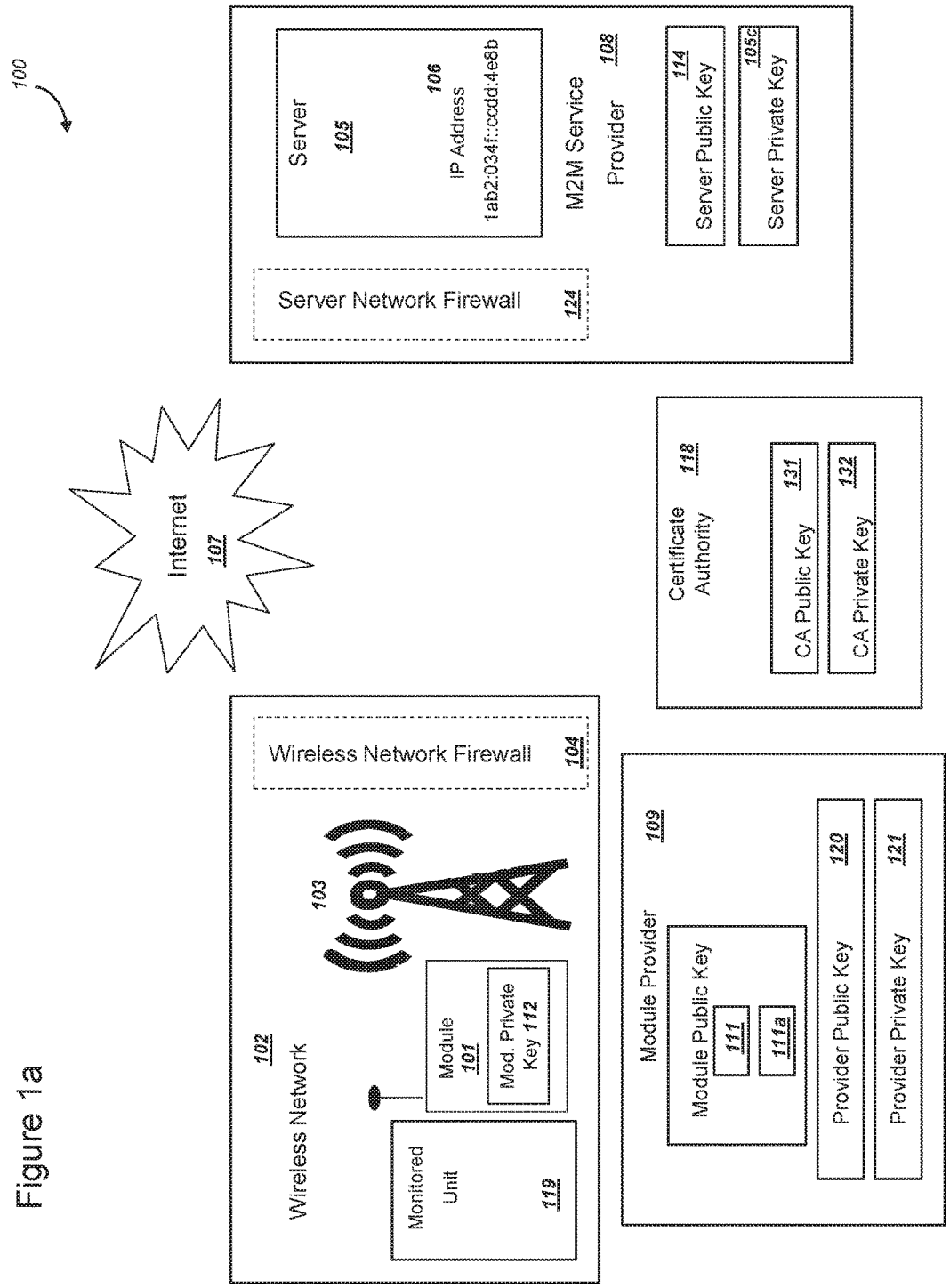
FIG. 1a is a graphical illustration of an exemplary system, where a server and a module connect to the Internet, in accordance with exemplary embodiments.

FIG. 1*a* is a graphical illustration of an exemplary system, where a server and a module connect to the Internet, in accordance with exemplary embodiments. The system 100 includes a module 101 operating within a wireless network 102. System 100 can also include a module provider 109, an Internet 107, and an M2M service provider 108, a certificate authority 118, and a monitored unit 119. M2M service provider 108 can include a server 105. System 100 is illustrated without specific packet transmissions between module 101 and M2M service provider 108. Examples of the communications and messages pertaining to the present invention will be illustrated in later Figures. As contemplated herein, machine-to-machine communications may comprise communication between a module 101 and a server 105, such that data can be transferred between the two with minimal manual intervention, although manual intervention can be required to set up system 100 and any occasional manual maintenance required. As contemplated herein, machine-to-machine communications may also be referred to as "the Internet of things" (IoT). Also note that module 101 may comprise a wireless module, such that module 101 can communicate with wireless network 102 using a radio and an antenna. Thus, either a wireless or a wired configuration for module 101 can be utilized in the present invention.

If module 101 operates as a wireless module, module 101 and wireless network 102 can communicate using a base station 103. Module 101 and wireless network 102 can utilize a variety of wireless technologies to communicate, including WiFi, WiMax, a 2nd generation wireless wide area network (WAN) technology such as General Packet Radio Services (GPRS) or Enhanced Data rates for GSM Evolution (EDGE), 3rd Generation Partnership Project (3GPP) technology such as 3G, 4G LTE, or 4G LTE Advanced, and other examples exist as well. A wired module 101 can connect to the Internet 107 via a wired connection such as an Ethernet, a fiber optic, or a Universal Serial Bus (USB) connection (not shown).

Generally, the communication techniques described herein can be independent of the network technologies utilized at the physical and data-link layers, so long as the underlying network provides access to the Internet 107 and supports Internet Protocols (IP). The Internet 107 can be an IPv4 or an IPv6 packet-switched based network that utilizes standards derived from the Internet Engineering Task Force, such as RFC 786 (User Datagram Protocol), RFC 793 (Transmission Control Protocol), and related protocols. The Internet 107 can be the public Internet comprising globally routable IP addresses, or a private network that utilizes private IP addresses. Although Internet 107 is illustrated as the globally routable public Internet in FIG. 1, Internet 107 could also be a private Internet that is (i) not globally routable and (ii) only accessible to authorized modules and servers. As one example of a private Internet 107, Internet 107 could use private IP addresses for nodes on the network, and in this case Internet 107 could be referred to as an intranet or private network. Alternatively, Internet 107 could be a private network layered on top of the publicly routable Internet via secured and encrypted connections.

When operating in a wireless network configuration, module 101 can access the Internet 107 via the wireless network 102. In the wireless network configuration, module 101 can be a wireless handset, a cellular phone, a smartphone, a tablet computer, a laptop, a computer with a radio, a tracking device, or a circuit board with a radio that accesses wireless network 102. Examples of wireless modules that utilize a wireless WAN such as 2G and 3G networking technologies include the Motorola® G24-1 and Huawei® MC323. Example manufacturers of wireless modules in 2012 include Sierra Wireless® and Telit®. In a wired configuration (not shown), module 101 can be a computer, security camera, security monitoring device, networked controller, etc. A more detailed depiction of exemplary components of a module 101 is included in FIG. 1*b* and FIG. 1*d* below.

Wireless network 102 may comprise either a wireless local area network (LAN) such as an 802.11 WLAN, Bluetooth, or Zigbee among other possibilities, and module 101 operating in wireless mode could communicate with a base station 103 of a wireless network 102 using a radio and an antenna. Wireless network 102 could operate as a Mode II device according to FCC Memorandum Opinion and Order (FC-12-36) and related white space regulation documents. If module 101 supports IEEE 802.15.4, then wireless network 102 could be a Zigbee network, an ISA100.11a standards-based network, or a 6LoWPAN network as described by IETF RFC 4944. Other possibilities exist as well for the wireless technology utilized by a wireless network 102 and module 101, operating in a wireless mode, without departing from the scope of the present invention.

Module 101 can collect data regarding a monitored unit 119 and periodically report status to an M2M service provider 108. Examples of a monitored unit 119 can include a vending machine, an alarm system, an automobile, a standard 40-foot or 20-foot shipping container. Additional examples of a monitored unit 119 include can also include a pallet for shipping or receiving goods, an individual box of pharmaceuticals, a health monitoring device attached to a person such as a pacemaker or glucose monitor, and a gate or door for opening and closing. Other examples exist as well without departing from the scope of the present invention. Module 101 can utilize a sensor to measure and collect data regarding a parameter of monitored unit 119 such as temperature, physical location potentially including geographical coordinates from a Global Positioning System (GPS) receiver, radiation, humidity, surrounding light levels, surrounding RF signals, weight, vibration and/or shock, and similar measurements. If monitored unit 119 is a person or a health monitoring device associated with a person, then relevant health data could be recorded by module 101 in order to transmit to a M2M service provider 108, which could be associated with a health service such as a hospital or doctor's office. Module 101 could also periodically record a picture, image, or video of or around monitored unit 119.

As illustrated in FIG. 1a, wireless network 102 may include a wireless network firewall 104 and M2M service provider 108 may include a server network firewall 124. These firewalls may be used to secure communication at the data link, network, transport, or application layer of communications using the Internet 107. Firewalls 104 and 124 could perform network address translation (NAT) routing or operate as symmetric firewalls, and selectively filter packets received through Internet 107 in order to secure system 100. The firewall functionality of firewalls 104 and 124 could be of many possible types, including a symmetric firewall, a network-layer firewall that filters inbound packets according to pre-determined rules, an application-layer firewall, or a NAT router, as examples. Although a single firewall 104 and 124 is illustrated in wireless network 102 and M2M service provider 108, respectively, firewall 104 and 124 may each comprise multiple firewalls that operate in conjunction and the combined operation may be considered a single firewall 104 and 124, respectively.

According to a preferred exemplary embodiment, module 101 may preferably record a module private key 112. As described in additional figures below, module 112 can generate a key pair comprising a module private key 112 and a module public key 111, where module private key 112 resides within module 101 and may not be shared or transmitted to other parties. Module 101 may also be associated with a module provider 109. Module provider 109 could be a manufacturer or distributor of module 101, or may also be the company that installs and services module 101 or associates module 101 with monitored unit 119. Although not illustrated in FIG. 1a, module provider 109 could deliver module 101 to an end-user, where the end-user associates module 101 with monitored unit 119. Module provider 109 can record a module public key 111 and a certificate 122 (illustrated below in FIG. 1g and FIG. 1h) for module 101. Module public key 111 may be associated with a module public key identity 111a, which could be an identifier of module public key 111.

As discussed below, a module 101 may utilize multiple module public keys 111 over the lifetime of module 101 (including multiple corresponding module private keys 112), and module public key identity 111a can be used to select and/or identify the correct module public key 111. Module public key identity 111a could be a string or sequence number uniquely associated with module public key 111. As illustrated in FIG. 1a, module public key identity 111a may preferably not be included in the string or number comprising module public key 111, but rather associated with the string or number comprising module public key 111, and in this case the two together (module public key identity 111a and the string or number for module public key 111) may be used to refer to module public key 111 as contemplated herein.

The module public key 111 can optionally be signed by a certificate authority 118 in order to confirm the identity of module 101 and/or the identity of module provider 109. Alternatively, module provider 109 may have its own provider public key 120 and provider private key 121. Module provider 109 may have its provider public key 120 signed by a certificate authority 118, and then module provider 109 could sign module public key 111. In this manner, module provider 109 can also function as a certificate authority for module 101. Thus, the validity of module public key 111 could be checked with module provider 109, and the wireless module provider's 109 provider public key 120 could be checked against certificate authority 118. Other configurations for signing public keys and using certificates with public keys are possible as well without departing from the scope of the present invention.

Public keys and private keys as contemplated in the present invention, including module public key 111 and module private key 112 and additional keys described herein, may leverage established standards for Public Key Infrastructure (PKI). These keys may be formatted according to the X.509 series of standards, such as X.509 v3 certificates, and subsequent or future versions, and these keys may be considered cryptographic keys. The keys can support standards such as the International Organization for Standardization (ISO) ISO/IEC 9594 series of standards (herein incorporated by reference) and the Internet Engineering Task Force (IETF) RFC 5280 titled "Internet X.509 Public Key Infrastructure Certificate and Certificate Revocation List (CRL) Profile" (herein incorporated by reference), including future updates to these standards.

Module public key 111 and module private key 112, as well as the other private and public keys described within the present invention, could be generated using standard software tools such as Openssl, and other tools to generate public and private keys exist as well. Public and private keys as contemplated herein could be recorded in a file such as a *.pem file (Privacy-enhanced Electronic Mail), a file formatted according to Basic Encoding Rules (BER), Canonical Encoding Rules (CER), or Distinguished Encoding Rules (DER), or as text or binary file. Other formats for public and private keys may be utilized as well, including proprietary formats, without departing from the scope of the present invention. As contemplated herein, a key may also comprise either a public key or a private key. A public key as contemplated herein may also be considered a certificate or a public certificate. A private key as contemplated herein may also be considered a security key or a secret key.

Other configurations besides the one illustrated in FIG. 1a are possible as well. Server 105 could reside within wireless network 102 in a data center managed by wireless network 102. Wireless network 102 could also operate as a module provider 109. Although a single module 101 and server 105 are illustrated in FIG. 1a, system 100 could comprise a plurality of each of these elements. Module 101 could also record sensor data pertaining to a plurality of monitored units 119. Module 101 could be mobile, such as physically attached to a truck or a pallet, and module 101 could connect to a series of different wireless networks 102 or base stations 103 as module 101 moves geographically. Other configurations are possible as well without departing from the scope of the present invention.

FIG. 1b

Figure 1C:
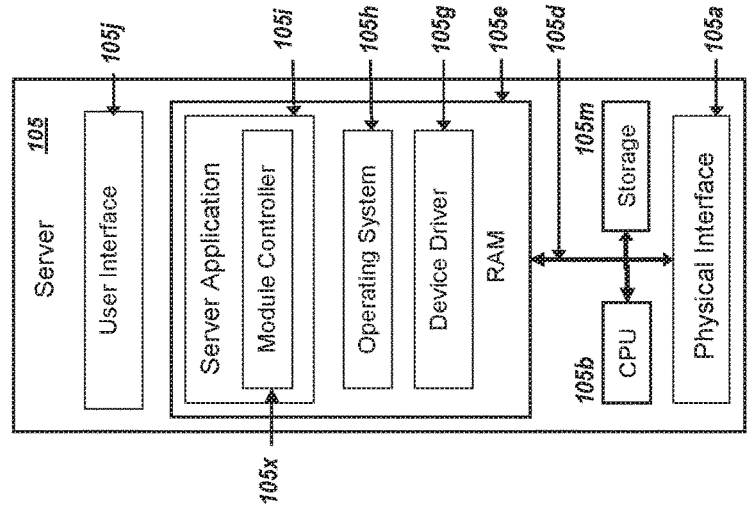
FIG. 1c is a graphical illustration of hardware, firmware, and software components for a server, in accordance with exemplary embodiments.
Figure 1B:
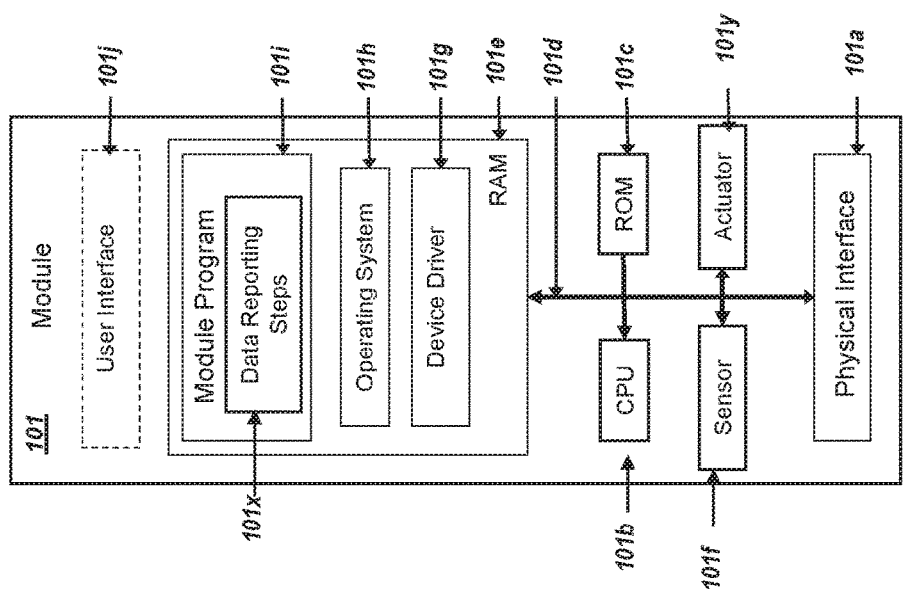
FIG. 1b is a graphical illustration of hardware, firmware, and software components for a module, in accordance with exemplary embodiments.

FIG. 1b is a graphical illustration of hardware, firmware, and software components for a module, in accordance with exemplary embodiments. FIG. 1b is illustrated to include many common components within a module 101, and module 101 may also operate in a wireless configuration in order to connect with a wireless network 102. Module 101 may consist of multiple components in order to collect sensor data or control an actuator associated with a monitored unit 119. In a wireless configuration, the physical interface 101a of module 101 may support radio-frequency (RF) communications with networks including a wireless network 102 via standards such as GSM, UMTS, mobile WiMax, CDMA, LTE, and/or other mobile-network technologies. In a wireless configuration, the physical interface 101a may also provide connectivity to local networks such as 802.11 WLAN, Bluetooth, or Zigbee among other possibilities. In a wired configuration, the physical interface 101a can provide connectivity to a wired network such as through an Ethernet connection or USB connection.

The physical interface 101a can include associated hardware to provide the connections such as radio-frequency (RF) chipsets, a power amplifier, an antenna, cable connectors, etc., and additional exemplary details regarding these components are described below in FIG. 1d. Device driver 101g can communicate with the physical interfaces 101a, providing hardware access to higher-level functions on module 101. Device drivers 101g may also be embedded into hardware or combined with the physical interfaces. Module 101 may preferably include an operating system 101h to manage device drivers 101g. The operating systems can also manage other resources such as memory and may support multiple software programs operating on module 101 at the same time. The operating system 101h can include Internet protocol stacks such as a User Datagram Protocol (UDP) stack, Transmission Control Protocol (TCP) stack, a domain name system (DNS) stack, etc., and the operating system 101h may include timers and schedulers for managing the access of software to hardware resources. The operating system shown of 101h can be appropriate for a low-power device with limited memory and CPU resources. An example operating system 101h for module 101 includes Linux, Android® from Google®, Windows® Mobile, or Open AT® from Sierra Wireless®. Additional example operating systems 101h for module 101 include eCos, uC/OS, LiteOs, and Contiki, and other possibilities exist as well without departing from the scope of the present invention.

A module program 101i may be an application programmed in a language such as C, C++, Java, and/or Python, and could provide functionality to support M2M applications such as remote monitoring of sensors and remote activation of actuators. Module program 101i could also be a software routine, subroutine, linked library, or software module, according to one preferred embodiment. As contemplated herein, a module program 101i may be an application operating within a smartphone, such as an iPhone® or Android®-based smartphone, and in this case module 101 could comprise the smartphone. The application functioning as a module program 101i could be downloaded from an "app store" associated with the smartphone. Module program 101i can include data reporting steps 101x, which can provide the functionality or CPU 101b instructions for collecting sensor data, sending messages to server 105, and receiving responses from server 105, as described in the present invention.

Many of the logical steps for operation of module 101 can be performed in software by various combinations of sensor 101f, actuator 101y, physical interface 101a, device driver 101g, operating system 101h, module program 101i, and data reporting steps 101x. When module 101 is described herein as performing various actions such as acquiring an IP address, connecting to the wireless network, monitoring a port, transmitting a packet, or encrypting or signing a message, specifying herein that module 101 performs an action can refer to software, hardware, and/or firmware operating within module 101 illustrated in FIG. 1b performing the action. Note that module 101 may also optionally include user interface 101j which may include one or more devices for receiving inputs and/or one or more devices for conveying outputs. User interfaces are known in the art and generally are simple for modules such as a few LED lights or LCD display, and thus user interfaces are not described in detail here. As illustrated in FIG. 1b, module 101 can optionally omit a user interface 101j, since no user input may be required for many M2M applications, although a user interface 101j could be included with module 101.

Module 101 may be a computing device that includes computer components for the purposes of collecting data from a sensor 101f or triggering an action by an actuator 101y. Module 101 may include a central processing unit (CPU) 101b, a random access memory (RAM) 101e, and a system bus 101d that couples various system components including the random access memory 101e to the processing unit 101b. The system bus 101d may be any of several types of bus structures including a memory bus or memory controller, a peripheral bus, and a local bus using any of a variety of bus architectures including a data bus. Note that the computer components illustrated for the module 101 in FIG. 1b may be selected in order to minimize power consumption and thereby maximize battery life, if module 101 includes a battery and is not attached to external power. In addition, the computer components illustrated for the module 101 in FIG. 1b may also be selected in order to optimize the system for both long periods of sleep relative to active communications and also may be optimized for predominantly uplink (i.e. device to network) communications with small packets or messages.

Module 101 may include a read-only memory (ROM) 101c which can contain a boot loader program. Although ROM 101c is illustrated as "read-only memory", ROM 101c could comprise long-term memory storage chipsets or physical units that are designed for writing once and reading many times. As contemplated within the present invention, a read-only address could comprise a ROM 101c memory address or another hardware address for read-only operations accessible via bus 101d. Changing data recorded in a ROM 101c can require a technician have physical access to module 101, such as removing a cover or part of an enclosure, where the technician can subsequently connect equipment to a circuit board in module 101, including replacing ROM 101c. ROM 101c could also comprise a nonvolatile memory, such that data is stored within ROM 101c even if no electrical power is provided to ROM 101c. Although not illustrated in FIG. 1b, but illustrated in FIG. 1d below, module 101 could also include a flash memory 101w. A primary difference between flash memory 101w and RAM 101e may be that reading and writing operations to flash memory 101w can be slower whereas reading and writing operations to RAM 101e may be faster, and faster reading and writing operations to memory may be required for processing sensor 101f signals and securely communicating with a server. For example, module program 101i, data reporting steps 101x, operating system 101h, or device driver 101g could be stored in flash memory 101w when the module is powered off. These components and/or instructions could be and moved into RAM 101e when the module is powered on. In addition, RAM 101e can function as flash memory, such that module program 101i, power control steps 101x, operating system 101h, or device driver 101g remain resident in random access memory even when the mobile module 101 is powered off, or powered off for the first time after module 101 is installed or becomes active in wireless network 102. Note that ROM 101c could be optionally omitted or included in a memory unit within CPU 101b (not shown).

Although the exemplary environment described herein employs ROM 101c and RAM 101e, it should be appreciated by those skilled in the art that other types of computer readable media which can store data that is accessible by a module 101, such as memory cards, subscriber identity module (SIM) cards, local miniaturized hard disks, and the like, may also be used in the exemplary operating environment without departing from the scope of the invention. The memory and associated hardware illustrated in FIG. 1b provide nonvolatile storage of computer-executable instructions, data structures, program modules, module program 101i, and other data for computer or module 101. Note the module 101 may include a physical data connection at the physical interface 101a such as a miniaturized universal serial bus adapter, firewire, optical, or other another port and the computer executable instructions such as module program 101i, data reporting steps 101x, operating system 101h, or device driver 101g can be initially loaded into memory such as ROM 101c or RAM 101e through the physical interface 101a before module 101 is given to an end user, shipped by a manufacturer to a distribution channel, or installed by a technician. In addition, the computer executable instructions such as module program 101i, data reporting steps 101x, operating system 101h or device driver 101g could be transferred wirelessly to module 101. In either case (wired or wireless transfer of computer executable instructions), the computer executable instructions such as module program 101i, data reporting steps 101x, operating system 101h, or device driver 101g could be stored remotely on a disk drive, solid state drive, or optical disk (external drives not shown).

A number of program modules may be stored in RAM 101e, ROM 101c, or possibly within CPU 101b, including an operating system 101h, device driver 101g, an http client (not shown), a DNS client, and related software. Program modules include routines, sub-routines, programs, objects, components, data structures, etc., which perform particular tasks or implement particular abstract data types. Aspects of the present invention may be implemented in the form of a module program 101i and/or data reporting steps 101x which are executed by the module 101 in order to provide remote monitoring using a sensor 101f and/or remote control using an actuator 101y. In addition, the module program 101i and/or data reporting steps 101x can include routines, sub-routines, and similar components to support secure and bandwidth and radio-frequency (RF) efficient communication with a server 105 utilizing the techniques described in the present invention. Further, the module program 101i and/or data reporting steps 101x can perform the various actions described in the present invention for the module through instructions the module program 101i and/or data reporting steps 101x provide to the CPU 101b.

A user may enter commands and information into module 101 through an optional user interface 101j, such as a keypad, keyboard (possibly miniaturized for a mobile phone form-factor), and a pointing device. Pointing devices may include a trackball, an electronic pen, or a touch screen. A user interface 101j may also include a display (not shown) such as a module screen. A display may also be connected to system bus 101d via an interface. The display can comprise any type of display devices such as a liquid crystal display (LCD), a plasma display, and an organic light-emitting diode (OLED) display. Module 101 may also include a camera (not shown) connected to or integrated with module 101 through a physical interface 101a, and the camera can comprise a video camera for the wireless device 101 to collect sensor data that includes video or images. The camera (not shown) can be a CCD (charge-coupled device) camera, a CMOS (complementary metal-oxide-semiconductor) camera, or a similar device to collect video input. Other arrangements could be used as well, without departing from the invention.

The module 101, comprising a computer, may operate in a networked environment using logical connections to one or more remote computers, such as the server 105 illustrated in FIG. 1a. Server 105 can also function as a general purpose server to provide files, programs, disk storage, remote memory, and other resources to module 101 usually through a networked connection. Additional details regarding server 105 are provided in FIG. 1c below. Additional remote computers with which module 101 communicates may include another wireless module or mobile device, an M2M node within a capillary network, a personal computer, other servers, a client, a router, a network PC, a peer device, or other common network node. The server 105 or a remote computer typically includes many of the elements described above relative to the module 101, including a CPU, memory, and physical interfaces. It will be appreciated that the network connections shown throughout the present invention are exemplary and other means of establishing a wireless or wired communications link may be used between mobile devices, computers, servers, corresponding nodes, and similar computers.

The module program 101i and data reporting steps 101x operating within module 101 illustrated in FIG. 1b can provide computer executable instructions to hardware such as CPU 101b through a system bus 101d in order for a module 101 to (i) collect data from a sensor, (ii) change the state of an actuator 101y, and (iii) send or receive packets with a server 105, thus allowing server 105 to remotely monitor or control a monitored unit 119. The module program 101i and/or data reporting steps 101x can enable the module 101 to transmit or send data from sensor 101f or module 101 by recording data in memory such as RAM 101e, where the data can include as sensor data, a destination IP:port number, a packet or packet header value, an encryption or ciphering algorithm and key, a digital signature algorithm and key, etc., and the data can be subsequently read by the operating system 101h or the device driver 101g. The operating system 101h or the device driver 101g can write the data to a physical interface 101a using a system bus 101d in order to use a physical interface 101a to send data to a server 105. Alternatively, the module program 101i and/or data reporting steps 101x can write the data directly to the physical interface 101a using the system bus 101d.

The module program 101i and/or data reporting steps 101x, or operating system 101h can include steps to process the data recorded in memory such as encrypting data, selecting a destination address, or encoding sensor data acquired by a sensor 101f or through a physical interface 101a such as a thermocouple, shock or vibration sensor, light sensor, or global positioning system (GPS) coordinates, etc. The module 101 can use the physical interface 101a such as a radio to transmit or send the data from a sensor to a base station 103. For those skilled in the art, other steps are possible as well for a module program 101i or operating system 101h to collect data from a sensor 101f and send the data in a packet without departing from the scope of the present invention.

Conversely, in order for module 101 to receive a packet or response from server 105, the physical interface 101a can use a radio to receive data from a base station 103. The received data can include information from a server 105 and may comprise a datagram, a source IP:port number, a packet or header value, an instruction for module 101, an acknowledgement to a packet module 101 sent, a digital signature, and/or encrypted data. The operating system 101*h* or device driver 101*g* can use a system bus 101*d* and CPU 101*b* to record the received data in memory such as RAM 101*e*, and the module program 101*i* or operating system 101*h* may access the memory in order to process the received data and determine the next step for the wireless module after receiving the data. Processing the received data could include deciphering or decrypting received data with a key, verifying a digital signature with a key, reading an instruction from a server 105, or similar transformations of the received data. The steps within this paragraph may also describe the steps a module program 101*i* or data reporting steps 101*x* can perform in order to receive a packet. For those skilled in the art, other steps are possible as well for a module program 101*i*, data reporting steps 101*x*, or module 101 to receive a packet or response from a server 105 without departing from the scope of the present invention.

Moreover, those skilled in the art will appreciate that the present invention may be implemented in other computer system configurations, including hand-held devices, netbooks, portable computers, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices. In addition, the terms "mobile node", "mobile station", "mobile device", "M2M module", "M2M device", "networked sensor", or "industrial controller" can be used to refer to module 101 or its functional capabilities of collecting sensor data regarding a monitored unit 119, changing state of an actuator 101*y* associated with monitored unit 119, or communicating the data associated with a monitored unit 119 with a wireless network 102. The function of module 101 and sensor 101*f* could be integrated, and in this case module 101 could also be referred to as a "sensor", or an "intelligent sensor". Further, the term "module" or "monitoring device" can be used to refer to the module program 101*i* when module program 101*i* provides functional capabilities such as reporting data from a sensor 101*f* to a server 105 or receiving instructions for an actuator 101*y* from a server 105. The device driver 101*i*, operating system 101*i*, and/or module program 101*i* could optionally be combined into an integrated system for providing the module 101 functionality.

FIG. 1*c*

FIG. 1*c* is a graphical illustration of hardware, firmware, and software components for a server, in accordance with exemplary embodiments. The illustrated components for the server 105 in FIG. 1*c* include a central processing unit (CPU) 105*b*, a random access memory (RAM) 105*e*, a system bus 105*d*, storage 105*m*, an operating system 105*h*, and a server application 105*i*. These elements can provide functions equivalent to the central processing unit (CPU) 101*b*, RAM 101*e*, system bus 101*d*, flash memory 101*w*, and an operating system 101*h* described above in FIG. 1*b*, respectively. In general, a server 105 will have higher-end components such as a larger CPU 101*b* and greater RAM 105*e* in order to support communications with a plurality of modules 101. Operating system 101*h* can comprise an operating system appropriate for a server such as Linux, Solaris®, or Windows® Server. Server 105 can preferably have a wired Ethernet connection with high bandwidth that is persistently connected to the Internet 107 illustrated in FIG. 1*a*, while the Internet 107 connection for module 101 may be transient as module 101 changes between sleep and active states. Server application 105*i* can provide the server-side logic for managing communications and controlling module 101 in a module controller 101*x*.

A server application 105*i* and/or module controller 101*x* may be an application programmed in a language such as C, C++, Java, or Python and could provide functionality to support M2M applications such as remote monitoring of sensors and remote activation of actuators. Server application 105*i* can include a module controller 105*x*. Server application 105*i* and/or module controller 105*x* could also be a software routine, subroutine, linked library, or software module, according to one preferred embodiment. Server application 105*i* can include a module controller 105*x*, which can provide the functionality or CPU 105*b* instructions for the module controller 105*x* described in the present invention. Many of the logical steps for operation of server 105 or server application 105*i* can be performed in software by various combinations of physical interface 105*a*, device driver 105*g*, operating system 105*h*, module controller 101*i*, and data reporting steps 101*x*. When server 105 is described herein as performing various actions such as acquiring an IP address, monitoring a port, transmitting a packet, or encrypting or signing a message, specifying herein that server 105 performs an action can refer to software, hardware, and/or firmware operating within server 105 performing the action.

The server 105 may also include a user interface 105*j* such as a display (not shown) which could also comprise any type of display devices such as a liquid crystal display (LCD), a plasma display, and an organic light-emitting diode (OLED) display, or a cathode ray tube (CRT). A user interface 105*j* for the server 105 may optionally be provided remotely such as (i) via a web browser or a secure terminal such as secure shell (SSH) with (ii) another computer operated by an administrator (not shown). A user or administrator may enter commands and information into server 105 through a user interface 105*j*, such as a keypad, keyboard, and a pointing device. Pointing devices may include a trackball, an electronic pen, or a touch screen. In addition, the server 105 may store computer executable instructions such as server application 105*i* on storage 105*m*. Storage 105*m* may comprise a disk drive, a solid-state drive, an optical drive, or a disk array. The server application 105*i* and/or module controller 101*x* can manage communications with module 101 and may be downloaded and installed on the server 105. As noted previously and elsewhere herein, module program 101*i* and server application 105*i* can preferably interoperate with each other in order to collect sensor data and control an actuator associated with a monitored unit 119.

The server program 105*i* and/or module controller 101*x* operating within server 105 illustrated in FIG. 1*c* can provide computer executable instructions to hardware such as CPU 105*b* through a system bus 105*d* in order to (i) receive a message from the module 101 and (ii) send a response, wherein the message can include sensor 101*f* data and the response can include an acknowledgement of the message and/or an instruction to the module 101. The server program 105*i* can enable the server 105 to send a response to a message from module 101 by recording data associated with module 101 in memory such as RAM 105*e*, where the data can include an instruction from module 101, a destination IP:port number, a packet or packet header value, an encryption or ciphering algorithm or key, a digital signature algorithm or key, etc. The operating system 105h or the device driver 105g can write the data from RAM 105e to a physical interface 105a using a system bus 105d and an Ethernet connection in order to send the data via the Internet 107 illustrated in FIG. 1a. Alternatively, the software program 105i and/or module controller 105x can write the data directly to the physical interface 105a using the system bus 105d.

The server 105 can utilize the physical interface 105a to receive data from a module 101 using a local area network such as Ethernet. The server 105 can listen for data from the Internet 107 using port number and/or a TCP/UDP socket. The received data can be a message formatted according to an Internet packet or datagram inside an Ethernet packet and include information from a module 101 such as a source IP address and port number, an identity of the module, sensor data that may be encrypted, and a digital signature of the module. The operating system 105h or device driver 105g can record the received data from module 101 via physical interface 105a in memory such as RAM 105e, and the server program 105i or operating system 105h may access the memory in order to process the data received. The server program 105i and/or module controller 105x, or operating system 105h can include steps to process the data recorded in memory and received from the module 101 such as parsing the received packet, decrypting data, verifying a digital signature with a key, or decoding sensor data included in a message from the wireless module. The server 105 can use the physical interface 105a such as an Ethernet connection to receive the data from the Internet 107. For those skilled in the art, other steps are possible as well for a server program 105i or operating system 105h within a server 105 to receive a packet or message with data from a module 101 and process the data without departing from the scope of the present invention.

The device drivers 105g, operating systems 105h, and/or server application 105i could optionally be combined into an integrated system for providing the server 105 functionality. Although a single physical interface 105a, device-driver set 105g, operating system 105h, server application 105i, and user interface 105j are illustrated in FIG. 1c for server 105, server 105 may contain multiple physical interfaces, device drivers, operating systems, software programs, and/or user interfaces. Server 105 may operate in a distributed environment, such that multiple computers operate in conjunction through a network to provide the functionality of server 105. Also, server 105 may operate in a "virtualized" environment, where server 105 shares physical resources such as a physical CPU 105b with other processes operating on the same computer. And other arrangements could be used as well, without departing from the invention.

FIG. 1d

Figure 1E:
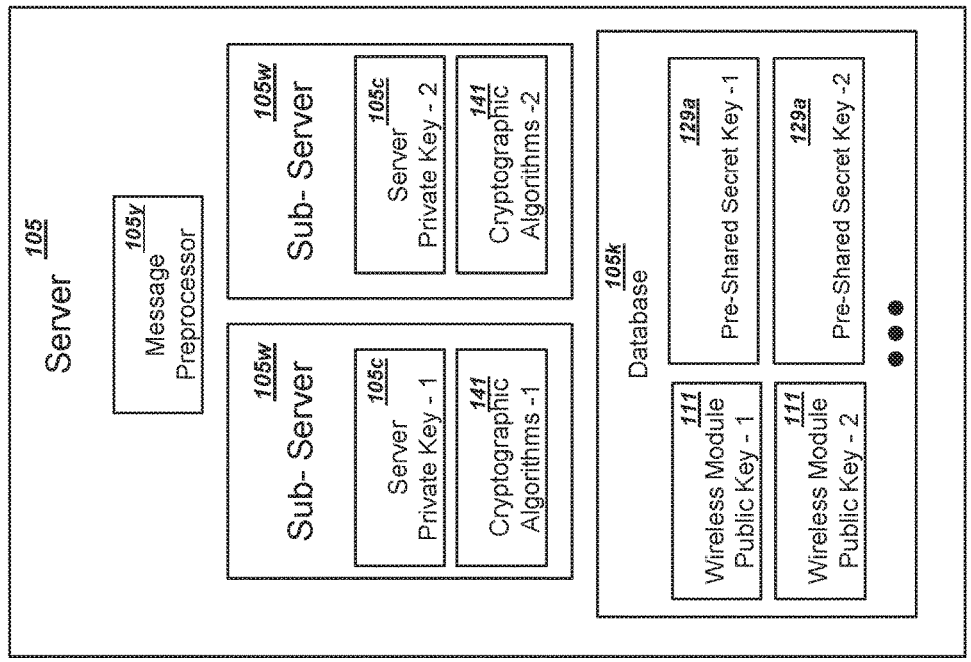
FIG. 1e is a graphical illustration of the components within a server that communicates with the module, in accordance with exemplary embodiments.
Figure 1D:
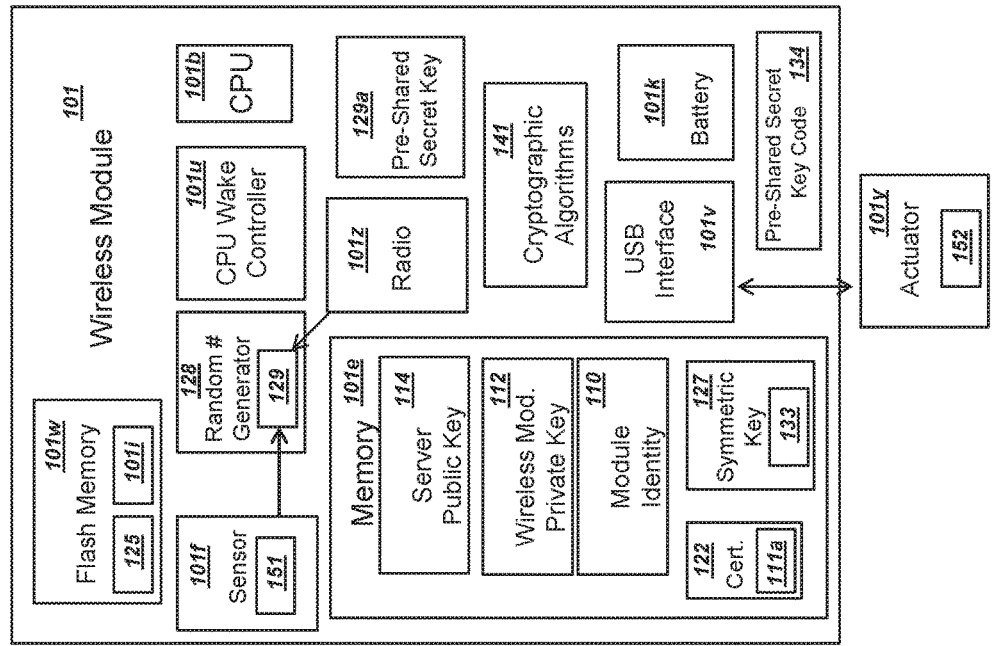
FIG. 1d is a graphical illustration of the components within a module, in accordance with exemplary embodiments.

FIG. 1d is a graphical illustration of the components within a module, in accordance with exemplary embodiments. FIG. 1d is illustrated to show a combination of components useful for leveraging the efficient and secure communication techniques described in the present invention. In addition to the components illustrated in FIG. 1b above, module 101 can include a battery 101k, a server public key 114, a wireless module private key 112, a connection to an actuator 101y, a USB interface 101v, a CPU wake controller 101u, a flash memory 101w, a symmetric key 127, a pre-shared secret key 129a, a random number generator 128, cryptographic algorithms 141, a radio 101z, and other components illustrated in FIG. 1d.

The CPU 101b can comprise a general purpose processor appropriate for the low power consumption requirements of a module 101, and may also function as a microcontroller. In a preferred exemplary embodiment, the CPU 101b is responsible for maintaining a state machine for network and transport layer commands with an external network such as the wireless network 102 illustrated in FIG. 1a, where CPU 101b can manage the overall connection of radio 101z with a wireless network 102. CPU 101b can include additional elements not shown, such as registers, cache memory, an arithmetic logic unit (ALU), which performs arithmetic and logical operations, and a control unit (CU), which extracts instructions from memory and decodes and executes them, calling on the ALU when necessary. The CPU 101b wake and dormant or sleep states may be controlled by a CPU wake controller 101u to put the module 101 in a dormant state in order to conserve battery life in battery 101k when sensor measurements, actuator control, or radio communications are not needed. The CPU wake controller 101u could optionally be integrated into CPU 101b. The CPU wake controller 101u can also include a timer to periodically wake the CPU 101b in order to perform sensor measurements or communicate with a wireless network 102 or server 105. The flash memory 101w can be a non-volatile memory and may contain a bootloader program 125 and a module program 101i. Bootloader program 125 can comprise a software program or application that is initially read by CPU 101b upon power up of module 101 in order to configure interfaces and begin operations including loading module program 101i. Module program 101i is depicted and described in connection with FIG. 1b above.

Note that CPU wake controller 101u can monitor sensor 101f in order to determine a wake condition for CPU 101b, wherein the CPU 101b remains dormant until sensor 101f reads a state that requires sending a message to a server 105. An example could be sensor 101f comprising a shock and vibration detector or a temperature measuring device such as a thermocouple, and other examples exist as well. The CPU wake controller 101u can leave CPU 101b in a dormant state until a certain threshold of shock and vibration or temperature is recorded by the sensor 101f, and in this manner battery 101k can be conserved so that CPU 101b wakes when a threshold sensor measurement or an alarm condition is reported. The exemplary certain threshold of shock and vibration or temperature recorded by the sensor 101f can also comprise an alarm condition. When CPU 101b is dormant, CPU wake controller 101u can monitor a voltage level output by sensor 101f, and once a threshold voltage level is read by CPU wake controller 101u, CPU wake controller 101u can change CPU 101b from the dormant state to an active state in order to run a module program 101i.

Even without an alarm condition, CPU wake controller 101u can periodically wake CPU 101b to collect sensor data, connect to an external network such as a wireless network 102, and send sensor data to server 105. CPU 101b can include one or more cores of the processor, where each core is an independent actual central processing unit, and the cores can be the units that read and execute program instructions. The instructions can be ordinary CPU instructions such as add, move data, and branch. The dormant state of CPU 101b can comprise a sleep state where a power level used by a core in the processor is less than 0.010 milliwatts during a one second measurement sample, such as when the power supply is essentially removed from the core but power is supplied to memory 101e in order to allow a rapid waking of the CPU 101b or core.

Sensor 101f could be a device to collect environmental data or data regarding a monitored unit 119. Sensor 101f could collect data such as temperature, humidity, pressure, visible light levels, radiation, shock and/or vibration, voltage, current, weight, pH levels, orientation/motion, or the presence of specific chemicals. Sensor 101f could also collect biometric data such as heart rate, glucose levels, body temperature, or other health measurements and in this case monitored unit 119 could be a person. The sensor 101f can provide data to the CPU 101b in the form of analog or digital data, which can be communicated via a system bus 101d or physical interface 101a and other electrical interfaces are possible as well. A sensor measurement can comprise the analog or digital data collected by CPU 101b from sensor 101f. A sensor measurement can include processing of the analog or digital data input CPU 101b by sensor 101f, such as averaging over time, using mathematic formulas to convert the raw data from sensor 101f into a usable form. Module 101 may also collect sensor data or sensor values using a sensor 101f and CPU 101b, where the data or values are derived from electrical signals output by a sensor 101f. A sensor measurement can comprise the sensor data or sensor values.

As contemplated herein, the terms "sensor measurement" and "sensor data" can be used interchangeably, and can also be considered functionally equivalent. Although a single sensor 101f is shown in FIG. 1d, a module 101 could include multiple sensors. Each of the multiple sensors 101f could include a sensor identity 151, which could comprise a number or string to identify the sensor 101f. Or, a sensor identity 151 could also be used with a single sensor 101f. In addition, although sensor 101f is shown as integrated into module 101, sensor 101f could be external to module 101, and connected via an external interface such as through a USB interface 101v.

Note that sensor 101f could also connect to module 101 via a WiFi or similar wireless LAN connection such as Zigbee. Radio 101z within module 101 can operate as a WiFi base station (in addition to radio 101z connecting to a wireless network 102), and sensor 101f could contain its own radio and WiFi chipset, such that sensor 101f could send sensor data to module 101 via the WiFi connection (or other wireless LAN connection). In this manner, by utilizing WiFi to connect with sensor 101f, module 101 could connect with a plurality of sensors 101f located in a vicinity of module 101, such as within an exemplary 50 meters. Although a WiFi network was primarily described, sensor 101f and/or actuator 101y could connect with module 101 via any suitable wireless local area networking technology including, IEEE 802.11, IEEE 802.15.4, an ISA100.11a standards-based network, and/or a 6LoWPAN.

Actuator 101y could be a device to control a parameter or state for a monitored unit 119, such as changing a voltage or current, activating a switch or relay, turning on or off a microphone or speaker, activating or deactivating a light, and other examples are well known in the art. Actuator 101y could be controlled by module 101 via a digital or analog output from CPU 101b, which could also be transmitted or sent via system bus 101d or a physical interface 101a. Although actuator 101y is illustrated as external to wireless module 101 in FIG. 1c, actuator 101y could also be internal to module 101, and module 101 could include multiple actuators 101y. Although a single actuator 101y is shown in FIG. 1d, a module 101 could include multiple actuators 101y. Each of the multiple actuators 101y could include an actuator identity 152, which could comprise a number or string to identify the actuator 101y. Or, an actuator identity 152 could also be used with a single actuator 101y. Sensors and actuators are well known to those of ordinary skill in the art, and thus are not described in detail herein.

Module 101 can include a Universal Serial Bus (USB) interface 101v, which could provide a general and standards-based interface for external connection to a wide variety of sensors 101f, actuators 101y, and external computers such as laptops or mobile phones. Module 101 could also obtain power or recharge a battery 101k through the USB interface 101v. Software programs or instructions to wireless module 101 could be provided locally through USB interface 101v, including the initial loading of a pre-shared secret key 129a and/or shared secret key 813 described in FIG. 8 below. Module program 101i, operating system 101h, or module private key 112 could be loaded into module 101 via USB interface 101v. In order to support a preferred small form factor of a module 101, the USB interface 101v could preferably utilize either a micro-USB or mini-USB physical interface, or future similar miniature USB interfaces related to these standard interfaces. Although a USB interface 101v is illustrated in FIG. 1d, alternative interfaces for external communication could be provided, such as a Joint Test Action Group (JTAG) connection, optical, or a proprietary interface such as a "Lightning" connection from Apple, Inc.

In accordance with an exemplary embodiment, module 101 can comprise a wireless module and include a radio 101z. Note that the use of a radio 101z is not required for module 101, which could also obtain a connection to the Internet 107 via a wired line such as Ethernet. Although not illustrated, radio 101z could include antennas for reception and transmission of RF signals, and even multiple antennas could be used. Although a single radio 101z is illustrated in module 101, module 101 could also contain multiple radios 101z, such that a first radio 101z connects with a WiFi network or functions as a WiFi base station, a second radio 101z connects with a PLMN mobile network, and a third radio 101z connects with a wireless network operating in white-space spectrum, etc. Or, a single radio 101z could be utilized to connect with multiple wireless networks 102 operating in different frequencies with different RF modulation techniques and/or different RF standards.

Radio 101z can support wireless LAN standards such as WiFi, Bluetooth, and Zigbee, or similar wireless LAN standards. Radio 101z, if present in a module 101, could also support communication through "white space" spectrum white space spectrum recently approved for use by the Federal Communications Commission (FCC), and in this case radio 101z in module 101 could operate as a Mode I or Mode II device according to FCC Memorandum Opinion and Order (FC-12-36) and related white space regulation documents. Radio 101z can also be selected to support the desired wireless wide area network (WAN) standards associated with a public land module network (PLMN) such as GPRS, UMTS, LTE and the appropriate frequency band, such at 700 Mhz (LTE), 900 or 1800 Mhz (GPRS), and 2100 Mhz (UMTS), etc. When connecting to a wireless network 102, a module 101 can (i) send or transmit data and (ii) receive data using the steps depicted and described in connection with FIG. 1c of U.S. patent application Ser. No. 14/023,181 (the contents of which are hereby incorporated by reference in their entirety). In general, the radio components of radio 101z are well known to one of ordinary skill in the art, and the present invention leverages this widespread commercial use and knowledge of a radio 101z in a novel manner, in order to increase efficiency, flexibility, and security of a system 100.

Note that module 101 may also operate as a base station in a wireless LAN, such as an 802.11 base station. When module 101 operates a wireless LAN, radio 101z can function as either a client/node or a base station to support communication from other wireless nodes in physical proximity, such as other nodes within an exemplary 50 meters. The other wireless nodes could comprise a sensor 101f and/or actuator 101y, and in this case a sensor could be referred to as a "networked sensor" and an actuator could be referred to as a "networked actuator". When radio 101z functions as a base station, module 101 can operate as a gateway, providing Internet access to these other nodes or modules 101 within the wireless LAN. Radio 101z can simultaneously function (i) as a base station in a wireless LAN, such as WiFi, and (ii) a client/subscriber on a wireless WAN such as a PLMN. Radio 101z can be selected to support multiple different wireless LAN technologies in addition to WiFi, such as the IEEE 802.15.4 standard or Bluetooth. If radio 101z supports IEEE 802.15.4, then wireless network 102 could be a Zigbee network, an ISA100.11a standards-based network, or a 6LoWPAN network as described by IETF RFC 4944.

In accordance with exemplary embodiments, module 101 can store module private key 112, server public key 114, and module identity 110, and a symmetric key 127 in memory/RAM 101e during operation, such as when CPU 101b is active and the module 101 is connected to a network such as a wireless network 102 during data transmissions. Module private key 112 preferably is recorded in nonvolatile memory such as flash memory 101w, so that module 101 has access to its private key 112 after the private key has been derived or loaded, including times when a battery 101k has been fully drained or removed from module 101 (if module 101 does not utilize a persistent power source such as land-line power). Module private key 112 and module identity 110 could be written into ROM 101c upon manufacture or distribution of module 101, although module 101 can also derive module private key 112 in accordance with exemplary embodiments and store the module private key 112 in a flash memory 101w. The CPU 101b preferably moves module private key 112 and module identity 110 from nonvolatile memory into volatile memory before sending data through an Internet 107 illustrated in FIG. 1a, in order to speed computations. As a minimum, module private key 112 and module identity 110 will need to be loaded into registers of CPU 101b during computations or use of cryptographic algorithms that require module private key 112 and/or module identity 110, and this move of the data into registers of CPU 101b constitutes a move or copy of module private key 112 and module identity 110 into volatile memory.

Symmetric key 127 can be a secure, shared private key for use with symmetric encryption or symmetric ciphering algorithms 141b. Symmetric key 127 can be derived by using module public key 111 and/or server public key 114, possibly through the use of a key derivation function 141f. Symmetric key 127 can be used for both encryption and decryption with symmetric cryptographic algorithms 141b described in FIG. 1f below, where a shared secret key can be used to both encrypt/cipher and decrypt/decipher. Symmetric key 127 may also include an expiration time 133, such that symmetric key 127 may only be used by module 101 during a limited period of time, such symmetric key 127 remaining only valid for a day, or a week, or during a session (where the session comprises multiple messages and/or responses between a module 101 and a server 105), etc. Module 101 can also derive symmetric key 127 according to the Elliptic Curve Integrated Encryption Scheme (ECIES) and/or ECDH 159, discussed in FIG. 1f below, using module public key 111, server public key 114, and a random number from random number generator 128. ECIES could be included in cryptographic algorithms 141. A summary of ECIES shared key derivation is described the Wikipedia article "Integrated Encryption Scheme" from Sep. 18, 2013 (herein incorporated by reference). Other possibilities for shared key derivation function using public keys are possible as well, including a Diffie-Hellman key exchange. Using a derived symmetric key from the exemplary key derivation function ECIES, module 101 could derive a second symmetric key 127 after the expiration time 133 of the first symmetric key 127 had transpired.

Note that a key derivation function using public keys is not required to generate a shared symmetric key 127, and alternatively a shared symmetric key 127 could be generated by any of module 101, server 105, module provider 109, or M2M service provider 108. If module 101 generates shared symmetric key 127 for symmetric ciphering 141b within a cryptographic algorithms 141, then module 101 can send shared symmetric key 127 to server 105 using an asymmetric ciphering depicted and described in connection with FIG. 4a below. In this case, module 101 preferably uses a random number generator 128 to generate a random number for input into cryptographic algorithms 141, and the seed 129 in random number generator 128 could utilize data from a sensor 101f in order to generate a random number with high entropy in the creation of symmetric key 127. If server 105 or M2M service provider 108 generates the symmetric key 127, server 105 can send module 101 the symmetric key 127 securely using asymmetric ciphering 141a depicted and described in connection with FIG. 5a and FIG. 1f below.

Module identity 110 is preferably a unique identifier of module 101, and could comprise a number or string such as a serial number, an international mobile subscriber identity number (IMSI), international mobile equipment identity (IMEI), or an Ethernet media access control (MAC) address. According to an exemplary embodiment, module identity 110 can also comprise a serial number or string that is written into hardware of module 101 upon manufacturing or distribution of module 101. In this case, module identity 110 could be recorded a read only memory 101c, where read only memory 101c could not be easily erased or otherwise tampered with. Or, module 101 could read module identity 110, which could be written into hardware by a manufacturer, distributor, or module provider 109, by using a device driver 101g that reads a hardware address containing the module identity 110 using the bus 101d. Module 101 can read the module identity 110 by accessing a read-only address using the bus 101d. In either case, module identity 110 may preferably be permanently or persistently associated with the physical hardware of module 101, which can be helpful for the security procedures contemplated herein. Module identity 110 can function as a basic identifier for services from M2M service provider 108 or server 105 in order to properly identify module 101 among a plurality of modules. Module private key 112 and module public key 111 could be unique to module 101 and uniquely associated with module identity 110, according to a preferred embodiment.

As contemplated herein, a module identity 110 can also have more than one use. A first module identity 110 could comprise a serial number for the physical hardware of module 101, as described in the paragraph above. A second module identity 110 could also comprise a session identifier, for data sessions between module 101 and server 105, where the session identifier can be uniquely associated by a server 105 to module 101. In the case where module identity 110 has more than one use, format, or representation, the module identity 110 associated with or written into hardware of module 101 (and potentially read from a read-only address in module 101) would preferably comprise the module identity 110 used in a certificate 122. Since a module 101 may utilize multiple module public keys 111 and module private keys 112 over its lifetime, a certificate 122 for module 101 can preferably include both (i) the module identity 110 (such as a serial number for the physical hardware of module 101) and (ii) a module public key identity 111a in order to specify the particular module public key 111 associated with certificate 122. The use of a module public key identity 111a in a certificate 122 is also described in FIG. 1g and FIG. 1h below.

Further, as contemplated herein, a module identity 110 could also comprise more than one physical string or number, such as a first string when module 101 connects with a first M2M service provider 108 or first wireless network 102, and module identity 110 could comprise a second string when module 101 connects with a second M2M service provider 108 or second wireless network 102. The first M2M service provider 108 or first wireless network 102 may have a first requirement or specification for the format, length, structure, etc. of module identity 110, and the second M2M service provider 108 or second wireless network 102 may have a second requirement or specification for the format, length, structure, etc. of module identity 110.

Server public key 114 in module 101 could be obtained from downloading the key over the Internet 107, or optionally also written into nonvolatile memory of module 101 upon manufacture or distribution. Server public key 114 could be obtained using a domain name or Internet address that is recorded in nonvolatile memory upon the configuration of module 101, such as during installation or distribution, and module 101 could fetch the server public key 114 upon connecting to wireless network 102. Server public key 114 can be the public key associated with server 105 or M2M service provider 108. Although a single server public key 114 is illustrated in FIG. 1d, module 101 could record a plurality of server public keys 114, where each server public key 114 is associated with a different server 105. Server public key 114 can optionally be signed by a certificate authority 118 in FIG. 1a, such that when module 101 communicates with server 105, module 101 can verify a signature 123 within a certificate 122 associated with server 105. Successful verification of the signature 123 can provide a high level of certainty that server 105 is properly identified and belongs to M2M service provider 108, as opposed to being an imposter or part of a "man in the middle" attack.

Module 101 may also contain cryptographic algorithms 141, which may comprise a suite of algorithms or subroutines that can be utilized for (i) deriving a pair of keys comprising a public key and a private key, (ii) encrypting data using public keys, (iii) decrypting data using private keys, (iv) processing secure hash signatures using private keys, and (v) verifying secure hash signatures using public keys, and related software, firmware, or subroutines for implementing a cryptographic system. Cryptographic algorithms 141 (also described below in FIG. 1f) could utilize publicly available software libraries within tools such as OpenSSL maintained by The OpenSSL Project (http://www.openssl.org/), libgcrypt maintained by The Free Software Foundation (http://www.gnu.org/software/libgcrypt/), and similar libraries such as libmcrypt and Crypto++. Note that cryptographic algorithms 141 could also use proprietary cryptographic libraries as well. In addition to implementing asymmetric encryption/ciphering, such as used with RSA and ECC cryptography, cryptographic algorithms 141 can provide symmetric ciphering where a shared private key is utilized to both encrypt and decrypt, such as with the Advanced Encryption Standard (AEC) cipher suite.

As illustrated in FIG. 1d, module 101 may also contain a random number generator 128. Random number generator 128 may contain a seed 129. The creation of random numbers with a high degree of entropy may be important the use of cryptographic algorithms 141. However, obtaining random numbers with high entropy in module 101 with limited processing resources may be a challenge using conventional technology. Since much of the operation of module 101 requires a CPU 101b following a pre-determined series of steps, such as the programmatic steps in an operating system 101h, module program 101i, etc., the random number generator seed 129 should preferably be populated with data that is close to random "noise" and not subject to replay. According to a preferred exemplary embodiment, module 101 utilizes data input from sensor 101f and radio 101z into a seed 129 within a random number generator 128. As one example, the sensor data input into seed 129 could comprise the least significant digits of a sensor measurement or series of sensor measurements, where the least significant digits would otherwise be effectively considered "noise". In this example, if sensor 101f comprised a temperature measuring device such as a thermocouple or thermistor with a stated accuracy of 0.1 degrees, module 101 could take a series of measurements with 0.0001 degree resolution and utilize the last two digits appended from a series of measurements for input into a seed 129 in order to generate a random number. Random number generator 128 could also utilize data input from the other components illustrated in FIG. 1c in order to generate a random number, where the data input from the other components comprise a signal with a high level of "noise" or high entropy. The seed 129 could comprise multiple seeds 129 or also a random number generator 128 could derive a random number using input from other components illustrated in FIG. 1c and without using a seed 129.

Other possibilities exist as well, such as if sensor 101f was a camera, module 101 could take a series of pictures and process the image to input data from the image into a seed 129. Likewise, module 101 could utilize numerous radio-frequency (RF) measurements from radio 101z in order to populate seed 129, including "noise" measurements on unused frequencies, or other data received by a radio 101z, including apparently random RF data. Although not illustrated in FIG. 1d, module 101 preferably includes a timing source such as a clock, and the clock could also be utilized to input data into a seed 129. Data from radio 101z, a clock (not shown), and/or sensor 101f, and/or radio 101z could be combined in order to input data into a seed 129. Additional input into the seed could include measurements or states within memory 101e and 101w, operating system 101h states and files, and reading data from hardware through a bus 101d. A plurality of the data as a source for a random number seed could be appended together into a "temporary random seed file" with a long series of states (i.e. a plurality of sensor 101j measurements, radio 101z measurements, clock times, memory 101e and 101w states, operating system 101h states, and/or hardware 101a and 101d states). The "temporary random seed file" can then be input into the secure hash algorithm 141c described in FIG. 1f below, and the output of the secure hash algorithm 141c could then be used in the input as a seed 129 within random number generator 128. Also, this combined data (such as the "temporary random seed file") could be utilized by random number generator 128 directly in order to process a random number. Other possibilities exist as well without departing from the scope of the present invention.

Note that the term "public key" as contemplated herein includes a key that may be shared with other elements, where the other elements may not be under the direct control of the same entity that holds the corresponding private key. However, the term "public key" as used herein does not require that the public key is made available to the general public or is publicly disclosed. An additional layer of security may be maintained in the present invention by preferably only sharing public keys on a confidential basis with other entities. For example, module public key 111 may be created by module 101 when generating module private key 112, and module 101 may share module public key 111 with M2M service provider 108 in order to record module public key 111 in server 105, but module 101 could choose to not share module public key 111 with other entities, such as wireless network 102 or make a certificate 122 available on the Internet 107. The benefits of confidentially sharing module public key 111 with server 105 are also further described in connection with FIG. 10 below.

Although a single public key and private key for (i) module 101 and (ii) server 105 are illustrated in FIG. 1c and also FIG. 1d below, respectively, both module 101 and server 105 may each utilize several different pairs of public keys and private keys. As one example, module 101 may record a first private key 112 used for creating a digital signature and a second private key 112 for decryption using asymmetric ciphering algorithms 141a. In this example, a server 105 could utilize a first module public key 111 to verify the digital signature, and a second module public key 111 could be utilized to encrypt messages sent to module 101. Similarly, either module 101 or server 105 may use private key 112 or 105c, respectively, to derive secondary shared keys such as a derived shared key 129b below. Thus, one key pair could be used with digital signatures, a second key pair used for asymmetric ciphering, and a third key pair to derive shared secret keys. Each of the three illustrated pairs of keys could comprise a set of keys.

In addition, module 101 could utilize a first set of keys to communicate with a first server 105 and a second set of keys to communicate with a second server 105. Likewise, M2M service provider 108 illustrated in FIG. 1a could utilize a first pair of secondary private and public keys with a first server 105, and a second pair of secondary private and public keys with a second server 105. As contemplated herein, the term "private key" can also refer to secondary non-shared keys derived from a "parent" private key such as key 112 or key 105c, and the term "public key" can also refer to (i) secondary, shared keys derived using a private key such as key 112, or (ii) secondary, shared keys associated with a public key such as key 111. Other possibilities exist as well for a key to represent derived or associated keys without departing from the scope of the present invention.

According to exemplary embodiments, module 101 may also include a pre-shared secret key 129a. Pre-shared secret key 129a can comprise a secret key that is shared between module 101 and server 105 before module 101 begins (i) communicating with server 105 and/or a certificate authority 118, (ii) or utilizing PKI-based encryption and authentication to communicate with M2M service provider 108. As illustrated in FIG. 1e below, server 105 could also record the pre-shared secret key 129a. A pre-shared secret key 129a could be a secure key comprising a string or number loaded into a nonvolatile memory 101w of module 101 by a manufacturer, distributer, installer, or end user of module 101. Pre-shared secret key 129a can be moved by CPU 101b from the nonvolatile memory 101w into a RAM 101e for further processing during the use of cryptographic algorithms 141.

Note that pre-shared secret key 129a can be different than a pre-shared secret key used with conventional technology such as SIM cards in PLMN networks, such as the key Ki, where the pre-shared secret key in a SIM card is designed to not be available for movement or loading into a RAM 101e for processing by CPU 101b. Alternatively, pre-shared secret key 129a could be derived using a second pre-shared secret key Ki within a SIM card, but then server 105 would need to be able to derive the same pre-shared secret key 129a, even though server 105 may not have pre-shared secret key Ki available. Although not shown in FIG. 1d, a module 101 may also include a SIM card that includes a pre-shared secret key, wherein the pre-shared secret key in a SIM card is different than pre-shared secret key Ki, since the pre-shared secret key in the SIM card cannot be moved into RAM 101e for processing with a cryptographic algorithms.

Pre-shared secret key 129a as illustrated in FIG. 1d can be loaded by a manufacturer, distributor, installer, or end user of module 101 using a physical interface 101a, such as (i) a USB interface 101v, or (ii) a local WiFi network if module 101 includes a WiFi client. Pre-shared secret key 129a may optionally be uniquely bound to module identity 110, such that another module 101 with a different module identity 110 could not utilize pre-shared secret key 129a. Or, pre-shared secret key 129a could be used by any module 101, but only used one time and thus a second module 101 could not utilize the exact same key within a pre-shared secret key 129a for authentication with server 105 at a subsequent time. Alternatively, pre-shared secret key 129a could be shared by a plurality of modules 101, and for example compiled into a module program 101i, such that multiple modules utilize the same pre-shared secret key 129a.

Pre-shared secret key 129a could be obtained by a distributor, installer, or end user of module 101 by (i) using a local computer to access a web page from a web server, where the web page can be user password protected, (ii) entering, submitting, or typing information including a module identity 110 into the web page, and subsequently (iii) downloading pre-shared secret key 129a from a web server. The web server could be a server equivalent to server 105 illustrated in FIG. 1c, where the server application 105i can include a web server application such as Apache. The web server could be operated by an entity such as module provider 109, M2M service provider 108, or even certificate authority 118 (since pre-shared secret key 129a could be used to authenticate the submission of module public key 111). Note that the pre-shared secret key 129a could also be presented visually on a response web page to the submission, and the a manufacturer, distributor, installer, or end user could record the pre-shared secret key 129a visually presented on the response web page. Pre-shared secret key 129a could comprise a string of an exemplary set of characters or numbers such as 10-16 digits or characters, although other lengths for pre-shared secret key 129a could be possible as well.

According to a preferred exemplary embodiment, in order to obtain the pre-shared secret key 129a from a web page as described in the above paragraph, the distributor, installer, or end user of module 101 could read a pre-shared secret key code 134. Pre-shared secret key code 134 could be physically printed on module 101, such as next to a serial number printed on the enclosure of the device. Pre-shared secret key code 134 could be a unique and/or randomized string such as an exemplary 8 byte number or 10 character string (and other possibilities exist as well), where upon (a) successful submission to a web page of both the pre-shared secret key code 134 with a module identity 110, then (b) the release of pre-shared secret key 129a would be authorized for the distributor, installer, or end user of module 101. Pre-shared secret key 129a could be transmitted through a secure web session such as SSL or TLS from the web server to a computer operated by the distributor, installer, or end-user. The distributor, installer, or end-user could then load the pre-shared secret key 129a into the nonvolatile memory of the module using (i) a LAN connection such as WiFi to the module (and in this case radio 101z in module 101 could support an 802.11 type connection) or (ii) a USB interface 101v.

Pre-shared secret key 129a could be utilized by a module 101 (i) as a shared secret key 813 in FIG. 8 through FIG. 10 below, or (ii) to derive a shared secret key 813 also recorded by server 813 in FIG. 8 through FIG. 10 below. Note that module program 101i preferably includes a verification process for any pre-shared secret key 129a loaded by a distributor, installer, or end user, where a hash value or combination of the pre-shared secret key 129a and module identity 110 could be verified. As one example, the last few digits or characters in a pre-shared secret key 129a could comprise a checksum for a string comprising both module identity 110 and pre-shared secret key 129a, such that module 101 could calculate the checksum after entry of pre-shared secret key 129a, and module 101 can reject the pre-shared secret key 129a if the checksum failed. In this manner, or through the use of similar techniques, system 100 can be designed so that pre-shared secret key 129a can only reasonably be utilized by a correct module 101 with the correct module identity 110 for the pre-shared secret key 129a.

Since module 101 may have multiple module identities 110, a first module identity 110 could be used with a pre-shared secret key code 134 and printed on an enclosure of module 101, while a second and more secure (i.e. longer length or more randomized bits) module identity 110 could be used as a module identity 110 in a message 208 as described in FIG. 2 below. Note that when using the exemplary embodiment illustrated in FIG. 10 below, (x) the module identity 110 submitted with a web page and pre-shared secret key code 134 is preferably different than (y) an unencrypted module identity 110 within a message 208 illustrated in FIG. 6, FIG. 7, and FIG. 10. A module identity 110 submitted by a distributor, installer, or end user in a web page could preferably be easy to manually type into a web page, such as 10 or 12 decimal digits or characters, while an unencrypted module identity 110 within a message 208 could be significantly longer, such as 16 or 24 extended ASCI characters.

Server 105 could (i) record a table of triplets including module identities 110, pre-shared secret key codes 134, and pre-shared secret keys 129a, and (ii) return via a web page the pre-shared secret key 129a upon a successful match and entry of the submitted pre-shared secret key code 134 and module identity 110. Once the pre-shared secret key 129a has been utilized to authorize a module public key 111 with a server 105 (such as using subsequent Steps 803 through 807 in FIG. 8 or Steps 803 through 901 in FIG. 9, or Steps 803 through 1002 in FIG. 10 below), then that particular pre-shared secret key 129a may be "discarded" and not used again for security purposes contemplated herein. After module 101 obtains an initial secure connection to server 105, using the techniques illustrated in FIG. 3 through FIG. 7, then server 105 can securely send keys for use with future communication including a symmetric key 127 or other shared secret keys for authorizing any subsequent submission of a new module public key 111 with module identity 110 by module 101.

Note that the use of a pre-shared secret key 129a and pre-shared secret key code 134 is also optional, such that a module program 101i could cipher of obfuscate the initial submission of a derived module public key 111 and module identity to a server 105, so that server 105 could be reasonably assured only a valid module 101 submitted the module public key 111. Alternatively, the module manufacturer could load the pre-shared secret key 129a in non-volatile memory such as flash 101w upon manufacturing, and in this case a distributor, installer, or end-user may not need to access the pre-shared secret key 129a. However, the steps for a distributor, installer, or end-user to read a pre-shared secret key code 134 and submit the code to a web server to obtain pre-shared secret key 129a may still be useful, such as if module 101 needs the equivalent of a "factory reset" after deployment, reconfiguration such as loading new firmware, or otherwise reset or returned to a default state.

Although (A) a pre-shared secret key 129a may be useful for sending module public key 111 to server 105 or other entities connected to the Internet 107, such as a certificate authority 118, (B) pre-shared secret key 129a could be used for other purposes as well, such as input into a key derivation function 141f so that module 101 and server 105 could obtain common derived shared secret keys 129b. In this case, a derived shared secret key 129b could be utilized as a shared secret key 813 depicted and described in connection with FIG. 8 through FIG. 10 below. In addition, after the first use of pre-shared secret key 129a, a manufacturer, distributor, installer, or end user may also upload a second pre-shared key 129a into module 101 at a future date, such as upon reconfiguration of a module 101.

According to a preferred exemplary embodiment, module 101 can derive its own module private key 112 and module public key 111, and utilize pre-shared secret key 129a in order to securely and/or authoritatively communicate the derived module public key 111 with server 105 and/or a certificate authority 118. The use of pre-shared secret key 129a can be particularly useful if module 101 has already been deployed with a monitored unit 119 and connects to server 105 though the Internet 107 for the very first time. Server 105 could preferably utilize pre-shared secret key 129a in order to confirm that a received module public key 111 and module identity 110 from module 101 authoritatively belong to module 101, as opposed to being an unauthorized or even fraudulent submission of module public key 111 and module identity 110.

Server 105 could utilize a pre-shared secret key 129a and the step depicted and described in connection with FIG. 4b below in order to securely receive module public key 111 and module identity 110 from module 101, including the first time module 101 sends module public key 111 to server 105. As one example, pre-shared secret key 129a could be utilized as a symmetric ciphering 141b key, described in FIG. 1f below. After the first submission of module public key 111 to server 105, any subsequent submissions of new module public keys 111 derived by module 101 could either (i) continue to use the pre-shared secret key 129a, or (ii) use a symmetric key 127 derived after the first module public key 111 has been received. Securing the submission of module public key 111 with server 105, including both the first submission and subsequent submissions, is also depicted and described in connection with FIG. 8 through FIG. 10 below.

FIG. 1e

FIG. 1e is a graphical illustration of the components within a server that communicates with the module, in accordance with exemplary embodiments. Server 105 can include a database 105k, a sub-server 105w, and a message preprocessor 105y. The elements illustrated within a server 105 in FIG. 1e may be stored in volatile memory such as RAM 105e, and/or storage 105m, and may also be accessible to a processor CPU 105b. Database 105k, sub-server 105w, and message preprocessor 105y could represent either different processes or threads operating on a server 105, or physically separate computers operating in conjunction over a network to perform the functions of a server 105. Since server 105 can preferably support communications with a plurality of modules 101, server 105 can utilize database 105k to store and query data regarding a plurality of modules 101, monitored units 119, and the overall M2M service. The server 105 can store a plurality of module public keys 111 associated with a plurality of devices in the database 105k. The server 105 can use the module identity 110 of device 101, received in a message such as a UDP packet, to query the database 105k and select the public key 111 associated with the module 101. Although not illustrated in FIG. 1e, database 105k can also record a pre-shared secret key 129a, a pre-shared secret key code 134, and a module identity 110 for each module 101. In addition, although not illustrated in FIG. 1e, database 105k could store a symmetric key 127 for each module 101, if cryptographic algorithms 141 utilize a symmetric cipher 141b such as AES for communication with module 101. Examples of database 105k could include MySQL, Oracle®, SQLite, hash tables, distributed hash tables, text files, etc. Database 105k could reside within RAM 105e or storage 105m.

Message preprocessor 105y can process incoming packets and route them to an appropriate sub-server 105w using information contained in an incoming message, such as a module identity 110, a server identity 206 illustrated in FIG. 2 below, and/or a destination IP address. Message preprocessor 105y can include rules for processing and routing, such a dropping malformed incoming messages or incoming messages without correct cryptographic data. Message preprocessor 105y could also optionally be combined with a server firewall 124 in order to provide firewall functionality and security at the network layer. Message preprocessor 105y may preferably remain "silent" to incoming packets without proper cryptographic data contained in an incoming message, such as one example of a properly formatted message 208 illustrated in FIG. 6 below.

Sub-server 105w can include a server private key 105c and cryptographic algorithms 141. A plurality of sub-servers 105w can be utilized by a server 105 in order to support communication with a plurality of wireless modules 101. The server private key 105c and module public key 111 can be utilized by server 105 to secure communication with module 101, including the steps depicted and described in connection with FIG. 4b through FIG. 5a below. Cryptographic algorithms 141 may comprise a suite of algorithms or subroutines and can be utilized for (i) encrypting data using public keys, (ii) decrypting data using private keys, (iii) processing secure hash signatures using private keys, and (iv) verifying secure hash signatures using public keys. A first sub-server 105w can process messages and responses with a module 101 using a first set of security keys and algorithms, such as using RSA-based security, and a second sub-server 105w can process messages and responses with a module 101 using a second set of security keys and algorithms, such as using ECC-based security. Consequently, message pre-processor 105y could route incoming messages to the appropriate sub-server 105w depending on the encryption algorithm used in the incoming message (which could be determined by message pre-processor 105y by querying the database 105k using a module identity in the incoming message). Sub-servers 105w may utilize separate server private keys 105c, or the sub-servers 105w can share a common private key 105c. Sub-servers 105w may utilize separate cryptographic algorithms 141, or the sub-servers 105x can share common cryptographic algorithms 141. Although separate sub-servers 105w are illustrated in FIG. 1d, the sub-servers may optionally be combined with a server 105, or omitted, with the corresponding server private key 105c and cryptographic algorithms 141 stored directly in a server 105.

Server 105 may also comprise a collection of individual computers, where the individual computers could be either centrally located or geographically dispersed, but the individual computers may function in a coordinated manner over a network to operate as a server 105. Server 105 may be a "virtualized" server, with computing resources shared with other processes operating on a computer.

FIG. 1f

Figure 1F:
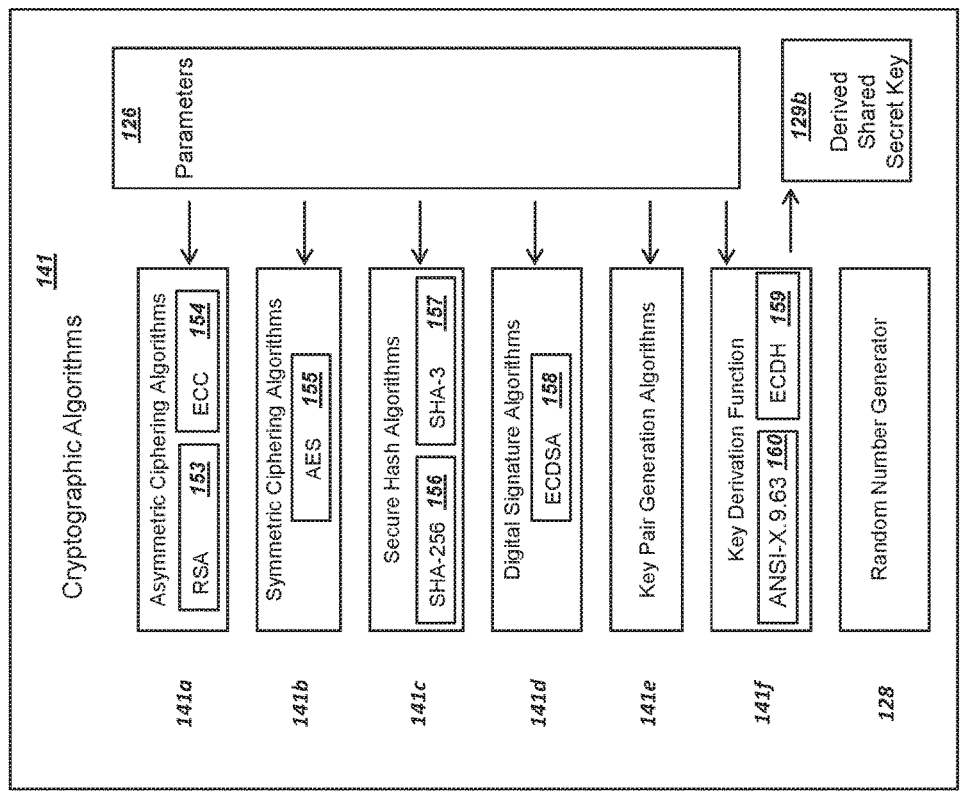
FIG. 1f is a graphical illustration of the components in cryptographic algorithms utilized by a module and a server, in accordance with exemplary embodiments.

FIG. 1f is a graphical illustration of the components in cryptographic algorithms utilized by a module and a server, in accordance with exemplary embodiments. As contemplated herein, communications between a module 101 and a server 105 can be secured by using cryptographic algorithms 141. The cryptographic algorithms 141 used by both module 101 and server 105 can comprise a set of steps, procedures, or software routines for accomplishing steps to cipher, decipher, sign, and verify messages, including the generation of public keys, private keys, and derived shared keys. Cryptographic algorithms can be implemented in software operating on (i) module 101 in the form of a module program 101i, or (ii) server 105 in the form of a software application 105i. Example software for a cryptographic algorithms includes the libraries within the openssl, libmcrypt, and/or and Crypto++ discussed in FIG. 1d. Other possibilities for the location of cryptographic algorithms within a module 101 or server 105 exist as well, including possibly module operating system 101h or server operating system 105h.

In addition, cryptographic algorithms 141 may be implemented in hardware or firmware on either module 101 or server 105. Note that module 101 and server 105 could each utilize a different set of cryptographic algorithms 141, although the two sets of algorithms should preferably be fully interoperable (i.e. ciphering with a first symmetric ciphering algorithm 141b and a symmetric key 127 on module 101 could be deciphered by a second symmetric ciphering algorithm 141b on server 105 using the symmetric key 127). As illustrated in FIG. 1f, cryptographic algorithms 141 may comprise an asymmetric ciphering algorithm 141a, a symmetric ciphering algorithm 141b, a secure hash algorithm 141c, a digital signature algorithm 141d, a key pair generation algorithm 141e, a key derivation function 141f, and a random number generator 128.

Asymmetric ciphering algorithms 141a can comprise algorithms utilizing public key infrastructure (PKI) techniques for both (i) encrypting with a public key and (ii) decrypting with a private key. Example algorithms within asymmetric algorithms 141a include the RSA algorithms 153 and the Elliptic Curve Cryptography (ECC) algorithms 154, and other asymmetric algorithms could be utilized as well. For example, either the ECC algorithms 154 or RSA algorithms 153 can be used for encryption and decryption, including encryption elements 403 and 503 discussed below, as well as decryption elements 413 and 514 discussed below. A set of parameters 126 can include input into asymmetric ciphering algorithms 141a, such as specifying key lengths, elliptic curves to utilize (if ECC), or other parameters or settings required. As contemplated herein and described in additional detail below, the algorithms illustrated in FIG. 1f can perform both ciphering and deciphering, using the appropriate keys.

The use and application of RSA algorithms and cryptography are described within IETF RFC 3447 titled "Public-Key Cryptography Standards (PKCS) #1: RSA Cryptography Specifications Version 2.1", herein incorporated by reference, among other published standards for the use of RSA algorithms 153. The use of an RSA algorithm 153 for encryption and decryption, including with cryptographic algorithm 101n and other description of encryption or decryption algorithms, can also be processed according to the description of the RSA algorithm according to the Wikipedia entry for "RSA (algorithm)" as of Sep. 9, 2013, which is incorporated by reference herein.

The use and application of ECC algorithms 154 within asymmetric ciphering algorithms 141a within cryptographic algorithms 141 are described within IETF RFC 6090 titled "Fundamental Elliptic Curve Cryptography Algorithms" (herein incorporated by reference), among other published standards using ECC. ECC algorithms 154 can also utilize elliptic curve cryptography algorithms to the Wikipedia entry for "Elliptic curve cryptography" as of Sep. 9, 2013, which is incorporated by reference herein. ECC algorithms 154 may utilized according to exemplary preferred embodiments in order to maintain high security with smaller key lengths, compared to RSA, thereby helping to comparably reduce the message lengths, radio frequency spectrum utilization, and processing power required by module 101. Thus, the use of ECC algorithms 154 within various steps requiring ciphering or digital signatures may help conserve battery life of module 101 while maintaining the objective of securing system 100. Note that as contemplated herein, other algorithms besides with ECC algorithms 154 and RSA algorithms 153 may be also be used in asymmetric algorithms 141a.

Cryptographic algorithms 141 may also include a set of symmetric ciphering algorithms 141b. Symmetric ciphering algorithms 141b can utilize a symmetric key 127 by one node such as a module 101 to encrypt or cipher data, and the encrypted data can be decrypted or deciphered by server 105 also using the symmetric key 127. Examples of symmetric ciphers include Advanced Encryption Standard 155 (AES), as specified in Federal Information Processing Standards (FIPS) Publication 197, and Triple Data Encryption Standard (Triple DES), as described in NIST Special Publication 800-67 Revision 1, "Recommendation for the Triple Data Encryption Algorithm (TDEA) Block Cipher (Revised January 2012)". Parameters 126 input into symmetric ciphering algorithms 141b can include symmetric key 127 length, such as the selection of 128, 192, or 256 bits with AES 155 symmetric ciphering. Other examples of symmetric ciphering algorithms 141b may be utilized as well within cryptographic algorithms 141. Also note that as contemplated herein, the term "symmetric ciphering" contemplates the use of a symmetric ciphering algorithm 141b in order to encrypt or cipher data with a symmetric ciphering algorithm 141b, and "asymmetric ciphering" contemplated the use of an asymmetric ciphering algorithm 141a to encrypt or cipher data with a public key, such as module public key 111 or server public key 114.

Cryptographic algorithms 141 may also include a set of secure hash algorithms 141c in order to compute and output a secure hash value or number based on a string or file input into the secure hash algorithms 141c. Example secure hash algorithms include SHA256 156 (also known as SHA-2) and SHA-3 157. SHA256 156 is specified in the National Institute of Standards and Technology (NIST) Federal Information Processing Standards Publication (FIPS PUB) 180-2 titled "Secure Hash Standard". SHA-3 157 is scheduled to be published in FIPS PUB 180-5. Parameters 126 input into secure hash algorithms 141c can include the selection of the length of the secure hash, such as either 224, 256, or 512 bits with either SHA-2 or SHA-3.

Cryptographic algorithms 141 may also include a set of digital signature algorithms 141d, in order to sign and verify messages between module 101 and server 105, or verify signatures such as comparing that (i) a first secure hash value in the form of a signature 123 in a certificate 122 and a certificate authority public key 132 matches (ii) a second secure hash value in the certificate 122. Digital signature algorithms 141d can utilize algorithms in National Institute of Standards (NIST) "FIPS 186-4: Digital Signature Standard", or IETF RFC 6979 titled "Deterministic Usage of the Digital Signature Algorithm (DSA) and Elliptic Curve Digital Signature Algorithm (ECDSA)". The use of ECDSA algorithm 158 within a set of digital signature algorithms 141d may be preferred if keys such as module public key 111 and server public key 114 are based on elliptic curve cryptography. Other PKI standards or proprietary techniques for securely verifying digital signatures may be utilized as well in digital signature algorithms 141d. Parameters 126 input into digital signature algorithms 141d can include the selection of a secure hash algorithms 141c to utilize with digital signature algorithms 141d, or the algorithm to utilize, such as ECDSA shown or an RSA-based alternative for digital signatures is possible as well.

Cryptographic algorithms 141 may also include key pair generation algorithms 141e, a key derivation function 141f, and a random number generator 128. Key pair generation algorithms 141e can be utilized by module 101 or server 105 to securely generate private and public keys. The key pair generation algorithms 141e can also use input from a parameters 126, such as the desired key lengths, or an ECC curve if the public key will support ECC algorithms 154. According to an exemplary preferred embodiment, module 101 can derive a pair of module public key 111 and module private key 112 using key pair generation algorithms 141e. Software tools such as openssl and libcrypt include libraries for the generation key pairs, and these and similar libraries can be used in a key pair generation algorithm 141e. Key derivation function 141f can be used by module 101 and server 105 in order to determine a common derived shared secret key 129, using their respective public keys as input. An exemplary algorithm within a key derivation function 141f can be the Diffie-Hellman key exchange, which is used by tools such as secure socket layer (SSL) with RSA algorithms 153. When using ECC algorithms 154, module 101 and server 105 can utilize Elliptic Curve Diffie-Hellman (ECDH) algorithms 159, and a summary of ECDH is included in the Wikipedia article titled "Elliptic Curve Diffie-Hellman" (http://en.wikipedia.org/wiki/Elliptic_curve_Diffie%E2%80%93Hellman" from Sep. 24, 2013, which is herein incorporated by reference. Other algorithms to derive a shared secret key 129 using public keys may also be utilized in a key derivation function 141*f*, such as the American National Standards Institute (ANSI) standard X-9.63 160. Parameters 126 input into key pair generation algorithms 141*e* can include the type of asymmetric ciphering algorithms 141*a* used with the keys, the key length in bits, an elliptic curve utilized for ECC, a time-to-live for a public key that is derived, and similar settings. Additional parameters 126 for a public key can include a supported point formats extension, where the supported point formats extension could comprise uncompressed, compressed prime, or "compressed char2" formats, as specified in ANSI X-9.62. In other words, an ECC public key can have several formats and a parameters 126 can be useful to clarify the format. The various algorithms within cryptographic algorithms 141 may utilize a random number generator 128, which is also depicted and described in connection with FIG. 1*d* above.

FIG. 1*g*

FIG. 1*g* is a graphical illustration of a certificate that includes a public key infrastructure (PKI) key, where the public key utilizes an RSA algorithm, in accordance with exemplary embodiments. Public or shared public keys for module 101, server 105, and module provider 109 can be recorded and distributed in the form of a certificate 122. Certificate 122 can be formatted according to the X.509 ITU-T standard. Certificate 122 in FIG. 1*g* is illustrated according to version 3 of this standard, although other formats of certificate 122 could be implemented as well, including future versions of the X.509 standards. In addition, public keys as described in the present invention do not require being recorded in a certificate 122, and the public keys could be communicated or recorded in other formats.

The module identity 110, or a value associated with the module identity 110 can preferably be included in certificate 122, such as the "Common Name" (CN) field of a X.509 certificate 122, as illustrated in FIG. 1*g*. The module identity 110 could alternatively be included in other fields within a certificate 122, such as the "Organizational Unit" (OU) field, such that if multiple certificates 122 may be associated with module 101, and in this case the module public key identity 111*a* in a certificate 122 may be used in the CN field. Alternatively, both the module identity 110 and the module public key identity 111*a* can be appended and used together in the CN field. A module identity 110 utilized in a CN and/or OU field of a X.509 certificate can preferably be read from and persistently or permanently associated with physical hardware in module 101.

According to a preferred exemplary embodiment, a module identity 110, as used in a CN and/or OU field of a X.509 certificate, could be written into a ROM 101*c* or another read-only hardware address upon manufacturing or distribution of module 101. Also, a certificate 122 for module 101 may also preferably include a public key identity 111*a*, such that module 101 may utilize multiple module public keys 111 over the lifetime of module 101, and the module public key identity 111*a* in a certificate 122 can specify which module public key 111 is associated with the certificate 111. The module public key identity 111*a* can also be included in the CN field, and in this case the module identity 110 can be included in the Organizational Unit (OU) field. Although a public key is shown in FIG. 1*g*, a second key associated with a certificate 112 could comprise the private key. The private key could be a file containing a cryptographic string.

Module public key 111 is illustrated in FIG. 1*g* using the RSA algorithm with a 2048 bit key, where wireless module public key 111 comprises a modulus and an exponent. Other key lengths are possible as well, such as a 4096 bit key, and the key length could be selected depending on the security requirements and processing resources of a module 101. Certificate 122 for module 101 could optionally include a signature 123, which could be signed by a certificate authority 118 or a module provider 109 (where module provider 109 also functions as a certificate authority 118). The signature 123 can provide reasonable assurance that module public key 111 is associated with module 101 using module identity 110. The signature 123 can be generated using a hash algorithm with an input of a private key such as certificate authority private key 131 and wireless module public key 111. The hash algorithm could utilize an algorithm from the SHA-1, SHA-2, and SHA-3 family of hash algorithms, or future secure hash algorithms. The signature algorithm illustrated in certificate 122 is according to the SHA-1 algorithm. Module public key 108, server public key 114, provider public key 120, provider private key 121, and associated keys derived from these keys can be stored or communicated in the form of a certificate 122. Certificate 122 can be stored or communicated in the text format illustrated in FIG. 1*g*, or also a privacy enhanced mail (PEM) 124 format, which may comprise a base64 encoding of binary distinguished encoding rules (DER) of the data for certificate 122. Note that the use of a certificate 122 is not required for the format of a public or shared key, and the public keys could optionally omit a signature from a certificate authority. In this case, the public keys such as module public key 111 and/or server public key 114 could be recorded in the format of a string, without the additional fields illustrated in FIG. 1*g*. Server public key 114 may also be recorded in a certificate 122 with a signature 123 from a certificate authority 118. Other possibilities exist as well without departing from the scope of the present invention.

FIG. 1*h*

FIG. 1*h* is an illustration of a certificate that includes a PKI public key, where the key comprises an elliptic curve cryptography key, in accordance with exemplary embodiments. Public and private keys in system 100 can utilize PKI techniques other than RSA, such as the elliptic curve cryptography (ECC) public key 111 illustrated in FIG. 1*h*. One benefit of using ECC is that an equivalent level of security can be obtained for a much smaller key length. Also, energy may be conserved using ECC algorithms 154 compared to RSA algorithms 153. An analysis of the energy conserved for ciphering, deciphering, signing, and verifying messages using ECC versus RSA is included in the paper titled "Energy Analysis of Public-Key Cryptography on Small Wireless Devices" by Wander et al (herein incorporated by reference). Smaller key lengths save bandwidth, memory, processing resources, and power, which are all valuable for a module 101 to conserve a battery 101*k* and usage of radio-frequency spectrum. For example, an ECC key length of 283 bits provides security similar to an RSA key length of approximately 2048 bits. Module public key 111 can comprise an ECC key in an X.509 certificate, as illustrated in FIG. 1*g*.

Certificate 122 could include a signature 123, where signature 123 can be signed using ECC signature techniques, such as the Elliptic Curve Digital Signature Algorithm (ECDSA) 158 with a secure hash such as SHA256 156. In order to generate signature 123, the private key associated with either CA 118 or module provider 109 may also be an ECC-based private key. Note that the public key 111 in a certificate 122 could use a different asymmetric ciphering algorithm 141*a* than the algorithm used for signing, such that the public key 111 can be an ECC key, while the signature 123 could be generated with RSA algorithm 153 and/or key. Certificate 122 may also include parameters 126, where parameters 126 can specify an elliptic curve utilized with the module public key 111. Parameters 126 could also include the start and end times for the validity of either public key 111 or certificate 122. Other parameters 126 can be utilized in a certificate 122 as well.

Certificate 122 illustrated in FIG. 1g also illustrates an exemplary embodiment of the present invention. Over the lifetime of a module 101, which could be a decade or longer, multiple module public keys 111 may be utilized. The potential use of multiple different module public keys 111 include (i) the expiration of a certificate 122 (including expiration of a public key associated with a certificate authority used in signature 123), (ii) a need to change an elliptic curve specified in a parameters 126, (iii) adding a new public/private key pair for connection with a different wireless network 102, (iv) as increasing a key length utilized in a public/private key pair, (v) the transfer of ownership or control of module 101, and/or (vi) module 101 connecting to a new server that utilizes a different asymmetric ciphering algorithm (i.e. RSA instead of ECC). Other possibilities exist as well for reasons a module to derive a new module public key 111. Note that the multiple module public keys 111 may also be utilized concurrently, such that (i) a first module public key 111 in a first certificate 102 can be utilized with a first server 105, and (ii) a second module public key 111 (possibly derived using a different set of parameters 126 including using a different elliptic curve) can be utilized with a second server 105 and/or wireless network 102.

In either case of (i) module 101 using multiple module public keys 111 concurrently, or (ii) module 101 using different module public keys 111 in sequence, a certificate 122 can preferably include a module public key identity 111a to specify the module public key 111 utilized in a certificate 122. As illustrated in FIG. 1a, the module public key identity 111a could be included in the CN field, and the module identity 110 can be included in the OU field. Alternatively, the module public key identity 111a and module identity 110 can be appended together and used in the CN field. In this manner and according to preferred exemplary embodiments, a module public key identity 111a is utilized with both a module identity 110 and a module public key 111 within a certificate 122. Also, as noted previously herein, the use of a certificate 122 may optionally be omitted, such that module 101 and server 105 share public keys without using certificates 122.

FIG. 2

Figure 2:
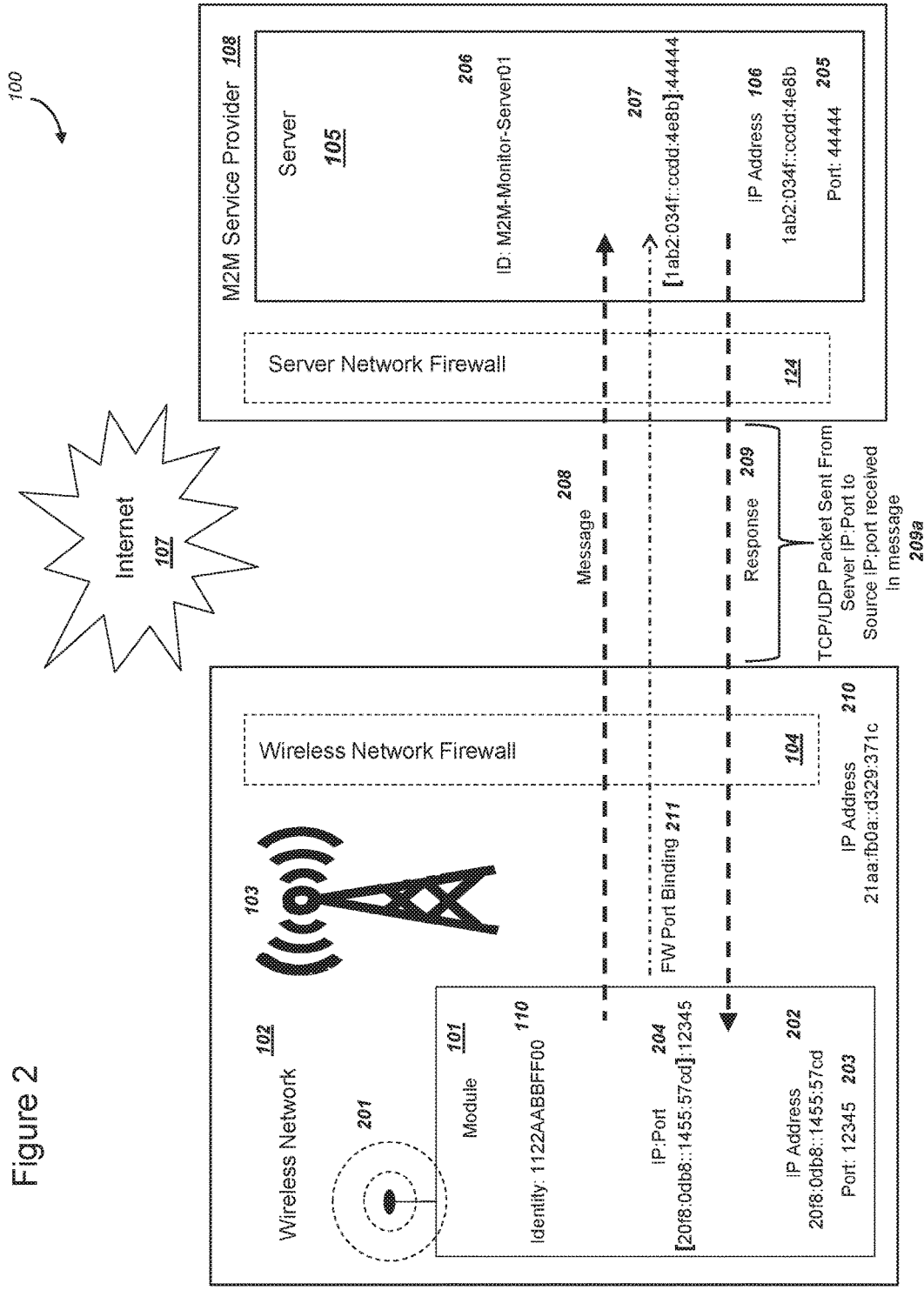
FIG. 2 is a graphical illustration of an exemplary system, where a module sends a message to a server, and where the server responds to the message, in accordance with exemplary embodiments.

FIG. 2 is a graphical illustration of an exemplary system, where a module sends a message to a server, and where the server responds to the message, in accordance with exemplary embodiments. Module 101 as depicted and described in FIG. 2 can operate as a wireless module 101, although a wired connection to the Internet 107 could alternatively be utilized. System 100 as illustrated in FIG. 2 includes RF signals 201, module IP address 202, port number 203, module IP:port 204, server port number 205, server ID 206, server IP:port number 207, message 208, response 209, wireless network firewall address 210, and firewall port binding packet 211. The elements illustrated within system 100 in FIG. 2 are also depicted and described in connection with FIG. 2 of U.S. patent application Ser. No. 14/023,181 (the contents of which are hereby incorporated by reference in their entirety).

Wireless module 101 can wake from a dormant state in order perform (i) remote and automated monitoring and (ii) control functions such as collecting a sensor 101f measurement, communicating with server 105, and controlling an actuator 101y. If module 101 is connected to land-line power or a long-lasting external power source such solar power, then module 101 may remain in an active state and bypass a dormant state, although transmitting RF signals 201 may preferably only be utilized when communicating with wireless network 102 or sending and receiving data from server 105. Upon waking from the dormant state and starting communication with a server 105, wireless module 101 can begin transmitting RF signals 201 to base station 103. The wireless module can acquire an IP address 202 from the wireless network 102. IP address 202 is illustrated as being an IPv6 address, but IP address 202 could also be an IPv4 address. IP address 202 could also be a subset of IPv6 addresses such as the last 32 or 64 bits in a full 128 bit IPv6 address, and wireless network 102 could append the beginning 96 or 64 bits, respectively, of the IPv6 address when wireless module 101 sends packets to the Internet 107.

In order to transmit or send data from wireless module 101 to server 105, wireless module 101 can use module program 101i to collect data from a sensor 101f in order to update server 105. Module program 101i can request a port number 203 from operating system 101h in order to have a source IP:port for sending data using IP protocols such as TCP and UDP. The terminology "IP:port" as described herein refers to combining an IP address with a port number. Wireless module IP address 202 and port number 203 can be combined to form IP:port number 204. IP:port number 204 can be utilized as a source IP:port number for packets transmitted from wireless module 101, as well as a destination IP:port number for packets received by wireless module 101, when communicating with server 105.

In order to utilize Internet 107, wireless module 101 may also need a destination IP address and port number in order to send packets to server 105. Before sending data to server 105, wireless module 101 preferably retrieves server IP address 106 and server port number 205 from RAM 101e. Server IP address 106 could be recorded in RAM 101e via (i) a DNS query using server name 206 or (ii) queries to M2M service provider 108 or wireless network 102. CPU 101b may copy server IP address 106 and server port number 205 from nonvolatile memory into volatile memory such as a register for processing to send a packet to server 105. Server name 206 could also be a server identity. (A) Server IP address 106 or server name 206 and (B) server port number 205 could be recorded in a nonvolatile memory such as flash memory 101w so that wireless module 101 can store the proper destination of packets transmitted even when wireless module is dormant or shutdown, which avoids the processing and bandwidth requirements of obtaining server IP address 106 and server port number 205 every time the wireless module 101 wakes from the dormant or shutdown state. Server IP address 106 and server port number 205 can be combined into a server IP:port number 207.

After collecting data from a sensor, wireless module 101 can send a packet from IP:port 204 to IP:port 207, and the packet could comprise a message 208 that may include the data from a sensor 101f. Note that message 208 does not need to include sensor data, and message could potentially be a periodic registration message or keep-alive message. As contemplated herein, the term "sensor measurement" can refer to data associated with or derived from a sensor 101f. A sensor measurement, as described below including element 305 of FIG. 3, can comprise a string containing data regarding a parameter of a monitored unit 119 and collected by a sensor 101f. The sensor measurement as sent in a message 208 can also represent a string (alphanumeric, binary, text, hexadecimal, etc.), where the string comprises a transformation or processing of sensor data collected by a CPU 101*b*, such including formatting, compressing, or encrypting, etc. of sensor data.

In order to minimize bandwidth and time required for RF signals 201 to be active, module 101 can send the message 208 as a single UDP datagram in accordance with a preferred exemplary embodiment. The single UDP datagram can preferably be the only packet sent from module 101 to server 105 or M2M service provider 108 during a wake state for the module 101 when the radio 101*z* is active and transmitting, such as in a radio resource control (RRC) connected state. In other words, according to this preferred exemplary embodiment, the message 208 sent by module 101 can preferably be the only message or packet sent by the wireless module to the server 105 between dormant periods of module 101. By sending message 208 as a single UDP datagram, both a battery 101*k* is conserved and utilization of valuable RF spectrum is reduced. Message 208 could also comprise a series of associated UDP messages.

Also, as contemplated herein, message 208 could comprise a related series of packets, so that message 208 could comprise multiple datagrams. As one example, if TCP is utilized as the transport protocol for message 208, then the series of TCP messages including the initial handshake, one or more packets of payload data, and the closing of the connection could together comprise message 208. As another example, if UDP or UDP Lite is utilized for the transport protocol, and payload data exceeds a maximum transmission unit (MTU) size for the UDP packet and the payload data is spread across multiple packets, then the multiple packets would comprise a message 208. Further, a related series of packets comprising a message 208 could be identified by using the same source port number for module 101. In addition, a related series of packets comprising a first message 208 could be identified as a series of packets sent by module 101 before receiving a response 209 from a server, and packets sent after receiving a response 209 could comprise a second message 208. Other possibilities for a message 208 to comprise multiple packets or datagrams may exist without departing from the scope of the present invention.

The UDP datagram for message 208 could also be formatted according to the UDP Lite protocol, as specified in IETF RFC 3828, which is also incorporated by reference herein. The term "UDP Lite" described in the present invention may also refer to any connectionless protocol widely supported on Internet 107 where checksums may be partially disabled, thereby supporting the transfer of bit errors within a datagram. The advantages of UDP over TCP is that UDP can be quickly sent, while TCP requires a "handshake" with the server which requires more time and bandwidth, which would utilize more energy from battery 101*k*. Weak or "noisy" RF signals between wireless module 101 and wireless network 102 may degrade or slow TCP transmissions, resulting in unwanted and unnecessary retransmission of individual TCP messages in the standard TCP "handshake" and connection close procedures. Also, the sensor data may be relatively small, such as a dozens of bytes, and UDP can provide significantly less signaling overhead than TCP, especially with small messages for the duration of the session. However, some M2M applications may prefer or require TCP and in this case message 208 can be formatted according to TCP. Thus, according to an exemplary embodiment, both message 208 and response 209 can be TCP messages. In this exemplary embodiment, message 208 and response 209 could each comprise a series of TCP messages that can include a TCP SYN, SYN ACK, ACK, ACK w/data, FIN ACK, etc.

According to an exemplary embodiment, module 101 sends the same sensor data in multiple copies of the same UDP packet. Each of the multiple copies of the same UDP packet can also optionally be formatted according to the UDP Lite protocol. As one example, wireless module sends three identical copies of the UDP or UDP Lite packet that include the same sensor data. The benefit of sending three copies of UDP Lite include (i) the RF signals 201 received by the base station 103 could include bit errors, which could result in a regular (RFC 768) UDP packet being dropped, since a bit error could result in a UDP checksum mismatch, as received and processed by wireless network 102. Note that the use of checksums is mandatory in IPv6, and thus checksums cannot be fully disabled in IPv6. With UDP Lite packets transmitted by wireless module 101, where the mandatory checksum for IPv6 can cover the packet header, wireless network 102 can forward all packets received, potentially including bit errors, to server 105 over the Internet 107.

Server 105 can receive the multiple copies of the UDP or UDP Lite packets, which could include bit errors received, and server 105 could compare or combine the multiple copies or each individual UDP Lite packet in order to remove bit errors. Note that UDP Lite is not required, and wireless module 101 could send the message 208 using a single UDP packet, or multiple copies of a regular UDP (i.e. non UDP Lite) packet. However, using UDP Lite with multiple packets sent can provide benefits such as if the sensor data is encrypted in the packet, then a single bit error would normally break the receiver's ability to decipher the data using a cryptographic key, unless the encrypted data was channel coded and the channel coding could recover from the bit error in order to present an error-free input of the encrypted data to a deciphering algorithm.

Further, between periods of sleep when the wireless module 101 becomes active and transmits RF signals 201, module 101, which may also comprise a wireless module 101, could send the sensor data in a single UDP Lite packet where the packet includes channel coding, which can also be referred to forward error correction. Forward error correction could also be implemented by sending multiple copies of the same UDP packet. Note that since large segments of message 208 could include encrypted or hashed data, those segments may not be appropriate for compression since the data is often similar to random strings which are not readily compressed. Channel coding techniques for the data in message 208 could include block codes and convolution codes. Block codes could include Reed-Solomon, Golay, BCH, Hamming, and turbo codes. According to a preferred exemplary embodiment, data within message 208 is sent as a UDP Lite packet using a turbo code to correct multiple bit errors within a packet or datagram sent by module 101 and received by server 105.

In system 100 illustrated in FIG. 2, server 105 can use IP:port 207 to receive the packet from wireless module 101 and sent from source IP:port 204 to IP:port 207, and the packet could comprise a message 208 that may include the data from a sensor associated with wireless module 101 or monitored unit 119. Note that server 105 can use IP:port 207 to receive a plurality of messages 208 from a plurality of wireless modules 101. Server 105 preferably listens for UDP packets on IP:port 207, although TCP packets could be supported as well. If server 105 receives multiple copies of the same UDP packet from wireless module 101, server 105 preferably includes a timer. The timer can start when the first packet in the series of same packets is received, and packets received outside the expiration of the timer would be discarded. In this manner, server 105 would be protected from replay attacks. The timer could be a relatively short value such as less than 5 seconds.

After receiving the message 208 and processing the message according to the techniques described below, server 105 can send a response 209. Since wireless module 101 may belong to a wireless network 102 which includes a firewall 104, the source IP:port of the message 208 received could be different from the source IP:port 204 utilized by wireless module 101. The source IP:port in message 208 could be changed if firewall 104 performs network address translation (NAT), as one example. Server 105 may not readily know if a NAT translation has been performed on the message 208. Alternatively, firewall 104 may not perform NAT, but could still block data from the Internet 107 which does not properly match the firewall rules. As one example, firewall 104 could be a symmetric firewall (but without NAT functionality), where only packets from IP:port 207 to IP:port 204 are allowed to pass the firewall after message 208 has been sent by wireless module 101. In either case, where firewall 104 may or may not perform NAT routing, server 105 preferably sends the response 209 from the server IP:port 207 to the source IP:port it receives in message 208. According to a preferred exemplary embodiment, response 209 is a UDP packet sent from server 105 with (i) a source IP:port 207 and (ii) a destination IP:port equal to the source IP:port received in message 208, as illustrated in packet 209a. The example use of source and destination IP:ports in message 208 and response 209 are also illustrated in FIG. 6 below. In this manner, the UDP packet can traverse a firewall 104, if firewall 104 is present. If firewall 104 is present and performs NAT routing, then firewall 104 can receive the response 209 and change the destination IP address and port within response 209 to equal IP:port 204.

According to exemplary preferred embodiments, module 101 may also obtain power from a land-line source, such as a traditional 120 volt wall socket, or possibly power over Ethernet, and other non-transient power sources could be utilized as well. In this case, module 101 may remain persistently connected to the Internet through either a wireless network 102 or a wired connection such as Ethernet. In other words, module 101 may omit entering periods of sleep or dormancy where inbound packets from the Internet would not be received due to the sleep state of module 101. Consequently, module 101 may preferably periodically send a firewall port binding packet 211 from IP:port 204 to IP:port 207 in order to keep ports and addresses within a firewall 104 and/or firewall 124 open to communications between module 101 and server 105. Firewall port binding packet 211 can comprise a packet that is sent periodically using a timer interval that is shorter than the port-binding timeout period on a firewall 104 and firewall 124.

If UDP is utilized for message 208 and response 209, then a small UDP packet comprising firewall port binding packet 211 can be sent periodically such as every 45 seconds. If TCP is utilized for message 208 and response 209, then a small TCP packet comprising firewall port binding packet 211 can be sent periodically such as every 4 minutes. Other possibilities for the timing of sending firewall port binding packet 211 are possible as well. By sending firewall port binding packet 211 periodically, server 105 (i) can send module 101 a response 209, which could include a module instruction 502 as explained in FIG. 5a, at (ii) time intervals between message 208 and response 209 that are longer than the firewall port binding timeouts of firewall 104 and/or firewall 124. Without firewall port binding packet 211, if (A) a response 209 sent from server 105 at an exemplary 180 seconds after receiving message 208, such as after a firewall port binding timeout value of firewall 104 of an exemplary 60 seconds, then (B) response 209 would be dropped by firewall 104 and the response 209 would not be received by module 101.

FIG. 3a

Figure 3B:
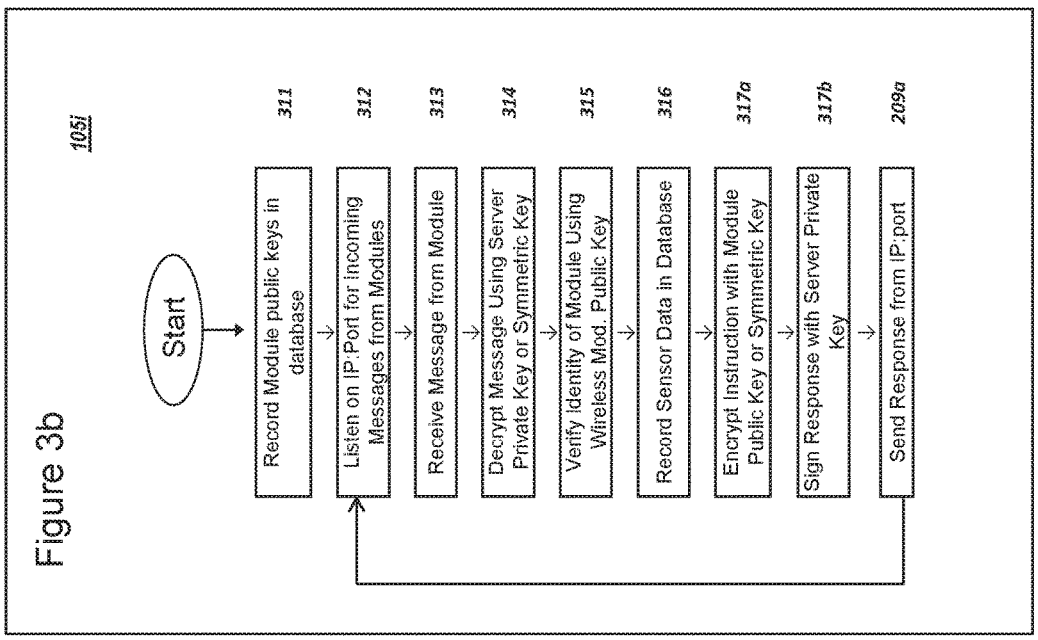
FIG. 3b is a flow chart illustrating exemplary steps for a server to receive sensor data from a module, in accordance with exemplary embodiments.
Figure 3A:
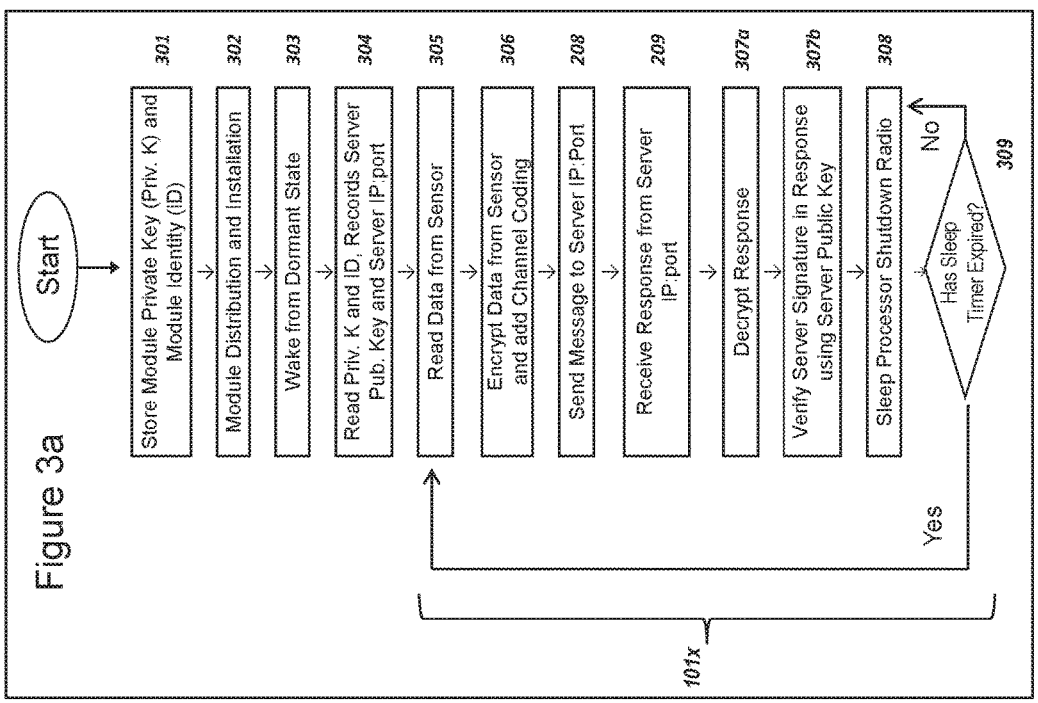
FIG. 3a is a flow chart illustrating exemplary steps for a module to send sensor data to a server, in accordance with exemplary embodiments.

FIG. 3a is a flow chart illustrating exemplary steps for a module to send sensor data to a server, in accordance with exemplary embodiments. As illustrated in FIG. 3a, FIG. 3a may include the data reporting steps 101x used by a module 101 in a module program 101i, where data reporting steps 101x and a module program 101i are depicted and described in connection with FIG. 1b above. The processes and operations, including data reporting steps 101x, described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

At step 301, before final distribution of the module to a sales channel, equipment distributors, or end users, a module private key 112 and module identity 110 could be recorded in non-volatile memory 101w of the module 101. The module private key 112 could be a private key formatted according to the X.500 series of standards published by the International Organization for Standardization (ISO) in ISO/IEC 9594 or similar and subsequent standards, or alternatively according to another format including a propriety format. The module private key 112 could be formatted using RSA encryption algorithms or ECC encryption algorithms, and other possibilities exist as well for the format of encryption and/or decryption keys without departing from the scope of the present invention. Note that step 301 contemplates an alternative to the case where a module 101 derives its own public and private keys using key pair generation algorithms 141e. Thus, the present invention also contemplates that a module private key 112 is derived outside module 101 and loaded into nonvolatile memory 101w. Note that in this case, where module private key 112 is loaded from an external source to module 101, that module 101 could still utilize other features contemplated herein, such as if module 101 needed to derive public and private keys in the future after the initial step 301.

Module identity 110 can be a unique identifier associated with module 101, and can represent a number or a string. The module private key 112 and module identity 110 could be recorded in non-volatile memory 101w by the manufacturer, or a service provider. Alternatively, the module private key 112 and module identity 110 could be recorded in non-volatile memory 101c by the end users. Module private key 112 and module identity 110 could be recorded in a Subscriber Identity Module (SIM) card that is inserted into module 101. At step 302, the module is distributed and installed in physical proximity to a monitored unit 119. Although step 301 is illustrated as occurring before step 302 according to an exemplary embodiment, step 301 can take place after step 302 or concurrently with step 302, and other possibilities exist as well without departing from the scope of the present invention.

After installation of the module 101, module 101 can wake from a dormant state in step 303. The dormant state can comprise a state of low power usage as described in FIG. 1c, in order to conserve battery life and wired bandwidth or wireless spectrum resources. As noted in FIG. 1c, module 101 can utilize a bootloader program 125 in order to initiate operations from a sleep or dormant state. At step 303, the module private key 112, module identity 110, server identity 206, and/or server address 106 could be moved from non-volatile memory 101w into RAM 101e. At step 304, the module 101 can read the module private key 112 and module identity 110 recorded in RAM 101e, and also record the server public key 114 and server IP:port 207. The server public key 114 and server IP:port 207 could also be either locally stored previous to step 304 in a non-volatile memory 101w, or obtained through the Internet 107 via a query to M2M service provider 108. As one example, module 101 could obtain the server public key 114 by establishing an Internet connection through a network such as a wireless network 102 and downloading the server public key 114 from server 105.

If module 101 utilizes a sleep or dormant state (according to exemplary sleep or dormant states depicted and described in connection with FIG. 1c of U.S. patent application Ser. No. 14/023,181, which is herein incorporated by reference) in order to conserve power consumption or energy utilization, then according to a preferred exemplary embodiment at step 304, after waking, module 101 can preferably read from nonvolatile such as a flash memory 101w each of (i) module private key 112, (ii) module identity 110, (iii) the server public key 114, (iv) server IP:port 207, and (v) data reporting steps 101x. The location of server 105 could be obtained via a DNS query using the server identity 206. Although not illustrated in FIG. 3a, server identity 206 and server IP:port 207 could also be recorded in non-volatile memory at step 301. Other means are possible as well for module 101 to obtain server public key 114 and server IP:port 207.

At step 305, the module 101 can read data from a sensor 101f. The data can comprise information regarding a monitored unit 119, as illustrated in FIG. 1a. As referenced herein, the data collected at step 305 may comprise a sensor measurement 305 or sensor data 305. At step 306, the module can utilize cryptographic algorithms 141 to (i) encrypt the data from sensor 101f using the server public key 114 and (ii) sign the encrypted data using the module private key 112. Note that a symmetric ciphering algorithm 141b may be used at step 306, but since the symmetric key 127 may be derived using the server public key 114, the sensor data 305 can be encrypted using the server public key (indirectly) at step 306. According to a preferred exemplary embodiment, the module can add channel coding to the data resulting from the steps taken in the previous sentence, although the channel coding can optionally be omitted. A more detailed description of the steps for encrypting and signing data from the sensor are included in FIG. 4a below.

After encrypting and signing sensor data, the module can send the data to the server 105 in message 208, where message 208 is formatted and sent according to a either a TCP or UDP packet. An exemplary format of message 208 is also depicted and described in connection with FIG. 6 below. Message 208 could be sent using the UDP Lite protocol, although the message could also be sent in a TCP datagram, after completing the initial TCP "handshakes" with server 105. Message 208 in the form of a UDP or TCP datagram can be sent from the module IP:port 204 to the server IP:port 207. Message 208 can also comprise sending the sensor data in multiple datagrams, including two or more copies of the same data. Although not illustrated in FIG. 3a, upon the first communication with a server 105, according to an exemplary embodiment, module 101 can send a certificate 122 to server 105, where certificate 122 would normally include module public key 111. Server 105 could utilize a certificate 122 to verify a module identity 110, as described in FIG. 4b below.

As illustrated in FIG. 3a, the module 101 can then receive reply from server 105 to the message 208 in the form of a response 209. Response 209 can be encrypted with the module public key 111 and signed with the server private key 105c, as depicted and described in connection with FIG. 4b below. An exemplary format of the response 209 is also depicted and described in connection with FIG. 6 below. The module 101 can receive the encrypted response 209 to message 208 in a datagram 209a that is sent from server IP:port 207 and received at module IP:port 204.

At step 307a, the module 101 can process the response 209 by decrypting the response 209 using the module private key 112 and cryptographic algorithms 141. At step 307b, module 101 can verify a digital signature of response 209 using the server public key 114 and cryptographic algorithms 141. Additional details regarding step 307a and 307b are depicted and described in connection with FIG. 5b below. Note that encryption of response 209 may be optionally omitted and a digital signature in response 209 may also be optionally omitted. Although not shown in FIG. 3a, if the module 101 cannot decrypt the response 209 or verify the digital signature of response 209, then the module 101 can drop the response 209 and optionally send message 208 again.

After the module 101 successfully processes response 209 in steps 307a and 307b, as shown in step 308, the module 101 can sleep the CPU 101b and/or shutdown the radio 101z. Step 308 could comprise the module 101 entering the "radio off" state 505a as depicted and described in connection with FIG. 6b of U.S. patent application Ser. No. 14/023,181 (the contents of which are hereby incorporated by reference in their entirety), and/or entering the "CPU off" state 505b as described in FIG. 6c of U.S. patent application Ser. No. 14/023,181. Step 308 could also comprise the module 101 sending a detach message to a wireless network 102 as depicted and described in connection with FIG. 6a of U.S. patent application Ser. No. 14/023,181. Thus, according to a preferred exemplary embodiment, module 101 can omit sending or receiving any further radio resource control messages after processing the encrypted and/or signed response 209, when completing step 308.

After entering the sleep state in step 308, the module can then periodically check a sleep timer at step 309, and wake from sleep if the timer has expired and report subsequent data from a sensor 101f to a server 105 by returning to step 305.

FIG. 3b

FIG. 3b is a flow chart illustrating exemplary steps for a server to receive sensor data from a module, in accordance with exemplary embodiments. As illustrated in FIG. 3b, FIG. 3b can represent the steps used by a server application 105i in a server 105 as illustrated in FIG. 1c. At step 312, the server 105 can open a TCP/UDP socket associated with an IP:port number 207 and listen for incoming message from wireless modules. At step 313, server 105 can receive a message 208 sent by module 101, using the IP:port number 207. Although not illustrated in FIG. 3b, upon the first communication from module 101 by server 105 where the communication could include step 313, according to an exemplary embodiment, module 101 can also send a certificate 122 to server 105, where certificate 122 would normally include module public key 111. Server 105 could utilize a certificate 122 to verify a module identity 110, as described in FIG. 4b below at step 412.

An exemplary format of message 208 is depicted and described in connection with FIG. 6 below. Although not illustrated in FIG. 3b, after receiving message 208, server 105 may also process any channel coding present in message 208 in order to eliminate any bit errors received. The channel coding could be included in a message 208 that utilizes the UDP Lite protocol. At step 314, server 105 can decrypt a message 208 using a cryptographic algorithm 141 and server private key 105c. Additional details regarding step 314 are depicted and described in connection with FIG. 4b below. At step 315, server 105 can verify that message 208 was sent by module 101 using a module identity 110, module public key 111, and a cryptographic algorithm 141. Additional details regarding step 315 are depicted and described in connection with FIG. 4b below. Note that step 315 can take place before step 314 if the module identity 110 and/or a digital signature is not encrypted within message 208 (i.e. a sensor measurement in message 208 could be encrypted but a module identity 110 or digital signature may not be encrypted).

After verifying the identity of module 101 in step 315, server 105 can record sensor data or sensor measurements within message 208 in a database 105k. The sensor data recorded in database 105k can be made available for subsequent processing by server 105 or other servers or applications associated with an M2M service provider 108 in order to manage the function and operation of module 101 or monitored unit 119. After receiving message 208, server 105 can process a response 209 at step 317a. Step 317a can comprise encrypting an instruction, where the instruction could include an acknowledgement of the message received, a command or setting for an actuator, and/or another control message for wireless module 101. Server 105 can utilize a module public key 111 and cryptographic algorithms 141 in order to encrypt the instruction. Step 317b can comprise creating a digital signature for the response 209 using the server private key 105c and cryptographic algorithms 141. Additional details regarding steps 317a and 317b are depicted and described in connection with FIG. 5a below. Note that step 317a and/or step 317b may optionally be omitted, such that response 209 is transmitted without encryption and a signature, and security could be obtained through other means, such as through firewalls 104 and 124, or using a secured network link between module 101 and server 105, such as setting up a VPN or SSH tunnel between the two endpoints. These alternative means for security at the network layer would likely require additional bandwidth and power consumption for a module 101 and thus may not be adequately efficient. As one example, if module 101 is a wireless module that sleeps for relatively long periods such as every hour (and obtains a new IP address for every wake period), setting up a new VPN between module 101 and server 105 in order to receive send a message from module 101 may not be practical due to the extra drain on a battery 101k for re-establishing the VPN.

After completing steps 317a and 317b, at step 209a, server 105 can send response 209 from the source port utilized to receive message 208 to a destination IP:port. The destination IP:port can comprise the source IP:port in message 208 as received by server 105, and the destination IP:port can represent the external interface of a firewall 104. In other words, server 105 may send response 209 from server IP:port 207 to the source IP:port received in message 208, which could represent the source IP:port on a wireless network firewall 104, wherein the source IP:port on the wireless network firewall 104 contains the firewall IP address 210. The wireless network firewall 104 could forward the response 209 to module IP:port 204. The response in step 209a can comprise a UDP packet or a UDP Lite packet, and the packet can optionally include channel coding. As contemplated herein, server 105 can send response 209 as soon as practical after receiving message 208, and in any case response 209 should be sent before the expiration of a firewall port binding timeout value associated with firewall 104. According to a preferred exemplary embodiment, response 209 is sent by server 105 within 1 second of receiving message 208. After completing step 209a as illustrated in FIG. 3b, server 105 can return to step 312 and listen for additional incoming messages 208 from modules 101.

FIG. 4a

Figures 4A, 4B:
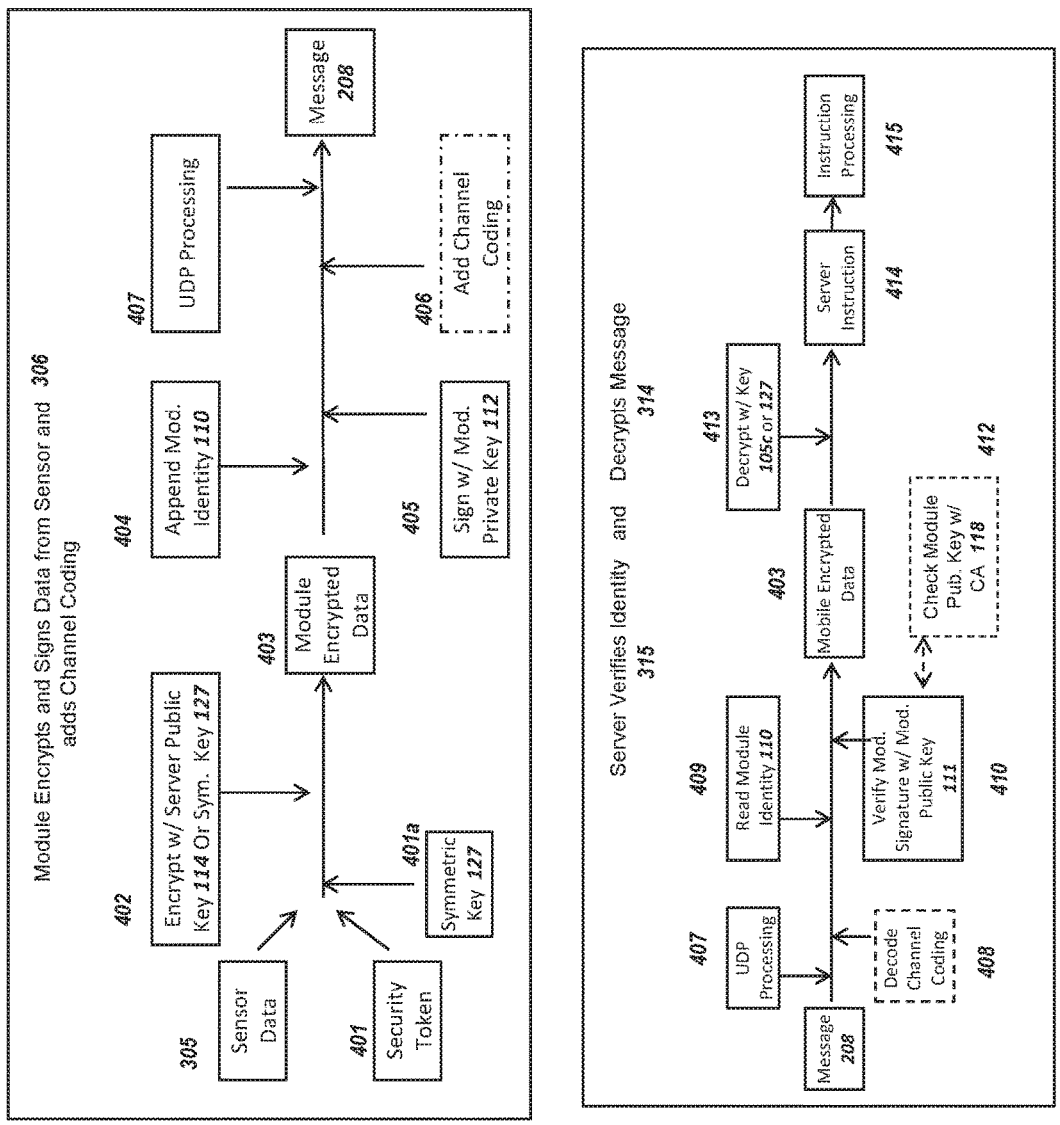
FIG. 4a a is a flow chart illustrating exemplary steps for a module to process a message, including encrypting sensor data and sending a digital signature, in accordance with exemplary embodiments.
FIG. 4b a is a flow chart illustrating exemplary steps for a server to process a message, including verifying a module's identity and decrypting sensor data, in accordance with exemplary embodiments.

FIG. 4a a is a flow chart illustrating exemplary steps for a module to process a message, including encrypting sensor data and sending a digital signature, in accordance with exemplary embodiments. The steps illustrated in FIG. 4a may comprise step 306 illustrated in FIG. 3a above. Since message 208 and response 209 may traverse the public Internet 107, according to an exemplary preferred embodiment, a module 101 and a server 105 can take additional steps in order to maintain security of a system 100. Since module 101 could connect from a wide variety of networks, such as LAN, wireless LAN, wireless WAN, etc., server 105 may preferably support module 101 connecting from any valid IP address. Securely supporting module 101 connecting to server 105 from any valid IP address may required the additional security steps described herein. In other words, server 105 may not be able to operate a whitelist of allowed IP addresses in a firewall 124 since the IP addresses may not be known before module 101 attempts to send a message 208. Module 101 can process a message 208 using the sequence of steps illustrated in FIG. 4a. For additional clarification, an exemplary format of a message 208, using the exemplary steps of FIG. 4a, is illustrated in FIG. 6 below. Note that the security methods described herein are optional, and message 208 and response 208 can be sent without the additional security steps described herein, but the use of these security steps may be preferred. FIG. 4a can contain the messages and steps shown within step 306 of FIG. 3a, where a module 101 processes message 208 before sending it to server 105 through the Internet 107.

As illustrated in FIG. 4a, in preparing a message 208 to send to server 105, module 101 can utilize a sensor measurement 305, where the sensor measurement 305 comprises sensor data acquired by a sensor 101f associated with module 101. A sensor measurement 305 is also depicted and described in connection with FIG. 1d above, and may comprise a string or number containing data regarding a parameter of a monitored unit 119. Sensor measurement 305 can also comprise a plurality of measurements or processed sensor measurements 305 such as an average value over time, high and low values, etc. Sensor measurement 305 could be either raw or processed data collected by a sensor 101f. Although not illustrated in FIG. 4a, module 101 could also include a server instruction 414, which could be a command for server 105 such as an update, query, notification, and server instruction 414 is described in FIG. 4b. A server instruction 414 could also be used by module 101 as input into step 402 below, where the server instruction 414 can be encrypted.

Module 101 may optionally add a security token 401, which could also be a random number, or a randomly generated text, binary, or hexadecimal string. Security token 401 could be created using random number generator 128 and included in message 208 in order to make each message 208 unique and thus avoid any replay attacks when message 208 traverses Internet 107 in order to securely reach server 105. A random number in security token 401 could be processed by module 101 using a seed 129 in a random number generator 128, where the seed utilizes data from sensor 101f as input into the seed, as illustrated in FIG. 1d above. Security token 401 could alternatively be a non-random number used to make message 208 unique, such as a timestamp with significant digits to milliseconds or microseconds, and other possibilities for security token 401 exist as well. In other words, the use of security token 401 can ensure to a high level of certainty that each message 208 will be different and thus the same data within message 208 would not be sent more than once (other than a short timeframe such as within a few seconds where the same UDP packet for a message 208 could be intentionally sent more than once in order to implement and support forward error correction).

At step 401a, if (i) module 101 is sending message 208 to server 105 for the first time, or (ii) expiration time 133 for a previous symmetric key 127 has transpired, then module 101 may preferably include a symmetric key 127 within message 208, where the symmetric key 127 would be encrypted using an asymmetric ciphering algorithm 141a with the module private key 112 at step 402. In this case of (i) or (ii) in the previous sentence, module 101 can securely send the symmetric key 127 to server 105, which could then utilize symmetric key 127 in a symmetric ciphering algorithms 141b at later steps. As noted in FIG. 1d, symmetric key 127 could be derived using cryptographic algorithms 141 and a random number from random number generator 128. If (a) module 101 has already sent a message 208 to server 105, or (b) expiration time 133 for a symmetric key 127 has not transpired (and thus symmetric key 127 would remain valid), then module 101 can omit including symmetric key 127 at step 401a.

At step 402, module 101 could utilize the sensor data 305, security token 401, server public key 114, server instruction 414 (not shown) and the cryptographic algorithms 141 to encrypt the sensor data 305 and security token 401. The output of step 402 can be module encrypted data 403. As one example, if (i) cryptographic algorithms 141 comprise the openssl libraries and (ii) asymmetric ciphering is utilized, security token 401 can be appended to sensor data 305, and at step 402 the openssl encryption function using server public key 114 can generate module encrypted data 403. If a symmetric key 127 is included within message 208, such as illustrated in the exemplary message 208 illustrated in FIG. 6 below, then module 101 preferably utilizes asymmetric ciphering 141a with private key 112 at step 402. The asymmetric ciphering 141a at step 402 may be processed according to RSA algorithms, elliptic curve cryptography (ECC) algorithms, or other asymmetric ciphering algorithms for either public key cryptography or proprietary methods.

Note that if (A) a symmetric key 127 is utilized for symmetric ciphering 141b between module 101 and server 105 at step 402, such utilizing as a symmetric key 127 which could be derived using ECDH, then (B) AES 155, Triple DES, or other symmetric ciphering algorithms 141b can be used at step 402 to generate module encrypted data 403. If symmetric ciphering 141b is utilized in step 402, exemplary symmetric ciphers AES 155 and Triple DES are depicted and described in connection with FIG. 1f above. If symmetric ciphering 141b with ECIES is utilized in step 402, then step 402 could utilize the steps outlined in FIG. 2, titled "ECIES Encryption Functional Diagram" in "A Survey of the Elliptic Curve Integrated Encryption Scheme" by Martinez et al in the Journal of Computer Science and Engineering, Volume 2, August 2010, page 10, (herein incorporated by reference). The use of (i) symmetric ciphering algorithms 141b, such as with AES 155, Triple DES, and similar secure symmetric ciphers, with (ii) symmetric key 127 may be preferred at step 402, if symmetric key 127 is available.

After processing module encrypted data 403, module 101 can add a module identity 110. Module identity 110 is illustrated in FIG. 4a as being added after the module 101 processes module encrypted data 403, although module identity 110 may optionally only be included in module encrypted data 403 if symmetric ciphering 141b with cryptographic algorithms 141 and symmetric key 127 is utilized, (i.e. module identity 110 could be included before step 402, where module identity could be included as an input into step 402 as opposed to being added after step 402). By including module identity 110 as external to module encrypted data 403 as illustrated in FIG. 4a at step 404, server 105 can use the unencrypted module identity 110 to pre-process or route a message before decrypting module encrypted data 403. For example, server 105 could utilize a message preprocessor 105y and module identity 110 outside of module encrypted data 403 to select a sub-server 105w. By including module identity 110 as external to module encrypted data 403, server 105 can use the unencrypted module identity 110 to select either (i) a module public key 111 or (ii) a symmetric key 127 from a database 105k in order to decrypt module encrypted data 403 or verify a digital signature. The exemplary message 208 illustrated in FIG. 6 below shows one example of a message 208 where module identity 110 is included as external to module encrypted data 403, which is also illustrated in FIG. 4a.

Note that a module identity 110 in message 208 but external to module encrypted data 403, then module identity 110 could be obfuscated or otherwise ciphered according to a pre-agreed algorithm with server 105. In other words, module identity 110 in a message 208 can represent the use of multiple unique strings or numbers over time that are uniquely associated with module 101, such as a first string for module identity 110 as recorded by module 101 and a second string for module identity 110 as recorded by a server 105. Module identity 110 could also comprise a session identifier, where the session identifier is uniquely associated with module identity 110 for a limited period of time, and a new session identifier is periodically generated by either module 101 or server 105. Thus, the use of a module identity 110 in a message 208 may comprise a different format or string than the module identity 110 preferably read from hardware, where the module identity 110 read from hardware could be a serial number, Ethernet MAC address, IMEI, etc. However, both can be utilized to uniquely identify a module 101 and thus are referred to herein as a "module identity" 110.

After appending module identity 110, module 101 can generate a module digital signature 405 using as input (i) the module private key 112 and (ii) module encrypted data 403 and module identity 110. The module digital signature 405 can be processed according to public key infrastructure (PKI) standards such as the National Institute of Standards (NIST) "FIPS 186-4: Digital Signature Standard" (which is hereby incorporated herein by reference), or IETF RFC 6979 titled "Deterministic Usage of the Digital Signature Algorithm (DSA) and Elliptic Curve Digital Signature Algorithm (ECDSA)" (which is hereby incorporated herein by reference). The use of a module digital signature 405 can be processed according to the description of a digital signature according to the Wikipedia entry for "Digital Signature" as of Sep. 9, 2013, which is incorporated by reference herein in its entirety. Module digital signature 405 may also comprise a Message Authentication Code (MAC) or tag. Also note that other uses of a digital signature as contemplated within the present invention may refer to the above three references and related standard techniques for processing and creating digital signatures.

Other PKI standards or proprietary methods for securely generating a module digital signature 405 may be utilized as well. According to a preferred exemplary embodiment, ECC algorithms for generating module digital signature 405 may be utilized in order to minimize the key length compared to RSA algorithms. Module digital signature 405 may comprise a secure hash signature using a secure hash algorithm 141c related to the secure hash algorithm 1 (SHA-1), or subsequent standards such as SHA-2 156 and SHA-3 157, and other possibilities exist as well. Module digital signature 405 is illustrated in FIG. 4a as being processed after module encrypted data 403, but module digital signature 405 may also optionally be included in module encrypted data 403. However, since module digital signature 403 can represent a secured hash signature that can contain limited useful information to a potential eavesdropper, module processing resources and energy can be conserved by including module digital signature 405 after and external to module encrypted data 403 (i.e. the benefits of encrypting module digital signature 405 may be limited). Also note that module digital signature 405 and the other secure digital signatures contemplated herein may be calculated with input from either (i) the plaintext in an encrypted message such as module encrypted data 403 or (ii) the ciphered data before conversion to plaintext, such as module encrypted data 403 before decryption at step 413.

Module 101 can then continue processing message 208 by including channel coding 406. Channel coding techniques for channel coding 406 could include block codes and convolution codes. Block codes could include Reed-Solomon, Golay, BCH, Hamming, and turbo codes. According to a preferred exemplary embodiment, channel coding 406 can utilize a turbo code, so that server 105 can correct bit errors received by server 105 in message 208. Alternatively, module 101 could implement channel coding by simply transmitting the same packet more than once and the use of block codes or convolution codes could be bypassed. Or, module 101 could implement channel coding by both transmitting the same packet more than once and also using a block code or convolution code in the body of the packet. The use of channel coding 406 can be preferred, since any bit errors received by server 105 within module encrypted data 403 or module digital signature 405 in message 208 could break a decryption or signature verification algorithm such as cryptographic algorithms 141 used by server 105. Thus, the use of channel coding 406 (with a transport protocol that supports the transmission of bit errors such as UDP with checksums disabled in IPv4 or UDP Lite) can ensure the decryption of message 208 is robust to bit errors. Bit errors may potentially generated by intermediate network links and nodes as message 208 traverses a wireless network 102 or Internet 107. Channel coding 406 may optionally be omitted, as illustrated in FIG. 4a.

As illustrated in FIG. 4a, module 101 can then format message 208 according to a transport protocol such as UDP within UDP processing 407 to create message 208. Other options besides the UDP processing illustrated in FIG. 4a are available as well, including TCP formatting, but UDP formatting may be preferred in order to minimize the number of packets transmitted as well as TCP overhead. Note that TCP overhead when using IPv6 can be significant, since the full series of TCP messages to establish a TCP session and transmit the message 208 may include about 4-6 packets, where each packet in the message includes a TCP header and a full 128 bit address for both the source IP address and the destination IP address. In contrast, UDP may preferably require only a single packet for message 208 and a single packet for response 209, thus significantly reducing the overhead and conserving either (i) a battery 101k life or (ii) energy usage by module 101 by reducing the data transmitted and received by module 101.

According to a preferred exemplary embodiment, UDP formatting 407 can be formatted according to the UDP Lite protocol (IETF RFC 3828) with IPv6, whereby UDP checksums can be partially disabled and channel coding 406 can be included in the UDP datagram to correct for bit errors. Note that the UDP and UDP Lite protocols may be updated in the future with subsequent standards, but the UDP formatting 407 may preferably continue to include both (i) partially or fully omitted packet checksums within the packet header and (ii) channel coding within the packet body. Also note that if IPv4 is utilized by module 101 and server 105, regular UDP (i.e. according to RFC 768) formatting may be utilized with channel coding 406 and checksums in the packet header may be disabled.

As illustrated in FIG. 4a, after adding UDP formatting 407, module 101 may record a fully formatted message 208. As illustrated in FIG. 2, message 208 can be sent by module 101 using a physical interface 101a such as radio 101z and a wireless network 102 and the Internet 107. Additional details regarding the structure of message 208 after taking the steps in FIG. 4a are shown in FIG. 6 below. The security and efficiency features of message 208 can be useful for module 101 to efficiently balance potentially competing priorities of conserving battery life/bandwidth utilization/energy while maintaining security.

FIG. 4b

FIG. 4b a is a flow chart illustrating exemplary steps for a server to process a message, including verifying a module's identity and decrypting sensor data, in accordance with exemplary embodiments. The steps illustrated in FIG. 4b may comprise step 315 and step 316 illustrated in FIG. 3b above. Server 105 can receive message 208 using IP:port 207, as illustrated in FIG. 2. Message 208 can be formatted according to the UDP protocol or UDP Lite protocol, although other possibilities exist as well without departing from the scope of the present invention At step 407, server 105 can process the packet using the appropriate transport layer protocol, such as UDP (the equivalent of step 407 in FIG. 4a above). In this step 407, the body of the packet comprising message 308 can be extracted, and a checksum, if any, can be calculated to verify the integrity. Note that if the UDP Lite protocol is utilized, the checksum may optionally only apply to the packet header. At step 408, server 105 can remove channel coding, if present in message 208. Channel coding techniques utilized in step 408 could include block codes and convolution codes, and can use the same channel coding algorithms used in channel coding 406 implemented by module 101, as depicted and described in connection with FIG. 4a above. By processing channel coding in step 408, server 105 can correct potential bit errors received in message 208, although channel coding 408 may be optionally omitted. As noted above, the use of channel coding 408 can be preferred, since any bit errors received within module encrypted data 403 in message 208 could break (i) a cryptographic algorithms 141 used by server 105 at subsequent steps 413, and/or (ii) the verification of module digital signature 405 at step 410 below.

At step 409, the server 105 can read and record the module identity 110, if module 110 is included in message 208 as external to module encrypted data 403 as illustrated in message 208 in FIG. 6 below. Although not illustrated in FIG. 4b, server 105 can select a module public key 111 for module 101 by querying a database 105k with module identity 110. As noted above in FIG. 4a, module identity 110 could comprise a string or session identifier, whereby server 105 could derive or track a module identity 110 from one message 208 to the next message 208 using the string or session identifier. By including module identity 110 in a message 208, but external to module encrypted data 403 such as illustrated in FIG. 6 below, a server 105 can utilize module identity 110 in order to select a server private key 105c or symmetric key 127 for decrypting module encrypted data 403. According to an exemplary embodiment, a plurality of server private keys 105c could be utilized, where a first private key 105c is used with a first set of modules 101 and a second private key 105c is used with a second set of modules 101. By reading the module identity 101 outside of module encrypted data 403, the module identity 110 can be read before decryption, in order to identify which of the first or second set server private keys 105c that module 101 is associated with, and thus server 105 can subsequently select the first or second set of server private keys 105c to use when decrypting module encrypted data 403.

Alternatively, if server 105 operates in a distributed environment (such as comprising multiple sub-servers 105w as illustrated in FIG. 1e), an unencrypted module identity 110, including a session identifier, within a message 208 can be utilized by a message preprocessor 105y to select the appropriate sub-server 105w to process the message 208 and server 105 could forward the message 208 to the correct sub-server 105w. At step 410, server 105 can validate and verify the module identity 110 using the module digital signature 405 inserted by module 101 in message 208. As described in FIG. 4a above, module digital signature 405 can comprise a secure hash signature or tag, where module 101 generated the hash signature using the module private key 112 and digital signature algorithms 141d. As one example, server 105 can utilize the module public key 111 recorded in memory 105e to securely validate the module digital signature 405 receive in a message 208.

The module digital signature 405 can be verified according to public key infrastructure (PKI) standards such as the National Institute of Standards (NIST) "FIPS 186-4: Digital Signature Standard", or IETF RFC 6979 titled "Deterministic Usage of the Digital Signature Algorithm (DSA) and Elliptic Curve Digital Signature Algorithm (ECDSA)". Other PKI standards or proprietary techniques for securely verifying a module digital signature 405 may be utilized as well. If message 208 comprises an initial communication from module 101, at step 412 server 105 can verify that module public key 111 is associated with module identity 110 using a module certificate 122, where certificate 122 includes a signature 123 from a certificate authority, as illustrated in FIG. 1g. Server 105 could receive certificate 122 before module 101 sends message 208, or server 105 could query module 101 for certificate 122 after receiving message 208. Server 105 could use digital signature algorithms 141d to compare a secure hash calculated using (i) a first certificate 122 and/or public key from module 101 and (ii) a second certificate and/or public key from certificate authority 118, in order to confirm that module public key 111 is associated with module identity 110. The secure hash could also be calculated using module public key 111 and a public key from certificate authority 118, and other possibilities using PKI exist as well for server 105 to confirm module public key 111 is associated with module identity 110 at step 412.

Steps 409 and 410 are not required to utilize the efficient techniques described herein, and may optionally be omitted. As one example, security could be maintained at the network layer through the use of wireless network firewall 104 and server network firewall 124, such that only an inbound message 208 to server 105 could be received by server 105 after security methods are applied at the network layer. Note that if module encrypted data 403 includes module identity 110 and module digital signature 405, then steps 409 and 410 may take place after step 413, where server 105 first decrypts module encrypted data 403 and can then verify module identity 110 by performing steps 409 and 410 after step 413. If module encrypted data 403 utilizes a symmetric cipher 141b, then a module identity 110 can preferably be external to module encrypted data 403 so that server 105 can select the appropriate symmetric key 127 used by module 101 in order to decipher module encrypted data 403 (since a plurality of modules 101 may communicate with server 105 at the same time).

After verifying module digital signature 405 in step 410, server 105 can record an authenticated module encrypted data 403 from module 101 received in message 208. At step 413, server 105 can decrypt module encrypted data 403 using cryptographic algorithms 141 and either (i) server private key 105c as a decryption key with asymmetric ciphering 141a or (ii) symmetric key 127 with symmetric ciphering 141b. A symmetric key 127 may be stored in a database 105k, as noted in FIG. 1e above.

With an asymmetric ciphering 141a scheme used in a module encrypted data 403 and by cryptographic algorithms 141 at step 413, server 105 can decrypt module encrypted data 403 using (i) server private key 105c and (ii) RSA algorithms 153, elliptic curve cryptography (ECC) algorithms 154, or other algorithms for public key cryptography. The use and application of RSA algorithms 153 and cryptography are described within IETF RFC 3447, among other published standards. The use and application of ECC cryptography and algorithms are described within IETF RFC 6637, among other published standards. ECC algorithms 154 may be preferred in order to maintain high security with small key lengths, compared to RSA, in order to minimize the message lengths, radio frequency spectrum utilization, and processing power required by wireless module 101. Thus, the use of ECC algorithms within a decryption algorithm at step 413 may help conserve the life of a battery 101k of module 101 while maintaining the objective of securing system 100. Note that module encrypted data 403 may also include a security token 401, which could comprise a random string, and thus each module encrypted data 403 received by server 105 in message 208 may be reasonably considered unique and thus robust against replay attacks.

With a symmetric ciphering 141b scheme used in a module encrypted data 403 and by cryptographic algorithms 141 at step 413, server 105 can decrypt module encrypted data 403 using (i) symmetric key 127 and (ii) a symmetric cipher 141b such as AES 155, Triple DES, or similar secure symmetric ciphers. As one example, by using ECC cryptography and ECIES, server 105 could decrypt module encrypted data at step 413 by using the steps outlined in FIG. 3, titled "ECIES Encryption Functional Diagram" in "A Survey of the Elliptic Curve Integrated Encryption Scheme" by Martinez et al in the Journal of Computer Science and Engineering, Volume 2, August 2010, page 11, (herein incorporated by reference). Other possibilities exist as well without departing from the scope of the present invention. Server 105 can utilize step 413 illustrated in FIG. 4b to extract the plaintext, or decrypted data within module encrypted data 403.

After decrypting module encrypted data 403, server 105 can read the resulting data within message 208, which could comprise a server instruction 414. The server instruction 414 can represent the purpose of the message 208 for server 105. Server instruction 414 could comprise a plurality of different procedures for server 105, such as an "update" with sensor data, a "query" for data or instructions from server 105 or M2M service provide 108, a "notification" of state or condition at module 101 such as an alarm or error, a "configuration request" where module 101 seeks configuration parameters, a "software request" where module 101 request updated software or routines, a "registration" message where module 101 periodically registers with server 105, etc. Thus, server instruction 414 can comprise the purpose module 101 sends message 208. In addition, server instruction 414 could comprise a "confirmation", where module 101 sends a "confirmation" in a second message 208 after receipt of a response 209, where response 209 could include a module instruction 502 (below), and the "confirmation" in this second message 208 could signal server 105 that the module instruction 502 had been properly executed. As contemplated herein, the term "Message (update)" can comprise a message 208 that includes a server instruction 414 of "update", and the term "Message (confirmation)" can comprise a message 208 that includes a server instruction 414 of "confirmation", etc.

As examples for server instruction 414, an "update" could be used to periodically notify server 105 of regular, periodic sensor data 305 acquired by a sensor 101f. An "update" for server instruction 414 may also comprise a periodic report regarding monitored unit 119 or information regarding a state, condition, or level for an actuator 101y. A "query" for server instruction 414 could comprise module 101 querying server 105 for data from a database 105k, where the data could be associated with monitored unit 119, wireless network 102, an element within module 101 such as an actuator setting. A "notification" for server instruction 414 could comprise module 101 notifying server 105 that an alarm or error condition has occurred, such as a sensor measurement exceeds a threshold value or another error condition such as loss of contact with monitored unit 119. A "configuration request" for server instruction 414 could comprise module 101 requesting server 105 for configuration parameters or a configuration file. Other possibilities for server instruction 414 exist without departing from the scope of the present invention.

At step 415, server 105 can process the server instruction 414. If server instruction 414 comprises an "update", then sensor data 305, or other data in server instruction 414 including potentially a new symmetric key 127 generated by module 101, could be recorded in database 105k, Other applications may subsequently access the sensor data 305 for generating reports or making decisions regarding monitored unit 119. If server instruction 414 comprises a "query", then server 105 could execute the query at step 415. If server instruction 414 comprises a "notification" of an alarm, then step 415 could initiate procedures for alarm notification to 3rd parties or alarm resolution. Other possibilities for processing a server instruction 414 at step 415 exist without departing from the scope of the present invention.

FIG. 5a

Figures 5A, 5B:
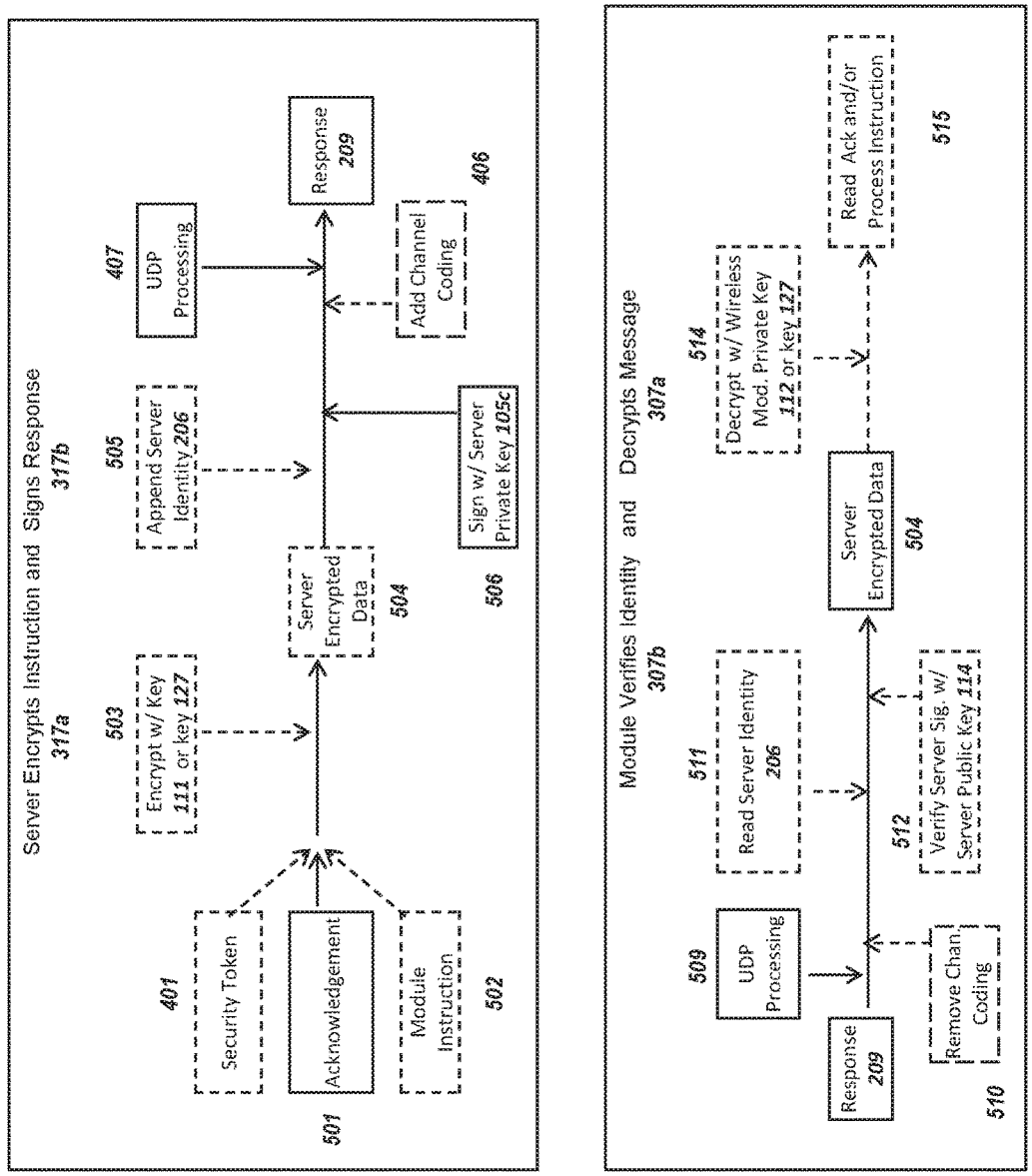
FIG. 5a is a flow chart illustrating exemplary steps for a server to process a response for the module, including sending and signing an module instruction, in accordance with exemplary embodiments.
FIG. 5b a is a flow chart illustrating exemplary steps for a module to process a response from the server, including verifying a server's identity and decrypting instructions, in accordance with exemplary embodiments.

FIG. 5a is a flow chart illustrating exemplary steps for a server to process a response for the module, including sending and signing a module instruction, in accordance with exemplary embodiments. The steps illustrated in FIG. 5a may comprise step 317a and step 317b illustrated in FIG. 3b above. Since message 208 and response 209 may traverse the public Internet 107, a module 101 and a server 105 may prefer to take additional steps in order to maintain security of a system 100. Server 105 can process a response 209 to a message 208 from module 101 using a module public key 111 and a server private key 105c, according to a preferred exemplary embodiment. If a symmetric cipher 141b is utilized within cryptographic algorithms 141, then server 105 may also utilize a symmetric key 127 to encrypt data within a response 209. Note that the security methods described herein are optional, and message 208 and response 208 can be sent without the additional security steps described herein, but the use of these security steps may be preferred.

After receiving message 208 as illustrated in FIG. 2, server 105 can prepare an acknowledgement 501. The acknowledgement 501 can be a simple text, binary, or hexadecimal string to confirm that message 208 has been received by server 105. Since message 208 may be transmitted via a UDP or UDP Lite packet, module 101 may preferably utilize a reply message from server 105 containing acknowledgement 501, in order to confirm message 208 has been received by server 105. Alternatively, if TCP is used to transmit message 208, an acknowledgement 501 may be used at the application layer of the Open Systems Interconnection (OSI) model, wherein a simple TCP ACK message may operate at the lower transport layer. UDP may be preferred over TCP in order to reduce processing resources for module 101 and server 105, especially considering the relatively small and comparably infrequent messages sent between a module 101 and a server 105 (when compared to web browsing and considering module 101 may have a battery that should last for weeks or longer without recharging). In processing a response 209, server 105 may optionally add a security token 401, which could be a random number, or a randomly generated text, binary, or hexadecimal string. Security token 401 could be a random number or string that is included in response 209 in order to make each response 209 unique and thus avoid any replay attacks when response 209 traverses Internet 107.

In other words, the use of security token 401 can ensure to a high level of certainty that each response 209 will be different and thus the data within response 209 would not be sent more than once. Note that security token 401 may be generated by module 101 in message 208, and in this case server 105 can use the same security token received in message 208. Security token 401 can alternatively be generated by server 105 and different than any security token received in message 208. As one example, server 105 could use a first security token 401 received in message 208 to process a second security token 401, where the second security token 401 is generated using (i) a pre-agreed algorithm between module 101 and server 105 and (ii) the first security token 401 as input into the pre-agreed algorithm. Security token 401 illustrated in FIG. 5a can be derived or processed by using message 208 in accordance with preferred exemplary embodiments.

Server 105 may also optionally add a module instruction 502 when preparing a response 209. The module instruction 502 could be a string that contains instructions or configuration parameters for module 101, such as an order to change state, parameters regarding the monitoring of monitored unit 119, server names or addresses, radio frequency parameters, wireless network 102 authentication parameters or keys, keys for communication with server 105 or M2M service provider 108, etc. Module instruction 502 may also comprise an instruction to change the state of actuator 101y, a timer value, a sensor threshold value, the threshold for an alarm state, and information for display at a user interface 101j, an instruction to sleep, etc. Module instruction 502 may further comprise an updated module private key 112, and updated server public key 114, or the address or name of a new server 105 added to M2M service provider 108. According to an exemplary preferred embodiment, a module instruction 502 could comprise a "key generation" instruction, where module 101 generates a new set of module private key 112 and module public key 111, utilizing the exemplary steps and procedures illustrated in FIG. 8 through FIG. 10 below. The "key generation" module instruction could create new keys for a new purpose (such as connecting to a new wireless network 102 or communicating with a new server 105), while the existing keys used to communicate with server 105 could remain operable or be deprecated.

In order to control module 101, server 105 would normally need to include module instruction 502 in the response 209 only after receiving message 208, since the server 105 would normally not be able to send messages to a module 101 at arbitrary times, such as before a message 208 has been received by the server 105. The reasons are (i) the module may normally be in a sleep or dormant state, in order to conserve battery life or power consumption, where an unsolicited incoming Internet packet from server 105 would not be received by module 101, and (ii) a wireless network 102 (or equivalent wired network that a wired module 101 could connect with) may frequently include a firewall 104. Firewall 104 could prevent packets from the Internet 107 from reaching module 101 unless module 101 had previously first sent a packet to server 105 within a port-binding timeout period of firewall 104. The port-binding timeout period of a firewall 104 may be an exemplary period such as 20-60 seconds for UDP packets and several minutes for TCP packets. Note that module instruction 502 may optionally be omitted, such that (b) some response 209 messages may include module instruction 502, and (b) other response 209 messages may omit module instruction 502, but include an acknowledgement 501 to message 208. Also note that according to an exemplary embodiment described herein, the use of optional strings or steps can be depicted in FIGS. 4a-5b through the use of dashed lines for the various elements illustrated.

Server 105 may then use as input the acknowledgement 501, security token 401, and module instruction 502, including optional data and parameters, into cryptographic algorithms 141 at step 503. The cryptographic algorithms 141 at step 503 can utilize either (i) module public key 111 as an encryption key if asymmetric ciphering 141a is utilized, or (ii) a shared symmetric key 127 if a symmetric cipher 141b is utilized, such as AES 155 ciphering. The output of cryptographic algorithms 141 at step 503, using acknowledgement 501, security token 401, and module instruction 502, plus optional data and parameters, as input, can be server encrypted data 504, as illustrated in FIG. 5a. Server encrypted data 504 could be a string or number, including a text, binary, or hexadecimal string or series of numbers or bits, and other possibilities for the formal of server encrypted data 504 exist as well, including a file, without departing from the scope of the present invention. By using module public key 111 and/or symmetric key 127 in the cryptographic algorithms 141 at step 503, server encrypted data 504 may only be reasonably decrypted by module 101 using module private key 112 and/or symmetric key 127, as described below in FIG. 5*b*. Thus the response 209 transmitted across an Internet 107 may be reasonably considered secure.

Server 105 can then process server encrypted data 504 by appending or including server identity 206. Note that server identity 206 can be appended or included after the operation of step 503, since the server identity 206 may optionally be openly readable within a response 209 transmitted or sent to module 101. As one example, server identity 206 could comprise IP address 106 as a source IP address in response 209, which would be openly readable on the Internet 107 since a valid packet must have a source and destination IP address. Additional details on an exemplary structure of response 209 are illustrated in FIG. 6 below. By including server identity 206 after encryption at step 503, the module can read the server identity 206 and verify a digital signature within response 209 without having to first decrypt data within response 209 using the module private key 112 or symmetric key 127 as described in FIG. 5*b* below. Note that server identity 206 could alternatively be included within server encrypted data 504, such that step 505 takes place before step 504. In other words, including server identity 206 after encryption algorithm 503 can be used by module 101 to select the proper server public key 114 when verifying a digital signature in response 209.

Server 105 can then process a server digital signature 506 using the server private key 105*c*. The server digital signature 506 can be processed according to public key infrastructure (PKI) standards such as the National Institute of Standards (NIST) "FIPS 186-4: Digital Signature Standard" (which is hereby incorporated herein by reference), or IETF RFC 6979 titled "Deterministic Usage of the Digital Signature Algorithm (DSA) and Elliptic Curve Digital Signature Algorithm (ECDSA)" (which is hereby incorporated herein by reference). The use of a server digital signature 506 can be processed according to the description of a digital signature according to the Wikipedia entry for "Digital Signature" as of Sep. 9, 2013, which is incorporated by reference herein in its entirety. Also note that other uses of a digital signature as contemplated within the present invention may refer to the above three references and related standard techniques for processing and creating digital signatures. Other PKI standards or proprietary methods for securely generating a server digital signature 506 may be utilized as well.

According to a preferred exemplary embodiment, ECC algorithms for generating server digital signature 506 may be utilized in order to minimize the key length compared to RSA algorithms. Server digital signature 506 may comprise a secure hash signature using a hash algorithm such as secure hash algorithm 1 (SHA-1), or subsequent standards such as SHA-2 and SHA-3, and other possibilities exist as well. Server digital signature 506 is illustrated in FIG. 5*a* as being processed after server encrypted data 504, but server digital signature 506 may also optionally be included in server encrypted data 504. However, since server digital signature 506 can represent a secured hash signature which preferably contains limited useful information to a potential eavesdropper in a plaintext form, processing resources can be conserved by including server digital signature 506 after and external to server encrypted data 504 (i.e. the benefits of encrypting server digital signature 506 are limited). Step 506 may also take place before step 505.

Also note that server digital signature 506 may preferably be included in a response 209 before module 101 begins utilizing symmetric key 127 in step 514 below to process a module instruction 502. After including server digital signature 506 in a first response 209 that uses asymmetric ciphering 141*a*, server 105 may omit server digital signature 506 in a second subsequent response. The second subsequent response could be a case where (i) server encrypted data 504 utilizes a symmetric key 127 for ciphering (where server 105 received the symmetric key 127 in a message 208 that utilized asymmetric ciphering 141*a* as illustrated in FIG. 4*a* above) and (ii) expiration time 133 of symmetric key 127 has not transpired. According to an exemplary preferred embodiment, response 209 may include both (i) a server digital signature 506, and (ii) server encrypted data 504, where (x) the server encrypted data 504 is processed using a symmetric key 127 and a symmetric ciphering algorithm 141*b*, where the symmetric key 127 was received in a message 208, and (y) the server encrypted data 504 can include a security token 401. In this manner, a response 209 can be more efficient than conventional technology including SSL, TLS, SSH, because (i) utilizing the symmetric key 127 in response 209 will require less processing resources by module 101 than receiving a response ciphered with an asymmetric cipher 141*a*, and (ii) combining a server digital signature 506 with server encrypted data 504 can securely reduce the packets transmitted and received, which conserves energy for a module 101, including the lifetime of a battery 101*k*. Response 209 illustrated in FIG. 6 includes an exemplary response 209 comprising server encrypted data 504, server identity 206, and a server digital signature 506 within the same datagram. The server digital signature 506 may be useful, because otherwise the module public key may be public and another entity besides the server 105 may attempt to sent response 209.

Although energy may be conserved for a module 101 utilizing the exemplary steps illustrated in FIG. 5*a* and elsewhere herein, a high level of security is desirable for many "machine-to-machine" applications. A module 101 may be utilized for industrial applications or health monitoring, where the receipt of unauthorized module instructions 502 from $3^{rd}$ parties could results in damages or losses. Without proper security, response 209 could include a module instruction 502, and module 101 could potentially receive commands or instructions from sources other than server 105, such as hackers.

FIG. 5*b*

FIG. 5*b* a is a flow chart illustrating exemplary steps for a module to process a response from the server, including verifying a server's identity and decrypting instructions, in accordance with exemplary embodiments. Module 101 can perform the steps illustrated in FIG. 5*b* in order to securely and efficiently process a response 209 from server 105. The steps illustrated in FIG. 5*b* may comprise steps 307*a* and 307*b* illustrated in FIG. 3*a*. Module 101 can receive response 209 using IP:port 204, as illustrated in FIG. 2. Response 209 can be formatted according to the UDP protocol or UDP Lite protocol, although other possibilities exist as well for the transport layer formatting of response 209, including TCP.

At step 509, module 101 can process the packet using the appropriate transport layer protocol, such as UDP. In this step 509, the body of the packet comprising response 209 can be extracted, and a checksum, if any, can be calculated to verify the integrity. An exemplary format of response 209 is depicted and described in connection with FIG. 6 below. Note that if the UDP Lite protocol is utilized, the checksum may optionally only apply to the packet header. At step 510, module 101 can process and remove channel coding, if channel coding is present in response 209. Note that if a wireless network 102 comprises a IEEE 802.15.4 network, then UDP Lite may preferably utilized, and UDP Lite may preferably be utilized if wireless network 102 is a PLMN mobile network and the PLMN mobile network supports UDP Lite. Channel coding techniques utilized in step 510 could include block codes and convolution codes, and can use related algorithms as used in channel coding 406. By processing channel coding in step 510, module 101 can correct potential bit errors received in response 209. As noted above, the use of channel coding 510 can be preferred, since any bit errors received within server encrypted data 504 in response 209 could break (i) a cryptographic algorithms 141 used by module 101 at subsequent step 514, and/or (ii) the verification of server digital signature 506 at step 512.

At step 511, module 101 can read and record the server identity 206. Server identity 206 may preferably be a string that is external to server encrypted data 504 within response 209, as illustrated in FIG. 6 below. The server identity 206 can preferably match a server identity 206 used in message 208. The server identity 206 could also comprise the source IP address 106 of response 209, or a domain name resolving to the source IP address 106, or a domain name associated with IP address 206. Server identity 206 may also be uniquely associated with an identity in the "Common Name" (CN) field of a certificate 122 for server 105. Receiving or processing a server identity within a response 206 may optionally be omitted, if module 101 can select the appropriate server public key 114 without first obtaining server identity 206. At step 512, module 101 can validate and verify the server identity 206 using the server digital signature 506 inserted by server 105 in response 209. As described in FIG. 5a above, server digital signature 506 can comprise a secure hash signature, where server 105 generated the hash signature using as input into a digital signature algorithms 141d (i) the server private key 105c and (ii) server encrypted data 504. Module 101 can utilize the server public key 114 recorded in memory to securely validate the server digital signature 504, also by using digital signature algorithms 141d.

The server digital signature 504 can be verified according to public key infrastructure (PKI) standards such as the National Institute of Standards (NIST) "FIPS 186-4: Digital Signature Standard", or IETF RFC 6979 titled "Deterministic Usage of the Digital Signature Algorithm (DSA) and Elliptic Curve Digital Signature Algorithm (ECDSA)". Other PKI standards or proprietary methods for securely verifying a server digital signature 504 may be utilized as well. Module 101 can verify server digital signature 504 using steps equivalent to the steps a server 105 utilizes to verify a module digital signature 405 in step 410 depicted and described in connection with FIG. 4b above. Also, server digital signature 506 could optionally be included in server encrypted data 504, where step 512 could take place after step 514. But, since server digital signature 506 may comprise a secure hash signature, any benefits from ciphering the secure hash may be small while requiring additional processor resources.

Note that if module 101 had previously received server digital signature 504 in a previous response 209, then steps 511 and 512 may optionally be omitted within a subsequent response 209. In other words, after module 101 receives a valid server digital signature 504, server 105 may then transmit a subsequent server digital signature 504 periodically according to rules based upon the security requirements of the application. As one example, if (a) after sending a symmetric key 127 in a message 208 to server 105 and receiving a response 209 to the message 208 with (i) a valid server digital signature 504 and (ii) a server encrypted data 503 using symmetric key 127, then (b) module 101 can subsequently have reasonable assurance that subsequent responses 209 using symmetric key 127 are also from server 105. Requirements for higher security could result in a response 209 including a server digital signature 504 more frequently, including possibly within every response 209, and requirements for lower security could result in a response 209 including a server digital signature 504 less frequently, such as an exemplary every few hours or every day. According to a preferred exemplary embodiment, when module 101 sends a new symmetric key 127 using an asymmetric ciphering algorithms 141b, the response 209 from server 105 with server encrypted data 504 (where the server encrypted data 504 was created using the new symmetric key 127) can preferably include a server digital signature 506.

In addition, security could be further enhanced at the network layer through the use of network firewall 104 and server network firewall 124, such that only an inbound response 209 to module 101 could be received from server 105 after module 101 sends message 208, and note this configuration may often be the case with module 101 on commercial wireless networks 102. However, the at least periodic use of steps 511 and 512 may be preferred, such as the case when module provider 109 or module 101 may not control or know the presence or configuration of any network firewall 104. As one example, if IPv6 is used in system 100 and all IP addresses are publicly routable, then any node with an IPv6 address connected to the Internet 107 could potentially send a response 209, and in this case steps 511 and 512 may be preferred. Even if steps 511 and 512 are omitted, subsequent steps such as 514 may be used to ensure response 209 was sent by server 105.

Although not illustrated in FIG. 5b, upon completing step 512, module 101 may also preferably also verify the server identity 206 of server 105 using a certificate 122 associated with server 105 and the public key of a certificate authority 118. To verify the server identity 206, module 101 could utilize the steps depicted and described in connection with step 412 illustrated in FIG. 4b. Module 101 could request a certificate 122 associated with server 105 and calculate a secure hash signature 123 using cryptographic algorithms 141 and a certificate authority public key 131. Other possibilities exist as well for module 101 to verify the identity of server 105 without departing from the scope of the present invention. As one alternative, module 101 could utilize Domain Name System Security Extensions (DNSSEC), as specified in multiple IETF RFCs including RFC 4033, 4034, and 4035 to securely resolve server identity 206 into IP address 106. For example, module 101 could verify that the source IP address within response 209 matches a DNSSEC record for server name 206.

After verifying server digital signature 506 in step 512, module 101 can record an authenticated server encrypted data 504 from server 105. Authenticated server encrypted data 504 may comprise an acknowledgement that server 105 received message 208. Authenticated server encrypted data 504 may be useful if the UDP or UDP Lite protocol is used to send message 208, since UDP is a connectionless protocol and module 101 may need confirmation that server 105 received message 208. Note that if steps 511 and 512 are omitted, then authenticated server encrypted data 504 may comprise a simple acknowledgement that server 105 received message 208. Although not illustrated in FIG. 5*b*, if module 101 does not receive response 209 or server encrypted data 504 before a timer expires, such as within an exemplary duration of 2 seconds, then module 101 can resend message 208.

At step 514, module 101 can decrypt server encrypted data 504 using either (i) module private key 112 as a decryption key if asymmetric ciphering 141*a* is utilized to process server encrypted data 504, or (ii) symmetric key 127 if symmetric ciphering 141*b* is utilized to process server encrypted data 504. Module 101 can utilize cryptographic algorithms 141 and the key in order to decrypt the server encrypted data 504 at step 514. Module 101 can utilize techniques to decrypt server encrypted data 504 that are described in connection with creating module encrypted data 403 described in FIG. 4*a* above. If server encrypted data 504 uses an asymmetric ciphering, the cryptographic algorithms 141 used in step 514 may be processed according to RSA algorithms, elliptic curve cryptography (ECC) algorithms, or other algorithms for public key cryptography, as described previously herein. ECC algorithms may be preferred with asymmetric ciphering in order to maintain high security with small key lengths, compared to RSA, in order to minimize the message lengths, radio frequency spectrum utilization, and processing power required by wireless module 101. If server encrypted data 504 uses symmetric ciphering 141*b*, the cryptographic algorithms 141 can use symmetric key 127 to decrypt server encrypted data 504 at step 514.

Module 101 and server 105 could utilize a pre-agreed protocol in order to select the use of asymmetric ciphering 141*a* or symmetric ciphering 141*b* in a response 209. According to an exemplary embodiment, module 101 and server 105 (*i*) utilize asymmetric ciphering 141*a* when transmitting symmetric keys 127 or other keys such as pre-shared secret keys, new private keys, etc., and (ii) utilize symmetric ciphering 141*b* at other times (i.e. when not sending/receiving a key). Since the exemplary response 209 illustrated in FIG. 6 does not contain a symmetric key, module 101 can utilize symmetric ciphering at step 514 with symmetric key 127 to decrypt server encrypted data 504 at step 514.

As noted in FIG. 5*a* above, response 209 may include a module instruction 502. By including module instruction 502 in server encrypted data 504 and response 209, the module instruction 502 can be read and processed by device 101 at step 515, after the server encrypted data 504 is decrypted at step 514. Module 101 can subsequently perform the module instruction 502 in step 515. Note that server encrypted data 504 may optionally include an acknowledgement 501 that message 208 was received by server 105. In this manner, an "ACK" response to message 208 can be securely transmitted by server 105 and received by module 101. Upon completion of the processing of response 209 illustrated in FIG. 5*b*, module 101 can perform functions such entering the sleep or dormant states illustrated at step 308 in FIG. 3*a*, thus conserving battery life (if present in module 101) or energy while maintaining a secure, robust, and highly scalable system 100.

FIG. 6

FIG. 6 is a simplified message flow diagram illustrating an exemplary message received by a server, and an exemplary response sent from the server, in accordance with exemplary embodiments. FIG. 6 illustrates exemplary details within message 208 sent by module 101 and also response 209 sent by server 105. Message 208 may comprise a TCP/UDP packet 601*a* sent from module 101 source IP:port 204 to server 105 destination IP:port 207. According to an exemplary embodiment, UDP or UDP Lite formatting for TCP/UDP packet 601*a* may be preferred. Source IP:port 204 and destination IP:port 207 in message 208 may be included within a header in TCP/UDP packet 601*a*. Although a single message 208, response 209, module 101, and server 105 are shown in FIG. 6, system 100 as illustrated in FIG. 2 may comprise a plurality of each of these elements. As contemplated herein, the term "datagram" may also refer to a "packet", such that referring to an element as datagram 601*a* can be equivalent to referring to packet 601*a*.

TCP/UDP packet 601*a* may include a body 602, which can represent the data payload of TCP/UDP packet 601*a*. The data payload of message 208 can preferably include channel coding 406 as described in FIG. 4*a* above, if the transport protocol for TCP/UDP packet 601*a* supports the transmission of bit errors in the body 602 (as opposed to entirely dropping the packet), such as with the UDP Lite protocol. Support for the transmission of bit errors in body 602 by wireless network 102 would be preferred over entirely discarding a packet, since the applications such as module program 101*i* and server application 105*i* could include support for and utilization of channel coding 406. Without UDP Lite formatting, message 208 can alternatively sent by module 101 as a UDP datagram, such as if wireless network 102 (or a wired connection) does not support the UDP Lite protocol. Note that in this case (no support for the transmission of bit errors in a body 602), wireless network 102 and nodes within Internet 107 would preferably include channel coding on the data link layers of the OSI stack in order to maintain robustness to bit errors at the physical layers of various hops along the path between module 101 and server 105. Note that if (A) message 208 comprises (i) regular UDP or TCP formatting (i.e. not UDP Lite or similar variations) within an IPv6 network, or (ii) a UDP or TCP format within an IPv4 network with checksums enabled, then (B) channel coding 406 may optionally be omitted.

The body 602 can include a module identity 110, a module digital signature 405, module encrypted data 403, and channel coding 406. Module identity 110 is illustrated in FIG. 6 as external to module encrypted data 403, although module identity 110 may optionally only be included in module encrypted data 403, and in this case module identity 110 would not be external to module encrypted data 403 in a body 602. By including module identity 110 as external to module encrypted data 403, server 105 can use the unencrypted module identity 110 in order to select either (i) the appropriate module public key 111 to verify module digital signature 405 if an asymmetric cipher 141*a* is used within cryptographic algorithms 141, or (ii) the appropriate symmetric key 127 within cryptographic algorithms 141 to decrypt the module encrypted data 403. Module public key 111 and symmetric key 127 may preferably be recorded in a database 105*d*, such that server 105 can access a plurality of public keys using module identity 110 in body 602 for a plurality of modules 101. Thus, by including module identity 110 external to module encrypted data 403, server 105 can utilize the module identity 110 to query a database 105*d* and select the appropriate module public key 111 or symmetric key 127. As noted previously, module identity 110 could comprise a string or number that is uniquely associated with module identity 110, such as a session identity, as opposed to being a module identity 110 that is read from hardware in module 101 such as an IMEI number, Ethernet MAC address, etc.

According to an exemplary embodiment where asymmetric ciphering 141*a* of module encrypted data 403 is utilized, such as (i) the first message 208 sent by module 101 and (ii) where a symmetric key 127 had not been previously exchanged, module identity 110 can be (a) within module encrypted data and (b) not external to module encrypted data 403. In this case, server 105 can utilize server private key 105*c* to, in sequence, decrypt module encrypted data 403, extract module identity 110 from the decrypted module encrypted data 403, and then used the module identity 110 to select module public key 111 from database 105*k* in order to verify a module digital signature 405. Note that if a module identity 110 is in body 602 and external to module encrypted data 403, then module identity 110 could be obfuscated or otherwise ciphered according to a pre-agreed algorithm with server 105, such that server 105 can utilize the obfuscated or ciphered module identity 110 to select a module public key 111 from database 105*k*. According to an exemplary embodiment where (i) symmetric ciphering of module encrypted data 403 is utilized, such as after a first message 208 had already been sent by module 101 and a symmetric key 127 had previously been exchanged, then (ii) module identity 110 can be external to module encrypted data 403 and in body 602 in order for server 105 to utilize module identity 110 and select symmetric key 127 from a database 105*k*, thereby enabling server 105 to decrypt the module encrypted data 403 using the selected symmetric key 127.

The module digital signature 405 can be calculated using the steps and algorithms described in FIG. 4*a* above. Module digital signature 405 can be a secure hash string or number, and can be calculated using module private key 112 and digital signature algorithms 141*d*. Server 105 can verify module digital signature 405 using module public key 111 according to the standard techniques for verifying digital signatures using PKI as described at step 410 in FIG. 4*b*. Note that module digital signature 405 can be useful for server 105 to maintain security, since server public key 114 may be shared and potentially other nodes besides module 101 could attempt to send in encrypted data using server public key 114.

In addition, although a module digital signature 405 is illustrated as included in a body 602, the module digital signature 405 may optionally be omitted from body 602 after module 101 has previously sent symmetric key 127 in a message 208. In other words, in a series of messages 208, module 101 can preferably change from (i) using asymmetric ciphering 141*a* with an initial message 208 that includes symmetric key 127 in a module encrypted data 403 (where the initial message 208 also includes module digital signature 405) to (ii) using symmetric ciphering with subsequent messages 208 without module digital signature 405 in the series (where the subsequent messages 208 include module identity 110 external to module encrypted data 403 for server 105 to select the appropriate symmetric key 127). The series of messages 208 could begin when the initial message 208 is sent by module 101 and end when expiration time 133 of symmetric key 127 has transpired, and subsequently a new series of messages 208 could begin where the first message 208 in the new series of messages changes back to asymmetric ciphering 141*a* with initial message 208 that includes symmetric key 127 in a module encrypted data 403 (where the initial message 208 also includes a new module digital signature 405). As illustrated in FIG. 6, the exemplary message 208 shown can comprise the case of the previous sentence, where a new series of messages begins (possibly upon the expiration time 133 of a symmetric key 127), and a new symmetric key can be included in a module encrypted data 403. Although not illustrated in FIG. 6, module digital signature 405 may also optionally be included within module encrypted data 403, and in this case a server 105 can first utilize a server private key 105*c* to decrypt module encrypted data 403 and then verify a module digital signature 405. Other possibilities exist as well without departing from the scope of the present invention.

Using a message 208 with a module digital signature 405 can be both more efficient and overall more secure than digest authentication (such as the digest authentication described in IETF RFC 2069), although using digest-based authentication may be alternatively used. First, the use of a module digital signature 405 requires only a single packet for message 208 and a single packet for response 209 for secure communication between module 101 and server 105. The alternative digest-based authentication would normally require at least 4 packets comprising: (i) message 208, (ii) a challenge to message 208 from server 105 with a security token 401, (iii) a second message from module 101 with a hashed string generated using (i) the challenge, (ii) cryptographic algorithms 141, and (iii) the module private key 112, and then (iv) an acknowledgement from server 105. Thus, digest-based authentication would require approximately twice the time for module 101 to actively transmit data, since two round-trip pair of messages are required with digest-based authentication compared to the single round-trip pair of messages illustrated in FIG. 4. The additional messages with digest-based authentication would thereby drain battery life faster or utilize more energy compared to using module digital signature 405.

Second, the use of module digital signature 405 allows a system 100 to be more highly secured since (i) server 105 may need to be connected to the Public Internet 107 and receive packets from a wide range of IP addresses that are not known before messages 208 arrive, and (ii) by using module digital signature 405, server 105 can then preferably not respond to incoming packets and messages without a properly signed module digital signature 405 (where the module identity 110 associated with module digital signature 405 could also be verified using a certificate 122 and a certificate authority public key 131). By server 105 remaining silent to all packets except packets with a properly signed module digital signature 405, system 100 can thereby remain more secure. In other words, according to preferred exemplary embodiments, server 105 does not send a response 209 to a message 208 that does not include a validated module digital signature 405 (where the validated module digital signature 405 includes a verified module identity 110), thereby increasing security.

Module encrypted data 403 can be processed using the steps and algorithms described in FIG. 4*a*. Note that module encrypted data 403 as illustrated in FIG. 6 is shown in a plaintext form for ease of illustration, but actual module encrypted data 403 within body 602 of a packet 601*a* could be transmitted as binary, hexadecimal, Base64 binary-to-text encoding, or other encoding rules. Note that encryption by module 101 may optionally be omitted, and the server instruction 414 with corresponding data could be included within a message 208 without encryption, such as if security could be maintained at the network level. As one example in this case without encryption, server instruction 414 could be included in body 602 as plaintext. The encryption and/or security could be applied through other means, such as a secure tunnel between module 101 and server 105, although setting up and maintaining a secure tunnel and similar or other means of security may require more processing and bandwidth resources than the efficient techniques described herein.

Module encrypted data 403 can include a server instruction 414, a server identity 206, a module identity 110, a security token 401, a timestamp 604, a sensor measurement 305, and a symmetric key 127. Although not illustrated in FIG. 6, module encrypted data 403 could also include an expiration time 133, which could represent a time value for symmetric key 127 to remain valid. The server instruction 414 can represent the purpose of the message 208 for server 105, and FIG. 6 illustrates an "update" for server instruction 414. An update for server instruction 414 could be used to periodically notify server 105 of regular, periodic sensor measurements 305 acquired by a sensor 101f. An update for server instruction 414 may also comprise a periodic report regarding monitored unit 119, and a server instruction 414 is described in FIG. 4b. Other server instructions 414 besides an "update" may be included in a module encrypted data 403 within a body 602. The "update" illustrated in message 208 in FIG. 6 can also include a new symmetric key 127, and the module encrypted data illustrated in FIG. 6 may comprise the use of either an asymmetric ciphering 141a with public/private keys, or (ii) symmetric ciphering 141b with a symmetric key 127. The initial transmission or negotiation of a symmetric key 127 may preferably utilize asymmetric ciphering 141a and the use of a public key as an encryption key and a private key as a decryption key. Subsequent transmission of a new symmetric key 127 may utilize either (i) a symmetric cipher 141b with a previously negotiated but still valid symmetric key 127 (i.e. expiration time 133 has not transpired), or (ii) asymmetric ciphering 141a. If the data within instruction 414 is longer than the maximum data length supported by a selected asymmetric ciphering algorithm 141a and the public/private key pair, then module encrypted data 403 within message 208 can be broken up into several sections, such that the data within each section is less than the maximum data length supported by the asymmetric ciphering algorithm 141a and key.

Server identity 206 within module encrypted data 403 can be useful for properly identifying that server 105 is the proper recipient and final destination of message 208. Server identity 206 can be useful if a plurality of servers 105 is utilized by an M2M service provider 108 with potentially hundreds of thousands or millions of modules 101. In this case, with a plurality of servers 105, server private key 105c may represent a private key that is shared among a plurality of servers 105, since otherwise server 105 may not be able to decrypt module encrypted data 403 if each server 105 in the plurality of servers 105 did not share the common server private key 105c. Continuing in this example of a plurality of servers 105, a server identity 206 may represent a server that associated with M2M service provider 108 but not the recipient of message 208. In this case, (i) a first server 105 could receive message 208 and decrypt message 208 using a common server private key 105c or symmetric key 127, and (ii) the first server 105 can forward message 208 to the second server 105 (not shown) with server identity 206. In this case, the first server 105 can forward message 208 to the second server (not shown) without the encryption applied to module encrypted data 403, since (i) the second server 105 may not have access to the server private key 105c and/or symmetric key 127, or (ii) the first server 105 could have already decrypted the module encrypted data 403 in order to read server identity 206 within module encrypted data 403.

Module identity 110 within module encrypted data 403 can represent the identity of module 110, and could represent a serial number read by module 101 from a read-only hardware address. Module identity 110 is described in FIG. 1c and can represent a unique identifier of module 101. Security token 401 within module encrypted data 403 can represent a random string in order to make message 208 reasonably unique and thus system 100 in FIG. 2 robust against replay attacks. If module encrypted data 403 includes symmetric key 127, then security token 401 could optionally be omitted since symmetric key 127 can also function as a security token 401. Security token 401 is described in FIG. 4a. Timestamp 604 can represent a time value that module 101 sends message 208 or a time value that module 101 acquired sensor data 305. Note that multiple timestamps 604 could be included in message 208, such that a series of measurements from sensor 101f over time are transmitted in a single message 208, and a separate timestamp 604 could be included for each sensor measurement. Sensor data 305 is described in FIG. 3a and also with the description of sensor 101f in FIG. 1d, and sensor data 305 can represents data module 101 acquires using sensor 101f. Sensor data 305 within message 208 may be stored by server 105 in a database 105k, or potentially forwarded to another server (not shown) for additional processing.

Figure 7:
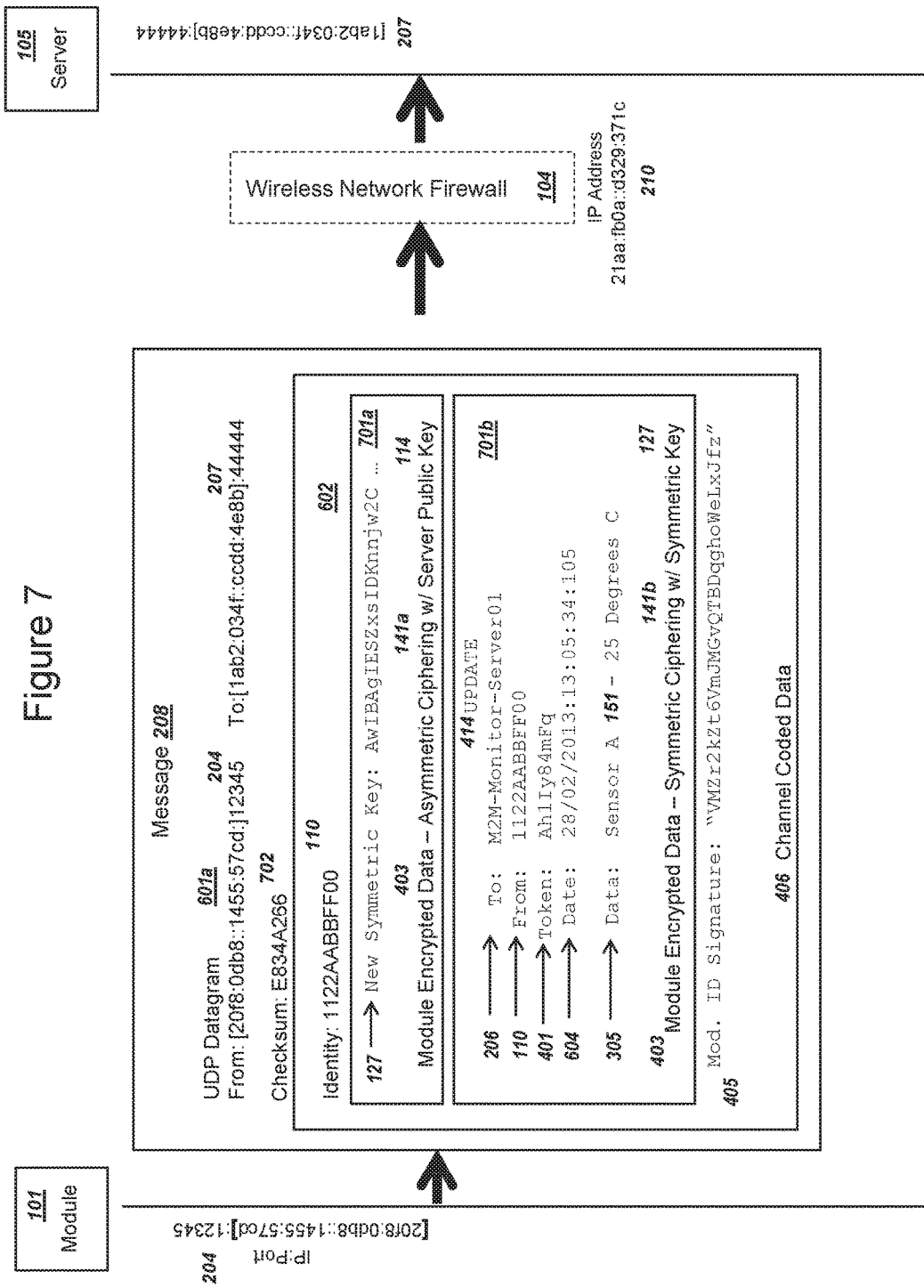
FIG. 7 is a simplified message flow diagram illustrating an exemplary message sent by a module, in accordance with exemplary embodiments.

Although not illustrated in FIG. 6, body 602 or module encrypted data 403 may also include an (i) identity of monitored unit 119, which may be associated with sensor data 305, and/or (ii) a sensor identity 151 associated with sensor data 305, such that data from potentially multiple sensors 101f could be properly identified and recorded. As one example, module 101 could collect sensor data for a plurality of monitored units 119, and in this case message 208 would preferably include an identity of monitored unit 119 associated with the sensor data 305. Or, a sensor 101f could have a sensor identity 151, and message 208 could include the sensor identity 151 with the corresponding sensor data 305. As described above, message 208 could also include a symmetric key 127, as illustrated in FIG. 6. Note that if (A) module encrypted data 403 exceeds an acceptable length for input or output into asymmetric ciphering algorithms 141a, such as data within a module encrypted data 403 comprising an exemplary 3000 bits but only a 2048 bit key length is utilized in an exemplary module private key 112 processed with an RSA algorithm 153, then (B) module encrypted data 403 within body 602 could comprise multiple separate sub-sections for module encrypted data 403. In this case, each sub-section could comprise data less than the maximum acceptable length for encryption, and the sub-sections could be combined in order to form a module encrypted data 403 within body 602. An example of multiple sub-sections for module encrypted data 403 is illustrated in FIG. 7 below (where one sub-section for module encrypted data 403 is ciphered with an asymmetric ciphering algorithm 141a and a second sub-section is ciphered with a symmetric ciphering algorithm 141b).

FIG. 6 also illustrates exemplary details within response 209 sent by server 105. Response 209 may comprise a TCP/UDP packet 601b sent from server 105 IP:port 207 the IP address 210 and port number 605, where IP address 210 represents the external IP address of wireless network firewall 104 and port number 605 is the source port in message 208 as received by server 105 (i.e. the source port in message 208 after traversing the firewall 104 illustrated in FIG. 6). Thus, IP:port with IP address 210 and port number 605 may be different than IP:port 204 in response 209, since the presence of a wireless network firewall 104 may perform NAT routing, which could change the source IP address and source port number from IP:port 204 to IP address 210 and port number 605 in message 208, as received by server 105. The use of wireless network firewall 104 in wireless network 102 may require that response 209 be sent from IP:port 207 to IP address 210 and port number 605 in order to be properly processed by firewall 104 and forwarded to module 101 at IP:port 204. Source IP:port 207 and destination IP address 210 and port number 605 in response 209 may be included within a header in TCP/UDP packet 601*b*. TCP/UDP packet 601*b* could comprise a regular UDP packet, a UDP Lite packet, or a TCP datagram, or similar protocols supported by an Internet 107. TCP/UDP packet 601*a* and TCP/UDP packet 601*b* can preferably utilize the same protocol.

As noted previously, the use of checksums may be mandatory in IPv6 networks, and thus a UDP Lite packet as packet 601*a* can include a checksum value 702 (illustrated below in FIG. 7) for the header, and note the use of firewalls such as firewall 104 can change the header values in a packet 601*a*. In accordance with a preferred exemplary embodiment, a first checksum value 702 within a response 209 sent by server 105 is different and/or not equal to a second checksum value 702 within the response 209 received by module 101. Likewise, a first checksum value 702 within a message 208 sent by a module 101 is different and/or not equal to a second checksum value 702 within the message 208 received by server 105.

A UDP, TCP, or UDP Lite datagram as a TCP/UDP packet 601*b* within response 209 may include a body 606. Body 606 may comprise the payload or data within a UDP, TCP, or UDP Lite packet. Body 606 can include a server identity 206, a server digital signature 506, server encrypted data 504, and channel coding 406. Server identity 206 is illustrated in FIG. 6 as external to server encrypted data 504 within body 606, but server identity 206 may optionally be included in server encrypted data 504 instead. By including server identity 206 as external to server encrypted data 504, module 101 can use the unencrypted server identity 206 in order to select the appropriate server public key 114 to decrypt server encrypted data 504 (if asymmetric ciphering 141*a* is utilized).

Likewise, module 101 may communicate with a plurality of servers 105, and server identity 206 as external to server encrypted data 504 can allow module 101 to select the appropriate symmetric key 127 to utilize for decrypting server encrypted data 504 (since each of the multiple servers 105 that module 101 communicates with may utilize a different symmetric key 127). Also note that the server identity 206 can be similar to module identity 110, such that multiple different values for server identity 206 could be utilized in a system 100, but each of the different values could preferably be uniquely associated with server 105. As one example, server identity 206, outside server encrypted data 504 as illustrated in FIG. 6, may comprise a session identity or session identifier, as opposed to a different server identity 206 that could comprise a hardware serial number for server 105. Thus, server identity 206 outside a server encrypted data 504 may be a different string or representation than server identity 206 within server encrypted data 504, but both strings/numbers used for server identity 206 in response 209 could be associated with server 105.

Server digital signature 506 in body 606 can comprise a secure hash signature of a subset of body 606, where the subset of body 606 can comprise server encrypted data 504, and/or server identity 206 as illustrated in FIG. 6. In other words, processing the secure hash signature can omit (i) server digital signature 506 itself and (ii) channel coding 406 as input into the cryptographic algorithms 141 used to process or verify server digital signature 506. In this manner, module 101 can utilize server digital signature 506 to authenticate that response 209 was sent by server 105. Channel coding 406 in body 606 is also depicted and described in connection with FIG. 5*a* above, and channel coding 406 can be utilized by module 101 to correct any potential bit errors propagated in body 606 as response 209 traverses the Internet 107 and wireless network 102. As noted above in FIG. 5*a*, any uncorrected bit errors in body 606 may break the ability of module 101 to decrypt server encrypted data 504 or server digital signature 506.

Body 606 may include server encrypted data 504. Server encrypted data 504 is depicted and described in connection with FIG. 5*a* above. Server encrypted data 504 may include an acknowledgement 501, wherein acknowledgement 501 can notify module 101 that message 208 has been received by server 105. As illustrated in FIG. 6, server encrypted data 504 may optionally also include a module instruction 502 for module 101. The module instruction 502 could be a string that contains instructions or configuration parameters for module 101, such as an order to change state, parameters regarding the monitoring of monitored unit 119, server names or addresses, radio frequency parameters, timer values, settings for actuator 101*y*, etc. A module instruction 502 is depicted and described in connection with FIG. 5*a* above. The exemplary module instruction 502 illustrated in FIG. 6 comprises an instruction for module to set a temperature to 32 degrees. This exemplary instruction could be for an actuator 101*y* which could comprise a thermostat for monitored unit 119. Other possibilities for a module instruction 502 within a response 209 are possible as well without departing from the scope of the present invention. Although not depicted in FIG. 6 or FIG. 2, if response 209 includes a module instruction 502, according to an exemplary embodiment, module 101 can preferably send a second message 208 to server 105, where the second message 208 includes a confirmation that module instruction 502 was successfully executed by module 101. This confirmation could be included in a server instruction 414 for server 105 within a second message 208.

Also, although a server encrypted data 504 may preferably be included within a body 606, body 606 may optionally omit server encrypted data 504 and include data from server 105 that is not encrypted, such as plaintext. As one example in this case, acknowledgement 501 could be included in body 606 as plaintext. In addition, although a server digital signature 506 is included in body 606 and external to server encrypted data 504, the server digital signature 506 may (i) optionally be omitted as well, or (ii) included within server encrypted data 504. Also, although not illustrated in FIG. 6, server encrypted data 504 could include a symmetric key 127 for module 101 to utilize with symmetric ciphering 141*b* in cryptographic algorithms 141 for processing a module encrypted data 403 in subsequent messages 208 and/or responses 209. If server encrypted data 504 includes a symmetric key 127, then server 105 preferably can utilize an asymmetric ciphering 141*a* with cryptographic algorithms 141 to process the server encrypted data 504 containing the symmetric key 127. An example for the previous sentence could be if message 208 was received without a symmetric key 127 and server 105 can issue the symmetric key 127. As contemplated herein, more than one symmetric key 127 may be used concurrently in a system 100, such as a first symmetric key 127 utilized in symmetric ciphering 141*b* for a message 208, and a second symmetric key 127 utilized in symmetric ciphering 141*b* for a response 209. Other possibilities exist as well without departing from the scope of the present invention.

Acknowledgement 501 within server encrypted data 504 may include a security token 401. Security token 401 may be a random string and may also be generated by either server 105 or module 101. If security token 401 is generated by module 101, then security token 401 may be included in message 208 and also utilized by server 105 in response 209, as illustrated in FIG. 6. By including security token 401 in acknowledgement 501, system 100 can be made robust to replay attacks since each response 209 can be reasonably unique for each response 209 sent by server 105.

FIG. 7

FIG. 7 is a simplified message flow diagram illustrating an exemplary message sent by a module, in accordance with exemplary embodiments. FIG. 7 illustrates exemplary details within a message 208 sent by module 101. As noted previously, a module 101 may prefer to communicate with server 105 in both an efficient and secure manner. Efficiency is important in order to reduce energy consumption and also conserve the life of a battery 101*k*, if module 101 is powered from a battery. As illustrated in FIG. 7, module 101 can use a message 208 in the format of a UDP datagram 601*a* to send two sets of module encrypted data 403. UDP datagram 601*a* can include a body 602, where body 602 can comprise (i) two sets of module encrypted data 403, (ii) a module digital signature 405, and (iii) option channel coding 406 if a UDP Lite protocol is used for UDP datagram 601*a*. Similar to FIG. 6 above, the encrypted data illustrated in FIG. 7 is shown in plaintext form, although the actual encrypted or ciphered data within a message 208 would not normally be human readable. The two sets of module encrypted data 403 may comprise a first set 701*a* of module encrypted data 403 and the second set 701*b* of module encrypted data 403, as illustrated in FIG. 7.

FIG. 7 illustrates a difference with conventional technology such as IPSec, TLS, SSL, etc., wherein by utilizing the exemplary embodiment of the invention illustrated in FIG. 7, a module can reduce the number of packets (and therefore also energy) required to communicate with a server 105 while still maintaining a highly secured system. FIG. 7 illustrates module 101 utilizing a single UDP packet to send (i) a symmetric key 127 via an asymmetric ciphering 141*a*, (ii) module encrypted data 403 using the symmetric key 127, and (iii) a module digital signature 405. The number of packets required to communicate the same data with conventional technology would be significantly more than the single packet illustrated (perhaps as many as a dozen packets with conventional technology), and thus would require module 101 to remain in an active state longer than required and thus drain a battery 101*k* faster. Note that after sending message 208 and receiving a confirmation in a response 209, module 101 could then return to a sleep state to conserve either energy used from a land-line power source or energy used from a battery 101*k*. As described in Step 308 of FIG. 3*a* above, module 101 could send a detach message to a wireless network 102 upon receiving a response 209 to the message 208 illustrated in FIG. 7, and thus enter a dormant or sleep state more quickly and conserve energy.

As illustrated in FIG. 7, the first set 701*a* of module encrypted data 403 can comprise a symmetric key 127, where the symmetric key 127 is encrypted using an asymmetric ciphering algorithm 141*a* with cryptographic algorithms 141. As depicted and described in connection with FIG. 4*a*, module encrypted data 403 can utilize server public key 114 to cipher the first set of module encrypted data 403. Server 105 can subsequently (i) utilize module identity 110 in body 602 to select the module public key 111 of module 101 (for use with module digital signature 405 below), and (ii) decipher this first set 701*a* of module encrypted data 403 using the server private key 105*c*, as depicted and described in connection with FIG. 4*b* at step 413. Upon deciphering the first set 701*a* of module encrypted data 403, which comprises the symmetric key 127 in FIG. 7, server 105 can record symmetric key 127 in a database 105*k* for use both with the second set 701*b* of module encrypted data 403 and subsequent messages 208 from module 101. Symmetric key 127 could remain valid until an expiration time 133 associated with the key transpired.

Although a symmetric key 127 is illustrated in the first set 701*a* of module encrypted data 403, the first set 701*a* of module encrypted data could alternatively include a value used to derive symmetric key 127 instead of the actual symmetric key 127. In other words, module 101 and server 105 could utilize a key derivation function 141*f* with the module public key 111 and server public key 114 to obtain a derived shared secret key 129*b*. Instead of transmitting the symmetric key 127 directly in a message 208 (such as the first set 701*a*), module 101 could transmit a value such as a random number in the first set 701*a* of module encrypted data 403, and both module 101 and server 105 could use the value and device shared secret key 129*b* to derive symmetric key 127. This derived symmetric key 127 can be used for subsequent communications between module 101 and server 105, such as in a response to message 208, where a response 209 could include server encrypted data 504 that is ciphered using the derived symmetric key 127.

After acquiring the deciphered symmetric key 127, server 105 can subsequently process the second set 701*b* of module encrypted data 403 in message 208, which could include server instruction 414, sensor data 305, and the additional information shown within the second set 701*b* of module encrypted data illustrated in FIG. 7. Server 105 could decipher the second set 701*b* of module encrypted data 403 using the symmetric key 127 illustrated in FIG. 7, also depicted and described in connection with FIG. 4*b* at step 413. The second set 701*b* of module encrypted data 403 illustrated in FIG. 7 also includes sensor data 305 with the sensor identity 151, and in this case the sensor data 305 is from "sensor A".

Message 208 could also include a module digital signature 405, which could be processed by module 101 using (i) the first set 701*a* of module encrypted data 403 and/or the second set 701*b* of module encrypted data 403 illustrated in FIG. 7, (ii) a digital signature algorithm 141*d*, and (iii) module private key 112. The processing of module digital signature 405 by module 101 is also described in FIG. 4*a* above. Before (A) utilizing symmetric key 127 in the first set 701*a* of module encrypted data 403 to send a response 209 to module 101, (B) server 105 could validate module digital signature 405 using (i) the module identity 110 to select a module public key 111, (ii) the selected module public key 111, and (iii) digital signature algorithms 141*d*.

Other configurations are possible for message 208 as well. Note that a message 208 could include only the first set 701*a* of module encrypted data 403. In this manner, the symmetric key 127 could be securely transmitted to server 105 without including sensor data 305, and the second set 701*b* of module encrypted data 403 could be omitted from the packet 601*a* (and sensor data 305 could be sent in a subsequent message 208). In addition, although FIG. 7 illustrates module 101 as sending symmetric key 127 in a message 208, module 101 could alternatively receive a symmetric key 127 in a response 209 from server 105. This alternative response 209 from server 105, with a symmetric key 127, would preferably utilize (i) an asymmetric cipher algorithm 141a to send module 101 the symmetric key 127 and (ii) the steps outlined in FIG. 5a.

FIG. 8

Figure 8:
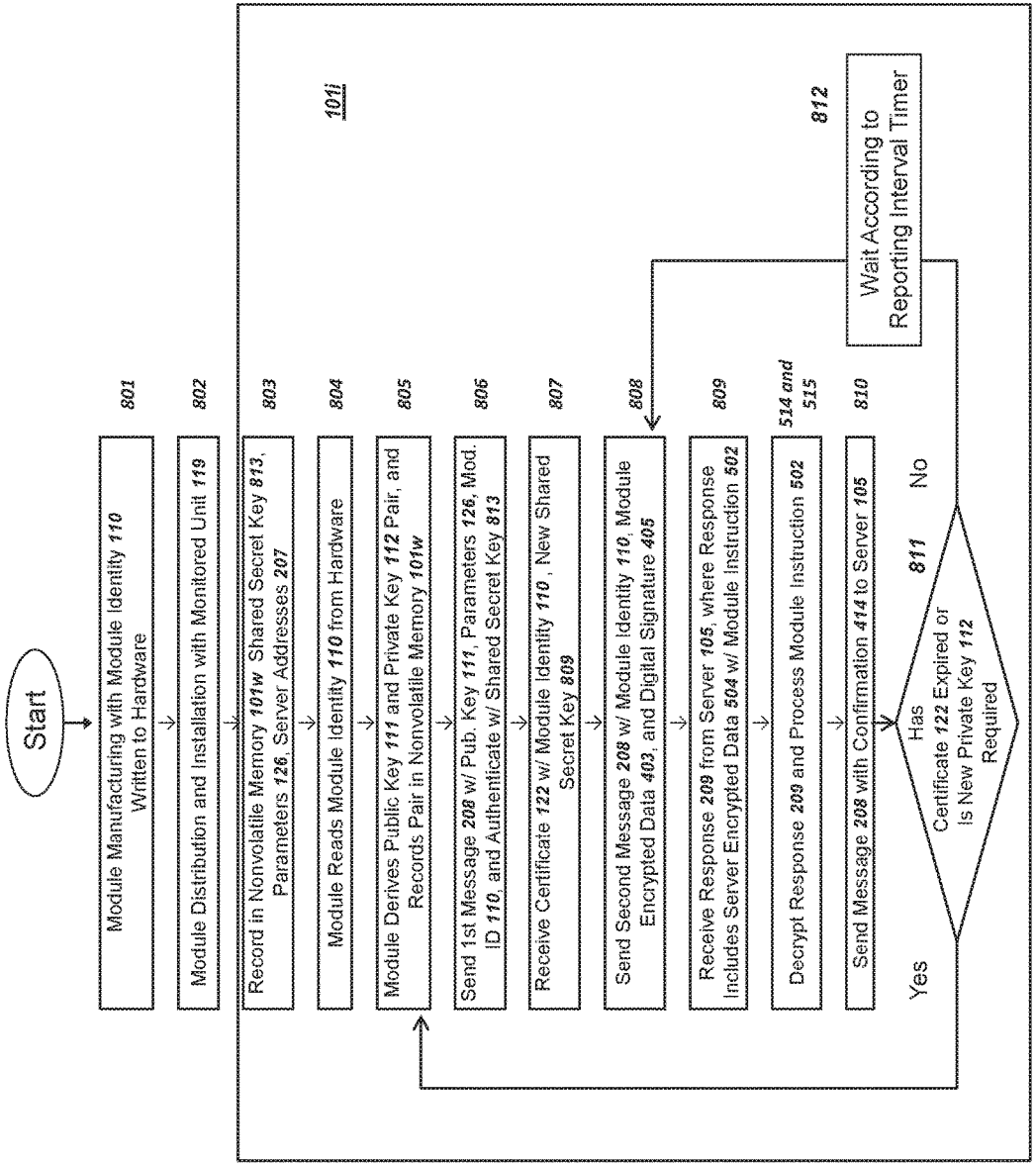
FIG. 8 is a flow chart illustrating exemplary steps for a module to derive a public key and private key, and to obtain a digital certificate, in accordance with exemplary embodiments.

FIG. 8 is a flow chart illustrating exemplary steps for a module to derive a public key and private key, and to obtain a digital certificate, in accordance with exemplary embodiments. In order to utilize communications secured with PKI techniques such as private keys, public keys, certificates, and identities, a module 101 may preferably obtain or generate these keys and certificate in a secure manner. Given that a plurality of modules 101 may be deployed in potentially remote places, without frequent contact with end users or technicians, the use of secure PKI techniques for a module 101 can create a significant set of challenges for the generation of module public key 111 and module private key 112, as well as properly and securely obtaining a certificate 122 with an module identity 110. Using conventional technology, significant challenges and costs can be incurred when (i) module 101 has already been deployed, such as collecting data from a monitored unit 119, and (ii) module 101 needs to utilize a new set of module private key 112 and module public key 111.

The proper use of a new set of module private key 112 and module public key 111 may utilize the particular steps and procedures contemplated herein, in order to minimize any potential human intervention (with related costs) while continuing to maintain security. Over a long period of operating time for a module 101, such as a decade or longer, there may be many reasons module 101 may need a new pair of PKI keys, such as (i) expiration of a certificate, or the certificate of a parent signature authority, (ii) the transfer of ownership or control of module 101, where the prior ownership could have direct or indirect access to the module private key 112, (iii) supporting a new server 105 that has different security requirements (longer keys, different ECC curves, etc.), and/or (iv) revocation of a public key in a chain of signatures 123 within a certificate 122. In the case of (ii), new ownership of module 101 may require a module 101 to utilize a new module private key 112. In the case of (iii) a new server 105 may require a pair of public/private keys incompatible with a prior set of public/private keys utilized by module 101 and/or a certificate 122 for module 101.

The general approach adopted by most mobile phone networks over the past two decades has been founded upon the use of a pre-shared secret key recorded in SIM cards, such as the Ki secret key in 2G networks. That approach may work for mobile phones, where the SIMs can often be easily replaced, but the use of a pre-shared secret key in a SIM may not be suitable for a module 101 and M2M service provider 108. As one example, significant costs may be incurred by swapping out a SIM card for already deployed modules 101, especially if they are in remote locations or continually moving such as a tracking device on a container or pallet. Next, a module 101 may preferably record multiple pairs of public/private keys 111/112 for various functions, such as connecting to different servers 105, connecting to different wireless networks 102, etc. The number of pairs of public/private keys useful to a module 101 concurrently could be many, such as an exemplary five or more actively used public/private keys. Trying to change or add a new SIM card each time a new security key is required may not be efficient or feasible. FIG. 8 illustrates exemplary steps that can be performed with module 101, including using a module program 101i, for generating and/or updating a module public key 111 and module private key 112. The steps illustrated in FIG. 801 include both (i) an "initial" or "startup" case where module 101 has not previously derived keys, and (ii) a subsequent or "follow on" time where module 101 can generate or derive keys after the initial derivation of keys.

At step 801, during manufacturing of module 101, including manufacturing of sub-components such as a circuit board, assembly of hardware components illustrated in FIG. 1d, etc., a module identity 110 could be written into the hardware, and could comprise a serial number, International Mobile Equipment Identity (IMEI) number, Ethernet MAC address, etc. For security purposes, the module identity may preferably be written into a read-only location, such as a readable location on a system bus 101d, which could also comprise a ROM 101c. Recording and utilizing module identity 110 is also depicted and described in connection with FIG. 1d, FIG. 2, and elsewhere herein. Alternatively, module identity 101 could be recorded in a non-volatile memory such as a flash memory 101w.

At step 802, module 101 can be distributed to end users and also installed with a monitored unit 119. At step 803, a shared secret key 813, parameters 126, and a server address 207 can be recorded in a nonvolatile memory 101w. Parameters 126 may comprise settings for a cryptographic algorithms 141 as illustrated in FIG. 1f, including (i) key lengths, (ii) algorithms to utilize for key generation or ciphering, such as the specification of an elliptic curve utilized illustrated as parameters 126 in FIG. 1h, (iii) a specific secure hash algorithm 141c to utilize, such as SHA-256 or SHA-3, (iv) an expiration date of the public key 111, (v) a maximum time value for an expiration time 133 associated with symmetric keys 127, etc. Although not illustrated in FIG. 8, at step 802 a configuration file could also be loaded into non-volatile memory, where the configuration file includes a plurality of fields specifying the operation of module 101. The shared secret key 813, parameters 126, and server address 207 could be included in a configuration file.

Continuing at step 802, server name 206 could be utilized in place of or in addition to server address 207, and in this case module 101 can later perform a DNS or DNSSEC lookup using server identity 206 in order to obtain server address 207 for use in a message 208. Shared secret key 813 and server address 207 (or server identity 206) could also be recorded in a ROM 101c at step 803. Step 803 may also be performed concurrently with step 801 or step 802. Note that step 803 may take place multiple times during the lifetime of a module 101, and in this case (a) the first time step 803 is conducted, step 803 could be conducted concurrent with steps 801 or 802, and (b) a subsequent time step 803 is conducted, step 803 could be conducted after the receipt of a response 209, where the response 209 includes a second shared secret key 813, server address 207, and also potentially a new module identity 110. In other words, although not illustrated in FIG. 8, a module 101 could return to step 803 from later steps upon the equivalent of a "factory reset", or similar command where flash memory 101w and other nonvolatile memory would be cleared. One example could potentially be the transfer of ownership of module 101, or a second example could be the upload of new firmware that is incompatible with a previous configuration file. In any case, shared secret key 813 can preferably be uniquely associated with module 101 (i.e. any given shared secret key 813 can belong only to an individual module 101).

Shared secret key 813 may comprise a pre-shared secret key 129a, as described in FIG. 1d. If module 101 has already derived a module private key 112 and module public key 111

(such as when step 803 is being conducted at a subsequent time as contemplated in the previous paragraph), then shared secret key 813 may comprise (i) a key received in a server encrypted data 504 including possibly a symmetric key 127, or (ii) a derived shared secret key 129b. Derived shared secret key 129b could be obtained from using a key derivation function 141f and module public key 111 and server public key 114, using a module public key 111 that has already been derived (such as if at least one module private key 112 and module public key 111 had already been derived before step 803).

Shared secret key 813 could be obtained and loaded by a distributor, installer, or end user into a nonvolatile memory such as flash memory 101w in the form of a pre-shared secret key 129a, where pre-shared secret key 129a was obtained using a module identity 110 and pre-shared secret key code 134 as depicted and described in connection with FIG. 1d above. Module 101 could also utilize a first pre-shared secret key 129a, including a first pre-shared secret key 129a entered by potentially a distributor, installer, or end-user discussed in FIG. 1d, to derive shared secret key 813. Other possibilities exist as well for shared secret key 813, and shared secret key 813 can be useful for the proper identification of module 101 upon module 101's generation of a private key 112 and public key 111, as described below, including step 806, and step 902 in FIG. 9, and step 1002 in FIG. 10.

Also note that as contemplated herein, an initial module private key 112 and initial module public key 111 could be recorded into nonvolatile memory at step 803. For example, a manufacturer, distributor, installer, technician, or end-user could load the initial module private key and initial module public key 111, where the initial module public key 111 would be utilized to authenticate at step 806 a subsequent set of public/private keys derived by module 101 at step 805. In this case, the initial module public key 111 and/or initial module private key 112 described in the previous two sentences could comprise the shared secret key 813. The reason the initial module private key 112 with the initial module public key 111 would comprise a shared secret key 813 is that (i) the initial module private key 112 and initial module public key 111 together have been "shared" in the sense that the initial module private key 112 has been located outside module 101 and in possession of an entity such as the manufacturer, distributor, installer, technician, or end-user in order to load the initial module private key (and initial module public key 111 is shared with server 105), (ii) the initial module private key 112 and initial module public key 111 can be used to authenticate a subsequent message 208 containing a public key internally derived by the module at step 805 below, and (iii) the initial module private key 112 would remain "secret" and not publicly shared. Thus, FIG. 8 through FIG. 10 contemplate an embodiment where shared secret key 813 at step 803 comprises an initial public/private key pair that is not internally derived by module 101.

Note that the contemplation of the use of shared secret key 813 as a pre-shared secret key 129a within the present invention may be different than the use of a pre-shared secret key within a SIM card. Specifically, as depicted and described in connection with FIG. 1d and elsewhere herein, the shared secret key 813, either (i) comprising a pre-shared secret key 129a or (ii) derived from a pre-shared secret key 129a, may be moved by CPU 101b into a volatile memory such as RAM 101e, with subsequent access by cryptographic algorithms 141. In contrast, the pre-shared secret key within a SIM card for mobile phones is usually designed to prevent movement of the pre-shared secret key within a SIM into RAM 101e.

If a SIM card is present within module 101, and the SIM card contains a pre-shared secret key, such as Ki, then as contemplated herein, shared secret key 813 may be derived using the SIM card and Ki. As one example, module 101 could (i) utilize a RAND message, potentially received from a 3G or 4G mobile network such as wireless network 102, and (ii) input the RAND into the SIM card and receive a response RES (or SRES), and utilize the string in RES to process or derive a shared secret key 813. Server 105 could also submit the same RAND associated with the SIM card and Ki to wireless network 102, and receive the same RES as obtained by module 101. By both module 101 and server 105 having the same RES value, they can follow a pre-agreed series of steps to use the same RES in order to derive a commonly shared secret key 813. As one example, module 101 and server 105 could both utilize a key derivation function 141f, using the same RES as input, in order to derive the same shared secret key 813.

At step 804, module 101 can read module identity 110 using a read-only address. Module 101 can read module identity 110 directly from read-only hardware address by using system bus 101d, including from a ROM 101c, or module 101 can read module identity 110 from a nonvolatile memory such as a flash memory 101w. Thus, the read-only address could comprise an address accessible on system bus 101d that is designated read-only for a period of time. The module identity 110 could be recorded into a flash memory 101w by module 110 after a prior read of module identity 110 from a read-only address. In this case (module 101 taking the step described in the previous sentence), reading module identity 110 from the nonvolatile memory at step 804 can also comprise module 101 reading module identity 110 using a read-only address. Thus, although module 101 may read module identity 110 from a flash memory 101w, if (a) module 101 initially utilized a read-only address to record the module identity 110 into the flash memory 101w, then (b) reading module identity 110 from the flash memory 101w would comprise using a read-only address to read module identity 110. Other possibilities exist as well, such as the address that includes module identity 110 in either (i) a nonvolatile memory such as a ROM 101c or (ii) an address accessible on system bus 101d, could be designated for a period of time as available for a read-only operation.

At Step 805, module 101 can derive module private key 112 and a corresponding module public key 111 using (i) random number generator 128, (ii) parameters 126, (iii) cryptographic algorithms 141, and (iv) a key pair generation algorithm 141e. Module private key 112 and corresponding module public key 111 can be derived according to a wide range of parameters 126, and can utilize different algorithms, such as RSA 153 or ECC 154. Key derivation at step 805 could generate keys of different lengths, such as 2048 bits with RSA 153 or 283 bits with ECC 154, and other possibilities exist as well. If using ECC 154 to derive a pair of keys for module 101, step 805 could also accommodate the use of different elliptic curves for compatibility with server 105, such as the use of odd-characteristic curves, Koblitz curves, etc. Additional example elliptic curves utilized in the generation or derivation of a key pair include the curves sect283k1, sect283r1, sect409k1, sect409r1, etc., which are identified as example curves in IETF RFC 5480, titled "Elliptic Curve Cryptography Subject Public Key Information".

The curve for module 101 to utilize in deriving module public key 111 and module private key 112 at step 805 could be specified in parameters 126. Consequently, the parameters of keys generated by module 101 at step 805 (including key length or algorithms utilized) may be selected based upon the requirements of the application and can be included in a parameters 126. When deriving keys at step 805, module 101 may also preferably utilize data from sensor 101f, radio 101z, a bus 101d, a physical interface 101a, memory 101e, and/or a clock in order to generate a seed 129 for random number generator 128, or random number generator 128 could utilize these inputs directly. A random number can be input into key pair generation algorithm 141e in order to derive the module public key 111 and module public key 112.

Upon key derivation at step 805, module private key 112 and module public key 111 can be recorded in a nonvolatile memory 101w. Module private key 112 is preferably not transmitted or sent outside module 101. Note that module 101's internal derivation, or processing or creation, of module private key 112 and corresponding module public key 111 can have many benefits. First, module private key 112 does not need to be recorded in any other location than within module 101, and thus may also be considered not shared. Recording module private key 112 only within module 101 avoids potential security risks of (i) storing or recording module private key 112 in other locations, such as with module provider 109, M2M service provider 108, or an installer or end user of module 101, and (ii) transferring module private key 112 from these other locations. A primary security risk from storage of module private key 112 outside module 101 is that unauthorized $3^{rd}$ parties may gain access to the module private key 112.

Also note that over a potential lifetime of a decade or more of operation of module 101, each time a new module private key 112 may be required (for various potential reasons outlined above), the external recording and/or transferring of module private key 112 incurs a potential security risk. Security risks can be compounded if the external location records private keys 112 for a plurality of modules 101. Also, by internally generating private key 112 at step 805, module 101 can overcome significant limitations and costs requiring the distribution of a pre-shared secret key Ki in the form of a SIM card or similar physical distribution of a pre-shared secret key. Module 101's key derivation could be triggered by either (i) a bootloader program 125, where the bootloader program 125 determines that memory within module 101 does not contain a module private key 112, or (ii) via a module instruction 502 such as a "key generation" command in a response 209 from a server.

Note that module 101's generation of keys after deployment and installation may create challenges for authentication of a new module public key 111 with module identity 110, since module 101 may be connecting to server 105 or M2M service provider 108 via the Internet 107. Consequently, shared secret key 813 can be used by module 101 after the generation of new keys at step 805 in order to securely associate new module public key 111 with module identity 110 (and thereby the correct module 101). At step 806, module 101 can send a message 208 to a server 105, where the message includes public key 111, at least a subset of parameters 126 (such as an ECC 154 algorithm used in the public key), and module identity 110. In accordance with preferred exemplary embodiments, there may be two primary cases of Step 806 to consider where module 101 generates or derives keys at step 805 connects to a server 105 via the Internet 107, (Case A) a generation of keys by module 101 where valid or acceptable module private/public keys are not available, and, (Case B) a generation of keys by module 101 while prior module private/public keys are valid and available. Note that the initial startup and deployment of module 101 can comprise a Case A. After generating keys in step 805, in step 806 module 101 can authenticate with server 105 even though the payload of message 208 in this case comprises information that would be publicly available in a certificate: module public key 111, parameters 126, and module identity 110. A purpose of shared secret key 813 can be to ensure that module public key 111 properly belongs to module identity 110, thereby preventing imposters of module identity 110. Server 105 can uniquely associate a particular shared secret key 813 with a particular module identity 110, and utilize the unique association to authenticate module 101.

In Case A mentioned in the paragraph above (no acceptable existing module public/private keys), a server 105 can utilize shared secret key 813 to authenticate module 101 at step 806, such that after authentication the contents of message 208 can be further processed. Server 105 can authenticate module 101 using the module identity 110 in message 208 and a message digest, such as described in IETF RFC 2617, titled "HTTP Authentication: Basic and Digest Access Authentication", and other authentications techniques using a shared secret key 813 could be utilized without departing from the scope of the present invention. Module 101 can properly respond to a challenge/nonce in message digest by sending a secure hash value using (i) the challenge/nonce and (ii) the shared secret key 813. Or, module 101 could authenticate by generating a module digital signature 405 in message 208 using the shared secret key 813. Or, module 101 could utilize the shared secret key 813 as a symmetric key 127 to encrypt a module encrypted data 403 with symmetric ciphering 141b, and if server 105 could properly decrypt the module encrypted data 403 using the same shared secret key 813 on the server, then server 105 would know the correct module 101 sent the message 208 and thereby would be authenticated. In addition to the authentication procedures mentioned above, in Case B, where valid module public/private keys are available when module 101 generates new keys, module 101 could send the new public key 111, and parameters 126 in a message 208 using the techniques illustrated in FIG. 3 through FIG. 7 above, where module 101 can utilizes the existing module public/private keys to authoritatively sent the new public key 111.

At step 807, after successful authentication of module 101 at step 806, a server 105 could generate a digital certificate 122 and send it to module 101, and also optionally publish it on the Internet 107 for use by other entities, such as wireless networks 102, M2M service providers 108, servers 105, end users, etc. A server 105 could also optionally securely send in a response 209 a new shared secret key 813, which could be utilized in subsequent iterations of step 806 above. At step 807 a digital certificate 122 could be sent to module 101 in a response 209 message, where the body 606 of the message could be plaintext since the digital certificate 122 may not normally need to be ciphered. Note that the server 105 (i) authenticating module 101 at step 806 and (ii) sending digital certificate 122 can be a different server than a server 105 discussed below at Steps 808 and Steps 809, which could be a server for collecting sensor data 305, as one example.

Within Step 807, the server 105 sending a digital certificate 122 could belong to a certificate authority 118, and/or M2M service provider 108, module provider 109, etc. If server 105 belongs to module provider 108, then module provider 108 may function as a certificate authority, and in turn would likely have its public key 120 signed by an external certificate authority 118 and recorded in a second certificate 122. According to a preferred exemplary embodiment, module provider 109 or M2M service provider operates a server 105 to (i) receive a message 208 containing a newly generated module public key 111 and module identity 110 and (ii) authenticates the message 208 using the shared secret key 813. After authentication, server 105 associated with module provider 109 or M2M service provider 108 sends a digital certificate 122 to (i) module 101 in a response 209. Note that the generation of certificate 122 may optionally be bypassed, such that if module 101 would not normally communicate with any servers except a server 105 within a M2M service provider 108 network. In this case, where Step 807 can be bypassed, module 101 may still preferably perform Step 806 and send the new module public key 111 with authentication using shared secret key 813, because a server 105 would need to know that the new module public key 111 (generated at step 805 above) actually belongs to module 101 with module identity 110. Without authentication as step 806, an unauthorized $3^{rd}$ party could send a module public key 111 claiming its associated with a module identity 110, and without proper authorization, a server 105 would not know the difference between valid incoming new public keys 111 w/module identity 110 and unauthorized $3^{rd}$ parties sending in new (but faked) public keys 111 w/module identity 110.

At Step 808, module 101 can begin utilizing the new module public key 111 and module private key 112 derived in step 805, where new public key 111 was authenticated in Step 806. As one example, module 101 could begin following normal operations of a data reporting steps 101x illustrated in FIG. 3a. Although not illustrated in FIG. 8, module 101 could optionally send certificate 122 (that was received by module 101 in Step 807) to server 105 prior to Step 808 (such as if step 806 was performed with a different server 105), and module 101 could send the certificate in a message 208 as plaintext and without using a module encrypted data. Server 105 could verify a signature 123 in the certificate 122 using a certificate authority public key 131. Sending certificate 122 to server 105 prior to Step 808 (not shown) could also signal the use of a new public key 111 for module 101, and server 105 could verify the certificate authority signature 123. A server 105 utilized in Step 808 can be different than a server 105 utilized in Step 806, since (i) the server 105 in Step 806 could belong to a module provider 109 and/or a certificate authority 118, and (ii) the server 105 at Step 808 could belong to a M2M service provider 109, as illustrated in FIG. 1a. In addition to module 101 (a) beginning to use new public key 111 generated at step 805, module 101 could also (b) send server 105 a server instruction 414 of "query certificate". This "query certificate" server instruction 414 could be sent as plaintext in a message 208, where server 105 sends back the certificate 122, without ciphering, so that module 101 can confirm the correct certificate 122 is being utilized.

At Step 809, server 105 can send a response 209, where the response 209 includes server encrypted data 504, and the server encrypted data 504 can include a module instruction 502. Server encrypted data 504 can utilize a new module public key 111 received prior to Step 808, such described in the paragraph above where module 101 can send server 105 the certificate 122 which was received by module 101 in Step 807. In this step 809 server 105 can utilize the new module public key 111, resulting from the key generation by module 101 in step 805, to encrypt server encrypted data 504 in one of two ways. First, server 105 can encrypt server encrypted data 504 using an asymmetric ciphering algorithm 141a by ciphering with the new module public key 111, as described in step 503 of FIG. 5. Second, server 105 can encrypt server encrypted data 504 using a symmetric ciphering algorithm 141b by utilizing a key derivation function 141f such as ECDH and (i) the new module public key 111 and (ii) the server public key 114 in order to derive a commonly shared symmetric key 127, which could utilize a derived shared secret key 129b. In this second instance, server 105 can encrypt server encrypted data 504 in step 809 using a symmetric ciphering algorithm 141b and the commonly shared symmetric key 127.

After receiving response 209 in Step 809, module 101 can then utilize steps 514 and 515 described in FIG. 5b to decrypt server encrypted data 504 in response 209 and process the module instruction 502 contained in server encrypted data 504. As described in FIG. 5b, module instruction 502 could be an acknowledgement that message 208 in step 808 was received by server 105, or also module instruction 502 for an actuator 101y, or another instruction for module 101. At step 810, module 101 can send a message 208 with a confirmation 414 to server 105. Confirmation 414 can be used to signal proper execution of module instruction 502, if module instruction 502 comprised an instruction other than an "ACK". If module instruction 502 in Step 809 was an acknowledgement from server 105, then the confirmation 414 may omitted and in this case Step 810 could be skipped.

At Step 811, module 101 can determine or evaluate if a new module private key 112 and module public key 111 are required for continued operation. The need for the generation of new keys by a module 101 was explained at the beginning of the discussion of FIG. 8. One reason could be the expiration of a certificate 122 for module 101. A second reason could be that module 101 may wish to connect with a new wireless network 102 that requires the use of PKI techniques for authentication, but also specific parameters 126 or algorithms in a certificate 122 for module 101 to be acceptable with a new wireless network 102. Other examples for reasons that a module 101 may need new public/private keys after deployment exist as well, and any could be a reason for module 101 to determine to utilize new public/private keys. Upon determining new keys are desirable at Step 811, then module 101 can proceed back to Step 805 an derive the new keys. If module 101 determines that new keys are not required at Step 811, module 101 can then proceed to Step 812 and wait for a specified interval before taking further action, such as sending a message 208 to server 105, and the message 208 could contain a sensor data 305, or other data for the remote monitoring and/or control of a monitored unit 119.

FIG. 9

Figure 9:
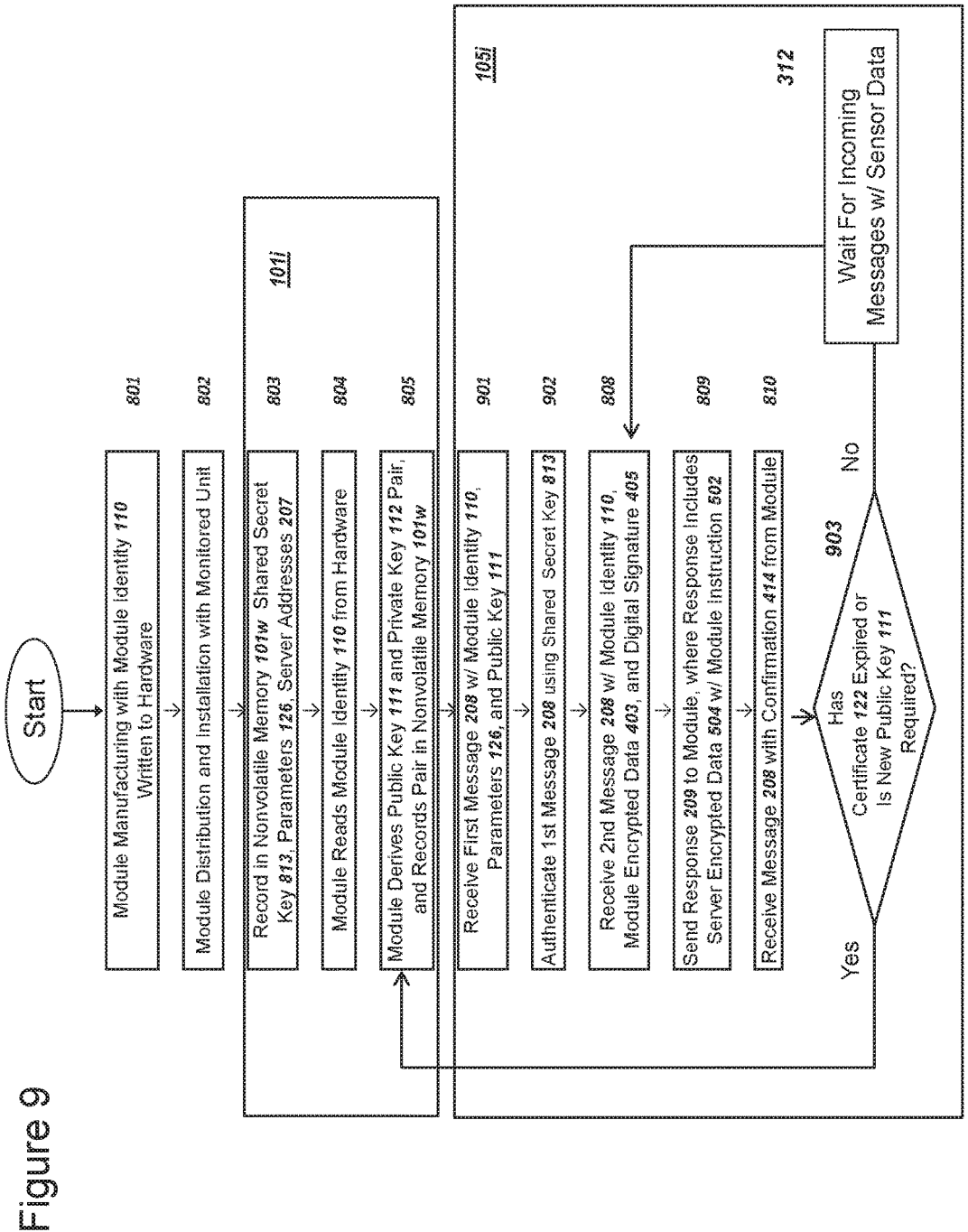
FIG. 9 is a flow chart illustrating exemplary steps for a server to communicate with a module that has derived a public key and private key, in accordance with exemplary embodiments.

FIG. 9 is a flow chart illustrating exemplary steps for a server to communicate with a module that has derived a public key and private key, in accordance with exemplary embodiments. As depicted and described in connection with FIG. 8 above, for enhanced security, a module 101 can preferably generate its own module private key 112 and corresponding module public key 111. In addition, multiple combinations of these key pairs may be useful as module 101 communicates potentially with multiple servers 105 during the lifetime of module 101, which could be a decade or longer. Having module 101 generate the multiple combinations of key pairs is more secure than generating the keys elsewhere and then transmitting or transferring a module private key 112 to module 101. Although security may be enhanced by module 101 creating its own public and private key, the internal creation of public and private keys in module 101 does create additional security challenges, especially related to the proper identification of module 101 and/or association of module 101 with the derived module public key 111. These challenges of proper identification of module 101 may be especially important after manufacturing and distribution, when module 101 operates on a network connected to the Internet 107 and utilizes the Internet 107 to communicate with a server 105. FIG. 8 through FIG. 10, including FIG. 9, illustrate exemplary embodiments for the proper identification of module 101 and/or association of module identity 110 with a derived module public key 111 in accordance with exemplary embodiments.

As illustrated in FIG. 9, before a server 105 receives the new module public key 111 at step 901, module 101 can follow the series of Steps 801 through Steps 805 depicted and described in connection with FIG. 8. The steps include (i) the recording of a shared secret key 813 at step 803, where the shared secret key 813 can be later used to authenticate a new module public key 111, and (ii) module 101 deriving module private key 112 and module public key 112 at step 805 using cryptographic algorithms 141 and/or key pair generation function 141e. Note that by using a shared secret key 813 to authenticate the creation of a new module public key 111, a security risk addressed is the risk that an unauthorized 3$^{rd}$ party attempting to submit a new module public key 111 using module identity 110. By module 101 creating its own module private key 112 (and avoiding the storage of any module private key 112 in any other locations over the lifetime of module 101), then only module 101 can reasonably read messages encrypted using module public key 111. In other words, module 101 creating or deriving its own module private key 112 can ensure that a "real" module 101 only receives messages that were created using its true module public key 111. Any unauthorized 3$^{rd}$ party attempting to submit a new ("fake") module public key 111 using module identity 110 (i) could attempt to be an imposter for a "real" module 101, but (ii) could not reasonably either (a) read messages to the real module 101 or (b) have unwanted module instructions 502 sent to the "real" module 101 (by a system 100 using a message 208 and response 208 as illustrated in FIG. 2 through FIG. 6).

After module 101 creates new module public key 111 and module private key 112 at step 805, at step 901 server 105 can receive a message 208 with the module identity 110, the new module public key 111, and parameters 126. The sub-steps for a server 105 to receive a message 208 are also depicted and described in connection with FIG. 2 above. Parameters 126 within a message 208 can comprise descriptive values for new module public key 111. Note that at step 901, server 105 does not need to receive new module public key 111 in the form of a certificate 122 (although it could be in the form of a certificate 122). New module public key 111 could be received by server 105 within a string of field within a body 602 of a TCP/UDP packet 601a.

At step 902, server 105 can authenticate the message using a shared secret key 813. Server 105 can authenticate the message 208 according to message digest, or using the shared secret key 813 as a symmetric key 127 within a symmetric ciphering algorithm 141b, where the successful encryption and decryption of data within message 208 using the shared secret key 813 on both ends could be confirmation that message 208 is authenticated, since both parties would only be able to mutually encrypt and decrypt by sharing the same shared secret key 813. Other possibilities exist as well for server 105 to use a shared secret key 813 in order to authenticate a message 208 that contains a new module public key 111 (where module 101 contains a new module private key 112). After receiving authenticated new module public key 111 in steps 901 and 902, according to a preferred exemplary embodiment, server 105 can preferably only accept and process (A) either incoming (i) a symmetric keys 127 ciphered with a asymmetric ciphering algorithm 141a, and/or (ii) incoming server instructions 414, when (B) the incoming message 208 also includes a valid module digital signature 405 verified by using the new module public key 111, received at step 901.

Although not illustrated in FIG. 9, server 105 could operate with a certificate authority 118 in order to utilize a new module public key 111, as described in this paragraph. At step 901, new module public key 111 could be received by server 105 in the form of a uniform resource locator (URL) or domain name for download of a certificate 122 corresponding to the new module public key 111. If new module public key 111 is included in a certificate 122 at step 901 (or a URL to the certificated 122), then module 101 could also take steps 806 and 807, depicted and described in connection with FIG. 8, prior to step 901. At step 901, module 101 could send server 105 a URL or address on the Internet 107 where server 105 could download the new module public key 111, such as if module 101 had a certificate authority 118 sign the new module public key 111. In this case, (i) the certificate authority 118 could perform the steps of 901 and 902 before server 105 conducts step 808 below, and (ii) certificate authority 118 would need some confirmation module 101 using module identity 110 was the correct owner of new module public key 111. Certificate authority 118 could authenticate module 101 using the shared secret key 813 (instead of server 105 authenticating module 101 directly with the shared secret key 813).

After steps 901 and 902, server 105 can update a database 105k using the module identity 110 to insert or update the new module public key 111, and parameters 126 associated with new module public key 111. Server 105 may communicate with a plurality of modules 101, and thus could utilize a database 105k in order to record the new module public key 111 and parameters 126 with the module identity 110. The module identity 110 could preferably operate as an index within a table of database 105k in order to speed reads and writes from the table used with module public key 111 and parameters 126. As discussed in step 803 of FIG. 8, parameters 126 can include data useful for the operation of cryptographic algorithms 141 and module public key 111. According to a preferred exemplary embodiment, parameters 126 can identify an elliptic curve utilized with new module public key 111. As one example, the curve utilized by module 101 in cryptographic algorithms 141 with new module public key 111 could be selected from one of the 15 standard published curves recommended by the National Institute of Standards and published in FIPS 186-3, and parameters 126 could select one of the exemplary 15 standard curves. Some modules 101 in a system 100 could utilize a first elliptic curve within a parameters 126, and other modules 101 could utilize a second and different elliptic curve within a parameters 126.

After updating the new module public key 111, in step 808 of FIG. 9, server 105 could receive a second message 208, and the second message 208 can include a module identity 110, module encrypted data 403, and a module digital signature 405, wherein the module digital signature is created with the new module public key 111 received in step 901. Server 105 could then utilize the steps illustrated in FIG. 4b in order to process the incoming message 208 with the new module public key 111, including using the module identity 110 received in the second message to select the new module public key 111 and subsequently verify module digital signature 405 using the new module public key 111 and digital signature algorithm 141d. Also as discussed in FIG. 4b in connection with processing a received message 208, server 105 could decrypt the module encrypted data 403 in the second message 208 by using server private key 105c.

The module encrypted data 403 could include a symmetric key 127 for utilization with a symmetric cipher 141b, as illustrated by the first set 701a of module encrypted data 403 in FIG. 7. Module 101 could also send sensor data in a module encrypted data 403 at step 808. Or, Step 808 of FIG. 8 and FIG. 9, the second message 208 could be a signal for server 105 to use a new key derivation function 141f with the server public key 114 and the new module public key 111 to create a new derived shared key 129b for use with symmetric ciphering algorithms 141b in subsequent messages 208. If the second message 208 in step 808 comprises a signal for server 105 to derive a new derived shared key 129b, then this second message 208 could then optionally leave off module encrypted data 403 and/or a module digital signature 405. The successful use of a new derived shared key 129b (using the new module public key 111 and existing server public key 114) with symmetric ciphering algorithms 141b at subsequent steps by both module 101 and server 105 can indicate to each the communications are mutually authenticated.

At step 809, server 105 can send a response 209 to module 101, where the response 209 includes server encrypted data 504 and a module instruction 502. Server 105 could take the steps to create and send response 209 as depicted and described in connection with FIG. 5a. Response 209 could be formatted according to response 209 illustrated in FIG. 6. The module instruction 502 could be an acknowledgement 501 that the message 208 sent in step 808 was received by server 105. At step 810, module 101 can send a message 208 with a confirmation 414 to server 105. Confirmation 414 can be used to signal proper execution of module instruction 502, if module instruction 502 comprised an instruction other than an "ACK" or acknowledgement 501. If module instruction 502 in step 809 was an acknowledgement 501 from server 105, then the confirmation 414 may omitted and in this case step 810 could be skipped.

At step 903 server 101 can determine or evaluate if a new module public key 111 and/or certificate 122 are required for continued operation. FIG. 8 included example cases for the need by a module 101 to generate a new module public key 111 (which would also usually require a new private key 112). One reason could be the expiration of a certificate 122 for module 101, or the desire to utilize a different set of parameters 126 such as a longer key length for increase security or the use of a different elliptic curve within an asymmetric algorithms 141a. Upon determining new keys are desirable at step 903, then server 105 could instruct module 101 to derive new private and public keys by returning to step 805. Although not illustrated in FIG. 9, upon determining "yes" at step 903, server 105 could send a module instruction 502 of "new key generation" and also a new set of parameters 126 to utilize with the new module private key 112 and module public key 111, and module instruction 502 could be sent in a response 209 after a message 208 had been received. If server 105 determines that new keys are not required or desirable at step 903, server 105 can then proceed to Step 312 and wait for additional incoming messages 208 from module 101 or other modules. Step 312 is also depicted and described in connection with FIG. 3b.

FIG. 10

Figure 10:
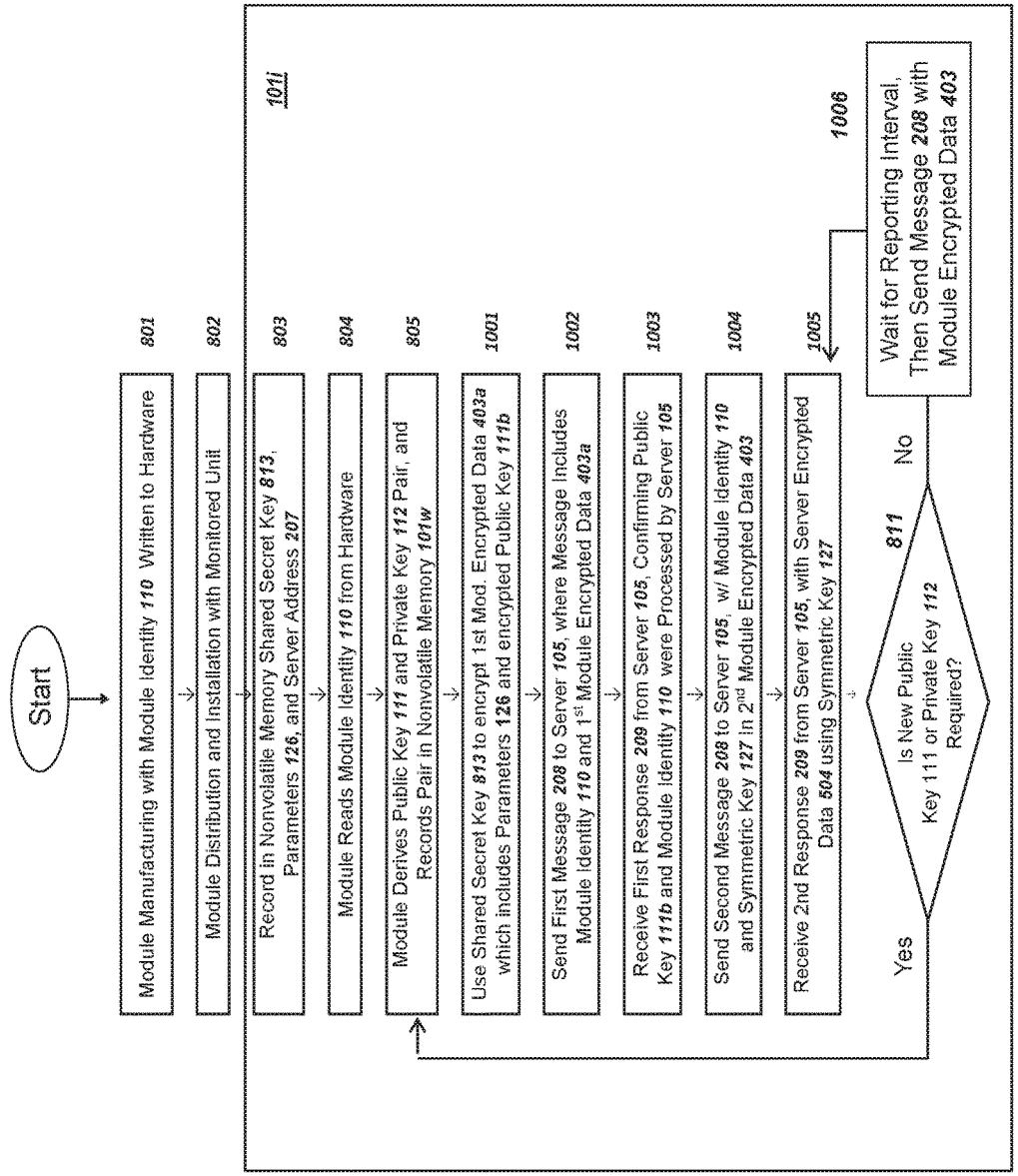
FIG. 10 is a flow chart illustrating exemplary steps for a module to derive a public key and private key, and for a module to send a server the encrypted public key, in accordance with exemplary embodiments.

FIG. 10 is a flow chart illustrating exemplary steps for a module to derive a public key and private key, and for a module to send a server the encrypted public key, in accordance with exemplary embodiments. As discussed in FIGS. 8 and 9 above, over the course of many years of operation of module 101 it may be desirable for module 101 to generate or derive new public and private keys. As a minimum and also discussed above, module 101 may preferably generate they keys before the repeated transfer of sensor 101f and actuator data 101y between a module 101 and a server 105. Note that important additional security and features may be obtained in a system 100 by securely transmitting a module public key 112 to server 105. As contemplated herein, the term "public key" may comprise a key that is shared between endpoints such as a module 101 and a server 105, but the key does not need to be either (i) publicly disclosed to $3^{rd}$ parties, or (ii) submitted to an external certificate authority 118 for validation or signature, including verification that the module public key 111 belongs with module identity 110. Additional security in a system 100 may be maintained by only server 105 and module 101 recording module public key 111, and thus module public key 111 could be transmitted to server 105 securely as illustrated in FIG. 10, after module 101 derives a set of private and public keys.

Steps 801 through 805 in FIG. 10 can comprise the equivalent Steps 801 through 805 depicted and described in connection with FIGS. 8 and 9. Note that steps 803 through 805 may comprise the first time module 101 has generated or derived module public key 112, and the steps illustrated in FIG. 10 provide an exemplary preferred embodiment within the present invention for authoritatively and securely sending module public key 112 to server 105 both the very first time and also subsequent times after module 101 had initially derived a module public key 111 and corresponding module private key 112. The term "very first time" as contemplated herein can mean that since manufacturing, module 101 had not previously recorded a module private key 112 in either nonvolatile memory or volatile memory.

At Step 1001, module 101 can create a module encrypted data 403a using the shared secret key 813, which could be recorded in nonvolatile memory earlier at step 803. Note that if module 101 is deriving keys for the very first time, then shared secret key 813 could comprise a pre-shared secret key 129a, which could be installed by a module provider 109 or end user before module 101 connects with a server 105. As one example, shared secret key 813 used in Step 1001 could have been recorded with a bootloader program 125 for module 101 in a nonvolatile memory such as a flash memory 101w. If module 101 is deriving keys for a subsequent time after the very first time (such as after module 101 had already derived module private key 112 at least one time), then shared secret key 813 may be different than a pre-shared secret key 129a (i.e. shared secret key 813 could be securely transferred to module 101 after the initial time keys were derived).

Module encrypted data 403a is shown in FIG. 10 as different to module encrypted data 403 because module encrypted data 403a can include public key 111b, where module 101 encrypts public key 111b using the shared secret key 813. Thus, module encrypted data 403a can include an encrypted public key 111b. New module public key 111b can comprise an encrypted new module public key 111, as illustrated in FIG. 10. Note that module 101's encryption of new module public key 111b in a message 208 is different than contemplated by conventional technology, because module public keys 111 would normally not be encrypted and could also be openly shared in the form of a certificate 122 (and thus the term "public" in the key name). As contemplated herein, module public key 111b can be module public key 111 in an encrypted form.

However, as illustrated in FIG. 10, module 101 creates an encrypted new module public key 111b using shared secret key 813. The shared secret key 813 could be utilized (i) as a symmetric key 127 for ciphering the new module public key 111 to produce new module public key 111b, (ii) to derive a symmetric key 127 used to cipher module public key 111b, or (iii) as a public key within an asymmetric ciphering algorithm 141a, where the module public key 111b is encrypted using the shared secret key 813. Other possibilities exist as well for using a shared secret key 813 to encrypt a new module public key 111b, without departing from the scope of the present invention. Also as illustrated in FIG. 10 at step 1001, the parameters 126 associated with new module public key 111b can preferably also be included in a module encrypted data 403b. The reason is that by securely transmitting parameters 126, system 100 can be further secured since unauthorized $3^{rd}$ parties could not then observe any plaintext parameters 126 associated with new module public key 111b.

At step 1002, module 101 can then send a first message 208 to server 105, where the first message 208 includes the module encrypted data 403a and module identity 110. Module encrypted data 403a can include the encrypted parameters 126 and module public key 111b, as discussed in step 1001. An exemplary first message 208 sent according to step 1002 is depicted and described in connection with FIG. 11 below. Although not illustrated in FIG. 11 below or at step 1002, the first message 208 can also preferably include a field or data to indicate to server 105 that module encrypted data 403a should be decrypted using shared secret key 813. Alternatively, if the first message 208 is the very first message from module 101 after the creation of keys in step 805, including potentially the very first message 208 received by server 105 from module 101 using module identity 110, then server 105 could be programmed to automatically use shared secret key 813 to decrypt module encrypted data 403a. Similarly, both server 105 and module 101 can utilize shared secret key 813 as the "backup" or "default" key for secured communication if subsequent encryption/decryption and security signatures fail (including the propagation of bit errors into encrypted data or signatures). According to an exemplary preferred embodiment, module 101 and server 105 temporarily change to (i) a symmetric ciphering algorithm 141b using shared secret key 813 from using (ii) a symmetric ciphering algorithm 141b using symmetric key 127 if symmetric ciphering algorithm 141b fails for either endpoint (either module 101b or server 105).

At step 1003, module 101 can receive a response 209 from server 105 confirming that server 105 properly received and processed the message 208 with the module encrypted data 403a. The response 209 at Step 1003 could signal to module 101 that server 105 properly recorded the new module public key 111b associated with module identity 110. Response 209 at step 1003 could comprise a module instruction 502 or an acknowledgement 501. Response 209 at step 1003 could also be ciphered using a symmetric key 127, where the symmetric key 127 comprises a derived shared secret key 129b, where the derived shared secret key 129b was created by server 105 using the new module public key 111b. Successful processing of response 209 at step 1003 by module 101 (using steps outlined in FIG. 5b) could confirm to module 101 that new module public key 111b was properly implemented on server 105.

At step 1004, module 101 can return to routine messaging and reporting routines with a server 105, since server 105 has indicated the new module public key 111b has been applied in the previous step. Step 1004 could comprise module 101 sending a second message 208 where a symmetric key 127 is ciphered using an asymmetric ciphering algorithm 141a. An exemplary format of the module encrypted data 403 in the second message 208, with a symmetric key 127, could include encrypted data 701a in FIG. 7. Alternatively and not shown in FIG. 10, at step 1004 module 101 could send the second message 208 to server 105 in order to signal that server 105 should change to a symmetric ciphering algorithm 141b, where the symmetric key 127 would be a derived shared secret key 129b using the new module public key 111b delivered in step 1002 above.

At step 1005, server 105 can send a second response 209, where the second response 209 includes server encrypted data 504, and the server encrypted data 504 can include a module instruction 502. Server encrypted data 504 could be ciphered using the symmetric key 127 specified in step 1004 above. At step 1004, module 101 can process the second response 209 according to the steps outlined in FIG. 5b above. The second response 209 could comprise a response 209 illustrated in FIG. 6. At step 811, module 101 can determine or evaluate if a new module private key 112 and module public key 111 are required for continued operations. Determining if new keys are required could include reasons discussed in FIG. 8, including potentially the expiration of a certificate 122, or the expiration of a time-to-live value that module 101 or server 105 specified for a module public key 111.

Upon determining new keys are desirable at step 811 in FIG. 10, then module 101 can proceed back to step 805 an derive the new keys. If module 101 determines that new keys are not required at step 811, module 101 can then proceed to step 1006 and wait for a specified interval before taking further action, such as sending a message 208 to server 105, and the message 208 could contain module encrypted data 403 with sensor data 305, or other data for the remote monitoring and/or control of a monitored unit 119. After step 1006, module 101 can return to step 1005 and receive a response 209 and continue operating as specified in module program 101i and/or data reporting steps 101x.

As described in steps 1001 through 1003 of FIG. 10, according to a preferred exemplary embodiment, server 105 can receive a new module public key 111b in a message 208 at step 1002, where the new module public key 111b is both encrypted and not sent by module 101 to any other server or location. In other words for this preferred exemplary embodiment, the (i) new module public key 111b is not signed by a certificate authority and also (ii) new module public key 111 is held confidentially within both module 101 and server 105, except, for the single encrypted distribution to server 105 at step 1002.

If server 105 receives new module public key 111b in an encrypted form using secure shared secret key 813, then server 105 can optionally omit the usage of a server digital signature 506 in many subsequent responses 209. The reason is that new module public key 111b has only been transmitted in an encrypted form to server 105, and thus no other entity connected to the Internet 107 could have new module public key 111b to send encrypted messages using asymmetric ciphering 141a. The use of steps 1001 and 1002 could eliminate the routine use of a server digital signature 506 in a response 209 as illustrated in FIG. 5a and FIG. 5b. A secure system 100 could still periodically use a server digital signature 506, such as when module 101 receives a module instruction from server 105 to utilize a new server public key 114 or new symmetric key 127. Other possibilities exist as well, but the use on an encrypted module public key 111b can reduce the frequency of server digital signature 405 messages in a secured system 100. Module 101 could also use steps 1001 and 1002 to securely send new module public key 111b to a server 105, while module 101 uses a second module public key 111 associated with a different module private key 112 in a certificate 122. In other words, module 101 can utilize multiple pairs of private/public keys, and the secure transmission and recording of a module public key 111b could also be utilized for many of the pairs of private/public keys.

Note that over the course of years a system 100 could save considerable energy by minimizing or avoiding the requirements for a server digital signature 506, and power consumption can be a critical engineering constraint for a module 101 and/or a battery life 101k. As one example, verifying a digital signature using a digital signature algorithms 141d such as ECDSA with 224 bits can require 122 mJ of energy ("Energy Analysis of Public-Key Cryptography on Small Wireless Devices", Wander et al, Table 2, Page 8, herein incorporated by reference). Assuming a module (i) operates for 10 years, (ii) performs 10 verifications a day without using steps 1001 and 1002, and (iv) reduces the number of verifications (i.e. step 512) to an exemplary 1 verification a week by using steps 1001 and 1002, then approximately 3500 joules of battery energy (or landline power) can be saved. Note this does not include the additional savings in energy by avoiding transmitting the secure hash signature and related overhead, which would often be transmitted wirelessly for many modules 101. In this case of utilizing wireless transmission for module 101 with a radio 101z, the energy savings would likely be several fold the exemplary amount of 3500 joules from (i) sending public key 111b securely in steps 1001 and 1002 so that server digital signatures 506 can be optionally omitted, and (ii) avoiding the additional bandwidth required for transmitting the secured hash signatures.

FIG. 11

Figure 11:
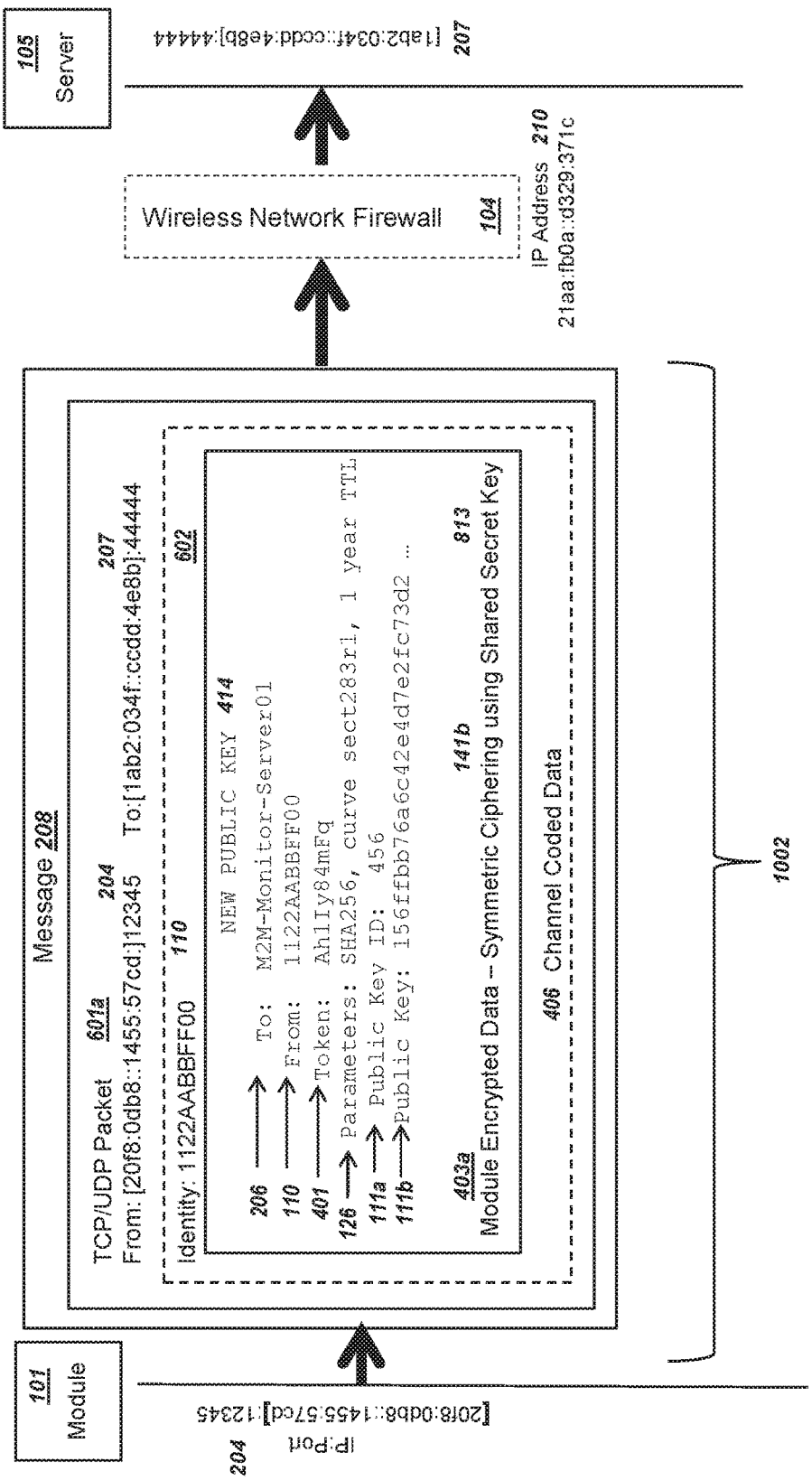
FIG. 11 is a simplified message flow diagram illustrating an exemplary message sent by a module, wherein the message includes an encrypted module public key, in accordance with exemplary embodiments.

FIG. 11 is a simplified message flow diagram illustrating an exemplary message sent by a module, wherein the message includes an encrypted module public key, in accordance with exemplary embodiments. As discussed in FIG. 8 through FIG. 10, there can be cases where module 101 derives a new module public key 111 and new module private key 112. On example would be the initial creation of the key pairs by module 101, and many other examples could exist as well. FIG. 11 can illustrate an exemplary format and contents of a message 208 in Steps 1001 and 1002 of FIG. 10, and this exemplary format can also help to illustrate the significant differences from conventional technology by utilizing the secured and efficient communication techniques contemplated herein.

A message 208 illustrated in FIG. 11 using steps 1001 and 1002 can include (i) sending new module public key 111b in an encrypted format within a module encrypted data 403a, (ii) using a shared secret key 813 with a symmetric ciphering algorithm 141b for encryption, (iii) a set of parameters 126 within module encrypted data 403a, where the set of parameters 126 includes information for server 105 to utilize public key 111b. Exemplary parameters 126 illustrated in FIG. 11 include (i) a secure hash algorithm 141c to utilize in signatures, which could comprise the SHA 256 algorithm as shown (which may also be known as the SHA-2 algorithm), (ii) a selected elliptic curve for use with ECC algorithms 154 or a modulus to use with RSA algorithms 153, and (iii) a time-to-live value for the public key, such as the illustrated "time to live" value of 1 year shown in FIG. 11. The time value for the validity of new module public key 111b could alternatively be specified in a set expiration date. Other values associated with cryptographic algorithms 141 could be included in parameters 126 as well.

Additional values or fields within a message 208 associated with communicating a new module public key 111b with server 105 could include a server instruction 414 of "new public key". This server instruction could inform server 105 to utilize the new module public key 111b within the message 208. Module public key sequence number 111a can include a sequence number or identity for the new module public key 111b, such that module 101 or server 105 can properly reference and/or select the key from a plurality of module public keys 111b that could be associated with module identity 110. Although module public key sequence number 111a is illustrated as a separate field in module encrypted data 403a, module public key sequence number 111a could optionally be included in parameters 126, such that the value within parameters 126 specifies the current sequence number for the current module public key 111b.

Other fields and features within a message 208 as illustrated in a FIG. 11 can be similar to the fields presented in FIGS. 6 and 7 above. Since (a) FIG. 11 can also illustrate a very first message 208 sent by a module 101 to a server 105, such as after keys are derived in a Step 805, then (b) module 101 can read multiple values from RAM 101e or a nonvolatile memory 101w or 101c in order properly construct or format message 208. Each of (i) destination IP:port number 207, (ii) parameters 126, and (iii) shared secret key 813 can preferably be written into nonvolatile memory at step 802 of FIG. 8 through FIG. 10, if message 208 in FIG. 11 represents the very first message 208 sent by module 101. The source IP:port number 204 can represent a number assigned by an operating system 101h. If message 208 in FIG. 11 comprises a subsequent time message 208 is transmitted by module 101 (i.e. not the very first time), such as after Step 811, then each of (i) destination IP:port number, (ii) parameters 126, and (iii) shared secret key 813 could be updated by server 105 using a module instruction 502 within a server encrypted data 504. In this manner, shared secret key 813 could change from (i) comprising a pre-shared secret key 129a (for a very first message 208 after module key derivation) to (ii) comprising a shared secret key that is sent by server 105 within a server encrypted data 504 (for a subsequent message 208 after module key derivation).

After receiving message 208, server 105 can use the unencrypted identity 110 illustrated in a body 602 of FIG. 11 to select the shared secret key 813 in order to decipher module encrypted data 403a. Server 105 could also read the other data shown inside a module encrypted data 403a. The use of a channel coding 406 is described in connection with FIGS. 4 and 6, and channel coding may optionally be omitted. If message 208 comprises a UDP Lite packet, then channel coding may optionally be applied within the body 602. If message 208 comprises a UDP packet, then channel coding may comprise sending the exact same UDP packet 601a multiple times, such as an exemplary 3 packets 601a sent at the same time. Although not illustrated in FIG. 11, server 105 can also send a response 209 confirming the receipt and processing of message 208.

Conclusion

Various exemplary embodiments have been described above. Those skilled in the art will understand, however, that changes and modifications may be made to those examples without departing from the scope of the claims.

What is claimed is:

1. A method of generating keys for a module to securely communicate over a wireless network comprising the steps of:
   (a) recording in memory of the module at least the following:
      (i) a first set of parameters for a secure hash algorithm;
      (ii) a second set of parameters for an elliptic curve algorithm; and
      (iii) a first public key which corresponds to a first private key;
   (b) deriving, by the module, a module private key and a corresponding module public key using the second set of parameters;
   (c) generating, by the module, a first shared secret key using a first elliptic curve Diffie-Hellman key exchange, and based at least in part, on the first public key;
   (d) sending, from the module to a first computing device which is connected to the wireless network, a first message including the derived module public key, wherein at least a portion of the first message is encrypted using a third set of parameters that is based on a symmetric ciphering algorithm and the derived first shared secret key;
   (e) receiving, by the module from the first computing device, a second message comprising encrypted data, which is encrypted, by the first computer device, using the symmetric ciphering algorithm and a derived second shared secret key, wherein the second shared secret key is derived by the first computer device using a second elliptic curve Diffie-Hellman key exchange based at least, in part, on the derived module public key; and
   (f) decrypting, by the module, the encrypted data using the third set of parameters and the derived second shared secret key.

2. The method of claim 1, wherein first public key is received upon connecting to the wireless network.

3. The method of claim 1, wherein between steps (b) and (d), the module further generates a first secure hash of the first public key using the first set of parameters; and the message in step (d) comprises the first secure hash.

4. The method of claim 3, wherein the first secure hash utilizes a SHA-256 hash algorithm.

5. The method of claim 1, wherein after step (f), the module further generates a first secure hash of the module public key using the first set of parameters; and the encrypted data comprises the first secure hash.

6. The method of claim 5, wherein the first secure hash utilizes a SHA-256 hash algorithm.

7. The method of claim 1, wherein the first computing device is a server.

8. The method of claim 1, wherein a symmetric ciphering key is derived using at least the first shared secret key and a first random number.

9. The method of claim 8, wherein the symmetric ciphering key is derived also using the second shared secret key and a second random number.

10. The method of claim 1, wherein the method further comprises the steps of:
    (g) generating, at the module, a configuration request;
    (h) transmitting, from the module to the first computing device, the configuration request; and
    (i) receiving, at the module, encrypted configuration information.

11. The method of claim 1, wherein the memory is nonvolatile memory.

* * * * *